United States Patent
Hara et al.

(10) Patent No.: US 6,301,294 B1
(45) Date of Patent: Oct. 9, 2001

(54) SPREAD SPECTRUM COMMUNICATION DEVICE

(75) Inventors: Keita Hara, Kashihara; Kunihiko Iizuka, Sakurai, both of (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/162,453

(22) Filed: Sep. 29, 1998

(30) Foreign Application Priority Data

Sep. 30, 1997 (JP) .................................................. 9-266132
Aug. 27, 1998 (JP) ................................................ 10-242320

(51) Int. Cl.[7] .................................................. H04L 27/30
(52) U.S. Cl. .......................... 375/207; 375/150; 375/152
(58) Field of Search .................................. 375/207, 206, 375/150, 130, 152; 455/61

(56) References Cited

U.S. PATENT DOCUMENTS 5,465,396 * 11/1995 Hunsinger et al. ..................... 455/61
5,467,367 * 11/1995 Izumi et al. ........................... 375/206
5,703,503   12/1997 Miyamoto et al. ..................... 327/58

FOREIGN PATENT DOCUMENTS 07115387A   5/1995 (JP) .
09083486A   3/1997 (JP) .
10-145326 * 5/1998 (JP) ................................ H04J/13/00

OTHER PUBLICATIONS

Jari Iinatti, Pentti Leppanen, Use of a Matched Filter for Synchronization of a DS Receiver in AWGN Channel and Continuous Tone Jamming, 1991 IEEE pp. 716–719.*

* cited by examiner

Primary Examiner—Stephen Chin
Assistant Examiner—Tony Al-Beshrawi

(57) ABSTRACT

A spread spectrum communication device incorporates a base band processing unit which includes a synchronization acquiring section for acquiring synchronization with respect to an analog spread spectrum signal and a data demodulating section for conducting a demodulating operation with respect to the analog spread spectrum signal which has been subject to the synchronization acquiring operation by the synchronization acquiring section. The synchronization acquiring section has a matched filter for detecting a peak position of the analog spread spectrum signal inputted thereto, and at least the operation of the matched filter is an analog processing operation.

19 Claims, 41 Drawing Sheets

SPREAD SPECTRUM COMMUNICATION DEVICE

FIELD OF THE INVENTION

The present invention relates to a spread spectrum communication device, and particularly relates to a spread spectrum communication device which demodulates a received analog spread spectrum signal by the direct spectrum spreading scheme by performing both the analog signal processing operations and the digital signal processing operations.

BACKGROUND OF THE INVENTION

Conventionally, there has been proposed a spread spectrum communication device which demodulates a received analog spread spectrum signal by the direct spectrum spreading scheme by performing both the analog signal processing operations and the digital signal processing operations.

Regarding such a spread spectrum communication device, for example, the Japanese Publication for Laid-Open Patent Application No. 115387/1995 (Tokukaihei 7-115387) discloses the following technique. An A/D converter for receiving an analog spread spectrum signal and converting the received analog signal to a digital signal is provided at the first stage of a base band processing unit so that digital signal processing operations are performed at the stages there behind in the base band processing unit.

Further, regarding a spread spectrum communication device, the Japanese Publication for Laid-Open Patent Application No. 83486/1997 (Tokukaihei 9-83486) discloses the following technique. An integrating unit for conducting an integrating operation with respect to an analog input signal with weights given thereto according to a PN code and outputting an integrated result as an analog output signal is provided. By doing so, the analog output signal is intermittently held, and peaks of the analog signal thus held are detected so that timings of the detected peaks are determined, and only at these timings thus determined, peak values of the inputted analog signal are digitized by an A/D converter.

With the technique disclosed by Tokukaihei 9-83486, an operational speed of the A/D converter can be suppressed to minimum, thereby resulting in that power consumption can be reduced.

However, with the technique disclosed by Tokukaihei 7-115387, since a sampling operation has to be carried out many times at a high speed for synchronization acquisition, there has arisen a drawback in that a circuit size thereof is large and power consumption thereof is great.

Besides, with the technique disclosed by Tokukaihei 9-83486, power consumption of the base band processing unit can be suppressed by lowering the operational speed of the A/D converter, but this makes the circuit for detecting peaks of an analog signal complicated. Thus, values obtained by peak detection with respect to the analog output signal are subject to A/D conversion, and therefore, there is a drawback in that precision in peak value detection is poor in spite of complicated peak detection. Therefore, there has arisen a problem that an analog spread spectrum signal is hardly demodulated with high precision.

SUMMARY OF THE INVENTION

The object of the present invention is to provide a spread spectrum communication device characterized in that a circuit size of a base band processing unit thereof is small and power consumption of the base band processing unit is suppressed, and that precision in reception of a received signal is improved.

To achieve the aforementioned object, a spread spectrum communication device of the present invention has a base band processing unit which includes a synchronization acquiring section for acquiring synchronization from a received analog spread spectrum signal, and a data demodulating section for demodulating the received analog spread spectrum signal based on the result of the operation of the synchronization acquiring section. The synchronization acquiring section has at least a matched filter for detecting peak positions of the received analog spread spectrum signal, and the matched filter performs an analog processing operation.

Generally, in the case where all the operations in the base band processing unit are digital processing operations, most of power consumed therein is consumed by the matched filter. Therefore, by causing the matched filter to perform its processing operation in analog, power consumption in the base band processing unit can be drastically reduced.

Therefore, with the aforementioned arrangement wherein at least the processing operation by the matched filter is an analog processing operation, power consumption in the base band processing unit can be drastically decreased.

Besides, in the case where the matched filter is designed so as to carry out an analog processing operation, the circuit size thereof can be made smaller as compared with the circuit size in the case where the processing operation of the matched filter is a digital processing operation.

For a fuller understanding of the nature and advantages of the invention, reference should be made to the ensuing detailed description taken in conjunction with the accompanying drawings.

DESCRIPTION OF THE PREFERRED EMBODIMENTS

The following description will explain embodiments of the present invention.

A receiving side of a spread spectrum communication device is mainly explained in the following description on the embodiments of the present invention.

First Embodiment

Figure 2:
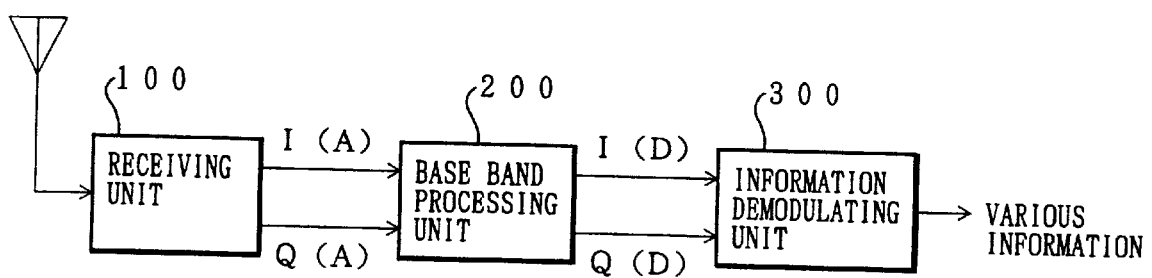
FIG. 2 is a block diagram illustrating a schematic arrangement of the spread spectrum communication device.

A spread spectrum communication device in accordance with the present embodiment is, as shown in FIG. 2, composed of a receiving unit 100 for receiving an analog spread spectrum signal, a base band processing unit 200 for digitizing the analog spread spectrum signal received by the receiving unit 100 so as to demodulate it, and an information demodulating unit 300 for converting the digital signal sent from the base band processing unit 200 into data such as voice, images, and characters.

More specifically, the receiving side of the spread spectrum communication device is arranged so that the analog spread spectrum signal received by the receiving unit 100 is demodulated by the base band processing unit 200 to a digital signal, and the digital signal is sent to the information demodulating unit 300 at a stage there behind, which is, for example, a decoding unit for decoding the digital signal into voice or image.

Figure 3:
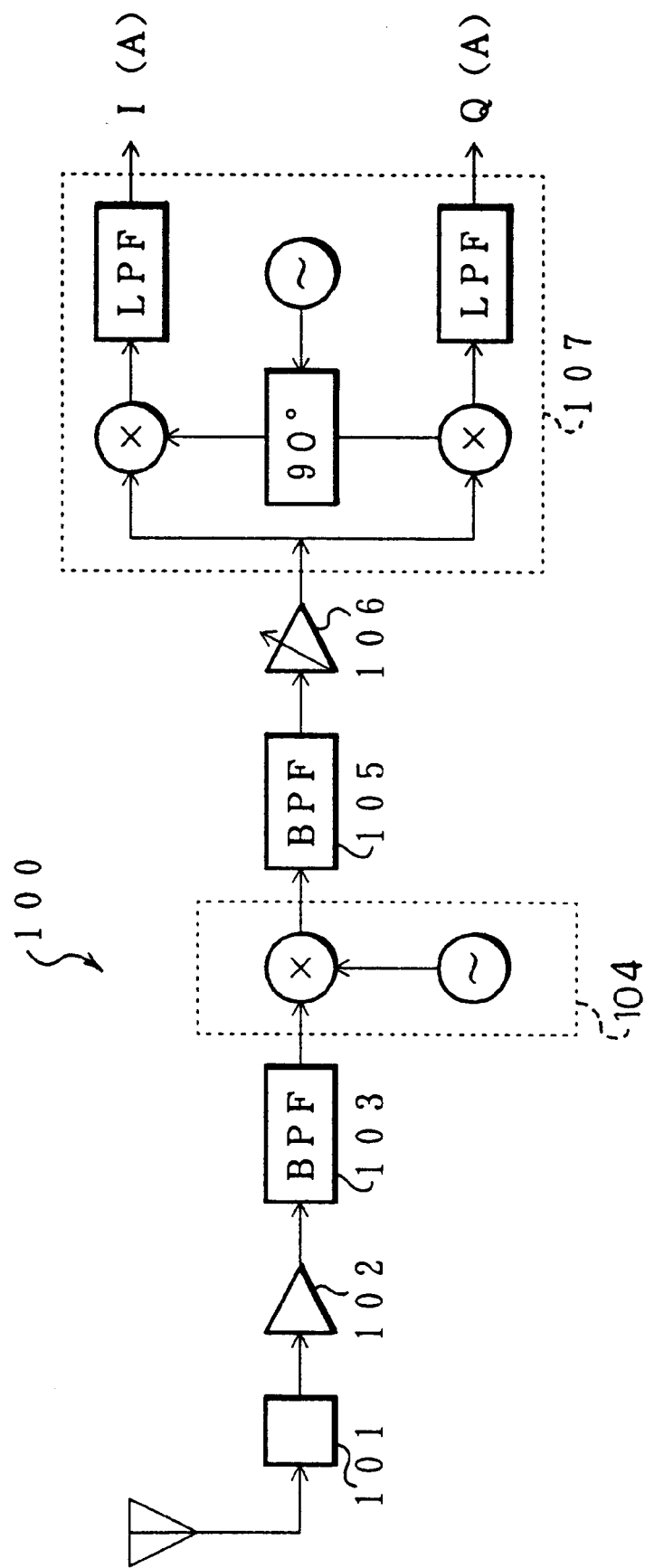
FIG. 3 is a block diagram illustrating a schematic arrangement of a receiving unit provided in the spread spectrum communication device shown in FIG. 2.

As shown in FIG. 3, the receiving unit 100 includes an antenna, a duplexor 101, an amplifier (LNA) 102, a band-pass filter (BPF) 103, a frequency converter 104, a band-pass filter (BPF) 105, an AGC (Automatic Gain Control) amplifier 106, and an orthogonal detector 107, which are connected in series in this order.

More specifically, in the receiving unit 100, a signal received by the antenna is divided on a frequency axis by the duplexor 101 into a reception signal and a transmission signal. The reception signal thus obtained by the duplexor 101 is amplified by the amplifier 102 at an RF (radio frequency) stage, and thereafter, it is filtered by the band-pass filter 103 which has a wide bandwidth. The reception signal thus filtered is converted by the frequency converter 104 at an IF (intermediate frequency) stage to an intermediate-frequency signal, and thereafter, only a reception frequency channel is extracted by the band-pass filter 105. A signal outputted from the band-pass filter 105 is supplied to the AGC amplifier 106 where the signal is amplified to a level corresponding to a desired reception wave thereof and fixed, and thereafter, it is separated by the orthogonal detector 107 into an I component signal and a Q component signal as base band signals, which are then outputted as analog spread spectrum signals (I(A) and Q(A), respectively) to the base band processing unit 200 at the next stage.

The base band processing unit 200 digitizes and demodulates the analog spread spectrum signals (I(A) and Q(A)) supplied from the receiving unit 100, and sends them as digital signals (I(D) and Q(D), respectively) to the information demodulating unit 300 at the next stage.

Incidentally, the base band processing unit 200 will be described later in detail.

Figure 4:
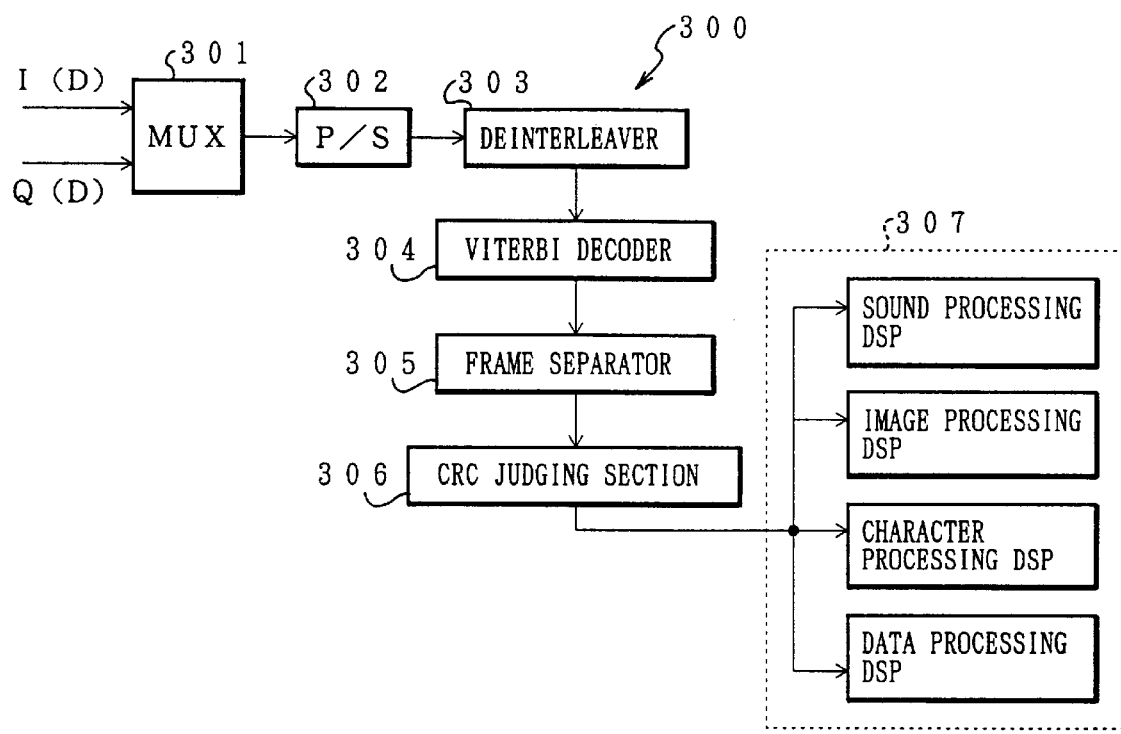
FIG. 4 is a block diagram illustrating a schematic arrangement of an information demodulating unit provided in the spread spectrum communication device shown in FIG. 2.

The information demodulating unit 300 has a multiplexor 301, a P/S converter 302, a deinterleaver 303, a Viterbi decoder 304, a frame separator 305, a CRC (Cyclic Redundancy Check) judging section 306, and a data processing section 307, which are connected in this order from an input side, as shown in FIG. 4.

In other words, in the information demodulating unit 300, the digital signals (I(D) and Q(D)) as the demodulated data outputted from the base band processing unit 200, which are the I component signal and the Q component signal, are sequentially, in this order, subjected to parallel/serial conversion by the multiplexor 301 and the P/S converter 302, and thereafter, they are divided by the frame separator 305 to a frame length each. The reception data thus divided to a frame length each are subjected to CRC check by the CRC judging section 306, whereby errors are corrected in each of frame data. The data whose errors are thus corrected are sent to the data processing section 307. The data processing section 307 includes a sound processing DSP (Digital Signal Processor) for processing sound, an image processing DSP for processing images, a character processing DSP for processing characters, and data processing DSP for data other than sound, images, and characters.

Here, since these processing operations in the information demodulating unit 300 are digital processing operations, the signals supplied to the information demodulating unit 300 need to be digital signals. In other words, output signals from the base band processing unit 200 which is a stage previous to the information demodulating unit 300 needs to be digital signals. On the other hand, signals supplied to the base band processing unit 200 are analog spread spectrum signals as described above. Therefore, at least one A/D converter has to be provided in the base band processing unit 200, so that the analog signals are digitized.

Figure 1:
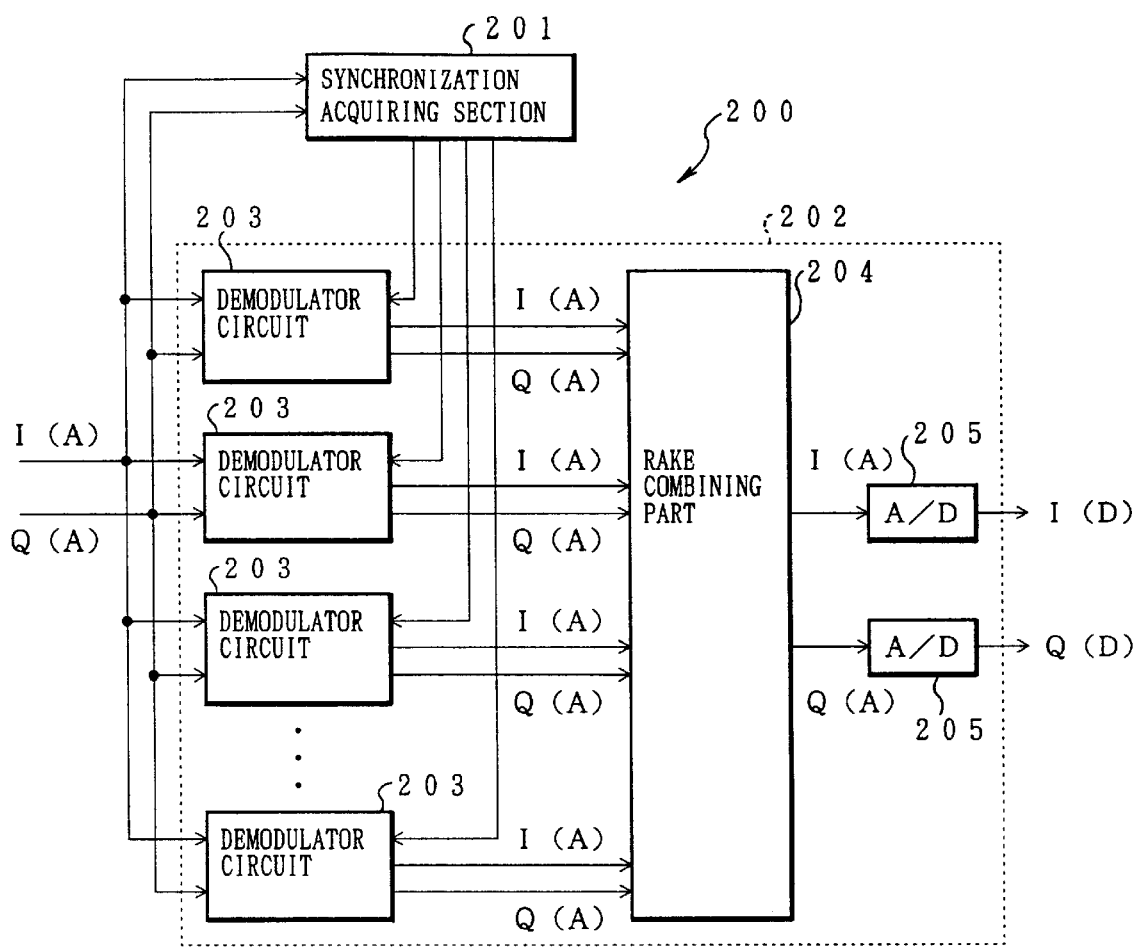
FIG. 1 is a block diagram illustrating a schematic arrangement of a base band processing unit provided in a spread spectrum communication device of the present invention.

As shown in FIG. 1, the base band processing unit 200 is composed of a synchronization acquiring section 201 for initial synchronization of an input signal with spreading codes (PN codes), and a data demodulating section 202 for performing inverse-spreading and demodulation based on synchronization positions of the PN codes which are identified by the synchronization acquiring section 201. Further, the analog spread spectrum signals (I(A) and Q(A)) supplied from the receiving unit 100 are inputted to the synchronization acquiring section 201, as well as to the data demodulating unit 202.

The data demodulating section 202 is composed of a plurality of demodulator circuits 203 for performing inverse-spreading and demodulation with respect to the analog spread spectrum signals, a RAKE combining part 204 for combining signals thus demodulated and supplied thereto by the demodulator circuits 203, and A/D converters 205 for converting analog signals supplied from the RAKE combining part 204 to digital signals.

More specifically, in the data demodulating section 202, the analog spread spectrum signals are supplied to the demodulator circuits 203, and after being inverse-spread based on the synchronization position information of the PN codes supplied from the synchronization acquiring section 201, the inverse-spread signals are demodulated. The analog spread spectrum signals (I(A) and Q(A)) thus demodulated and outputted from the respective demodulator circuits 203 are supplied to the RAKE combining part 204, and are combined with the synchronization positions thereof agreed with each other. The analog spread spectrum signals (I(A) and Q(A)) after the combination are converted by the A/D converters 205 to digital signals, respectively, thereby being outputted as digitized analog spread spectrum signals (I(D) and Q(D)).

The present embodiment is explained by taking as an example a case where the A/D converters 205 are provided on the output side of the RAKE combining part 204 in the data demodulating section 202 in the base band processing unit 200. Therefore, all operations performed in the base band processing unit 200 are basically analog signal processing operations.

The position of the A/D converters 205, however, is not specifically limited provided that it is positioned inside the base band processing unit 200, and various cases are acceptable. Thus, in the case where the A/D converters 205 are provided at a different position, operations performed by parts connected behind to the AD converters 205 are digital signal processing operations. Differences in functions and effects of the spread spectrum communication device due to the differences of the position of the A/D converters 205 will be described later.

Here, the base band processing unit 200 will be described in detail. Note that two lines indicative of signal lines are drawn in FIG. 1 since the analog spread spectrum signal is divided into the I signal component and the Q signal component, but since the I signal component and the Q signal component are subject to the same signal processing operation, one line is drawn as a signal line which is not particularly indicative of a signal line for the I signal component or a signal line for the Q signal component, in the Figs. referred to in the following description.

First of all, the synchronization acquiring section 201 composing the base band processing unit 200 is explained below.

Figure 5:
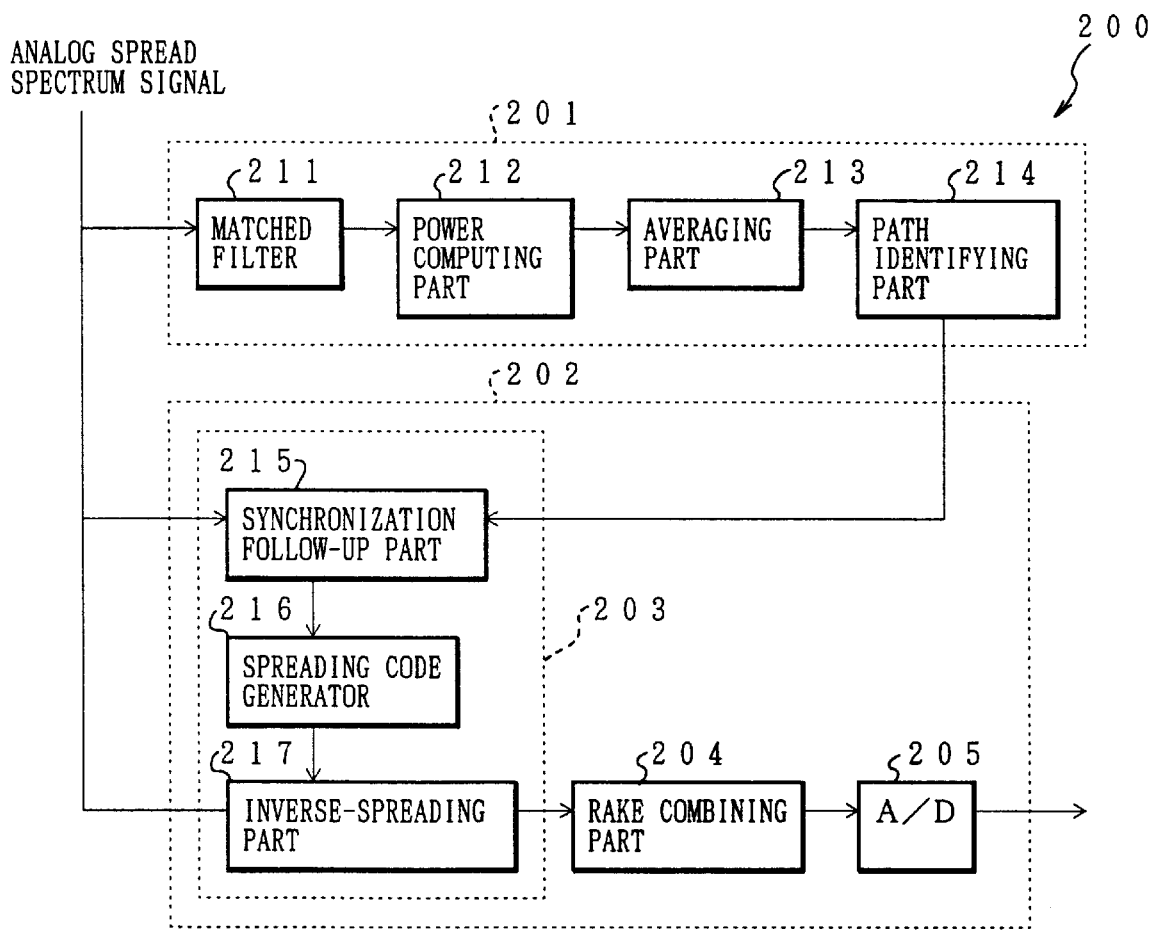
FIG. 5 is a block diagram illustrating a schematic arrangement of a base band processing unit provided in the spread spectrum communication device shown in FIG. 2.

The synchronization acquiring section 201 is, as described above, a circuit for acquiring synchronization positions of the PN codes from the analog spread spectrum signal, and as shown in FIG. 5, the section is equipped with a matched filter 211, a power computing part 212, an averaging part 213, and a path identifying part 214.

Figure 6:
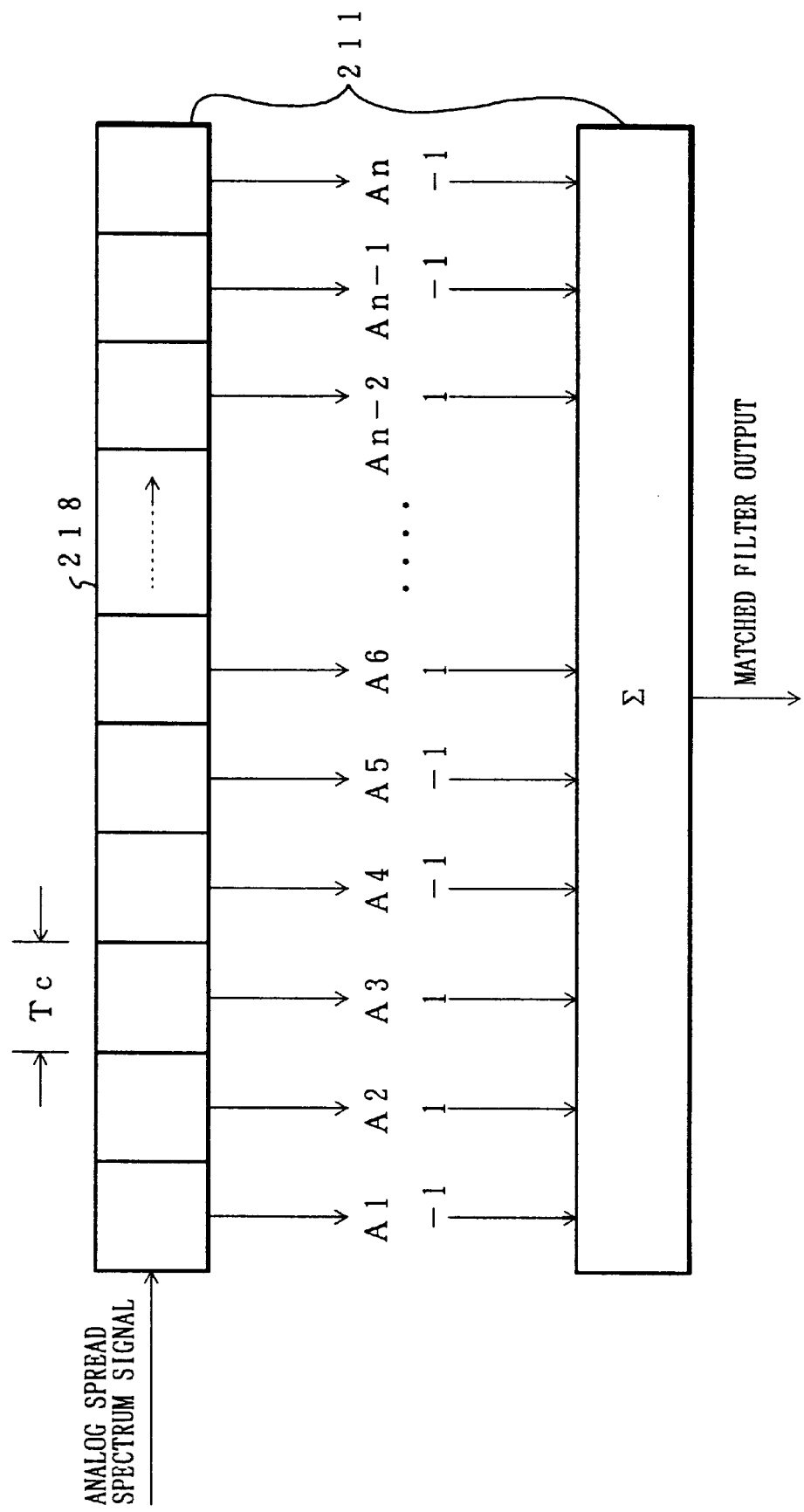
FIG. 6 is a block diagram illustrating a schematic arrangement of a matched filter provided in the base band processing unit shown in FIG. 5.

As shown in FIG. 6, the matched filter 211 performs initial lead-in of the analog spread spectrum signal by use of a multi-stage delay element 218.

A delay quantity of one delay element 218 is equal to a one-chip time length Tc of the PN code. An example of such delay element 218 is a shift register. Coefficients An, An−1, ... A1 for multiplying a register value, where n is set to the number of bits per one period of the PN code, are made to match the patterns of the PN codes. Therefore, the matched filter 211 is arranged so as to obtain a matched filter output by summing products of the register value and the coefficients.

Thus, when the analog spread spectrum signal is inputted to the matched filter 211, a peak of the analog spread spectrum signal appears in a period T of the PN code, if there are not multiple paths, but there is only one path. A time when the peak appears indicates an initial synchronization position of the analog spread spectrum signal and the PN codes.

The peak positions thus shown by the matched filter 211 indicate the synchronization positions of the PN codes and the analog spread spectrum signal. Incidentally, the analog spread spectrum signal generally reaches a reception antenna directly, as well as after being reflected by buildings and the like, and this means there are multiple paths. Therefore, the transmitted analog spread spectrum signal generally has a plurality of peak positions in the matched filter 211.

In the case where the paths are seven in number, for example, the greatest peak (P1), a second peak (P2), a third peak (P3), a fourth peak (P4), a fifth peak (P5), a sixth peak (P6), and a seventh peak (P7) are obtained, and it is necessary to find respective values of the peaks and compare them.

Squares of the matched filter outputs including the peak values P1, P2, P3, P4, P5, P6, and P7 are found by the power computing part 212. The power computing part 212 will be described later. To realize computation of squares of the outputs by analog processing, a multiplying circuit is used.

Here, a concrete example in which the matched filter 211 is embodied with an analog circuit is explained below. The matched filter formed with the analog circuit is hereinafter referred to as analog matched filter.

Figure 7:
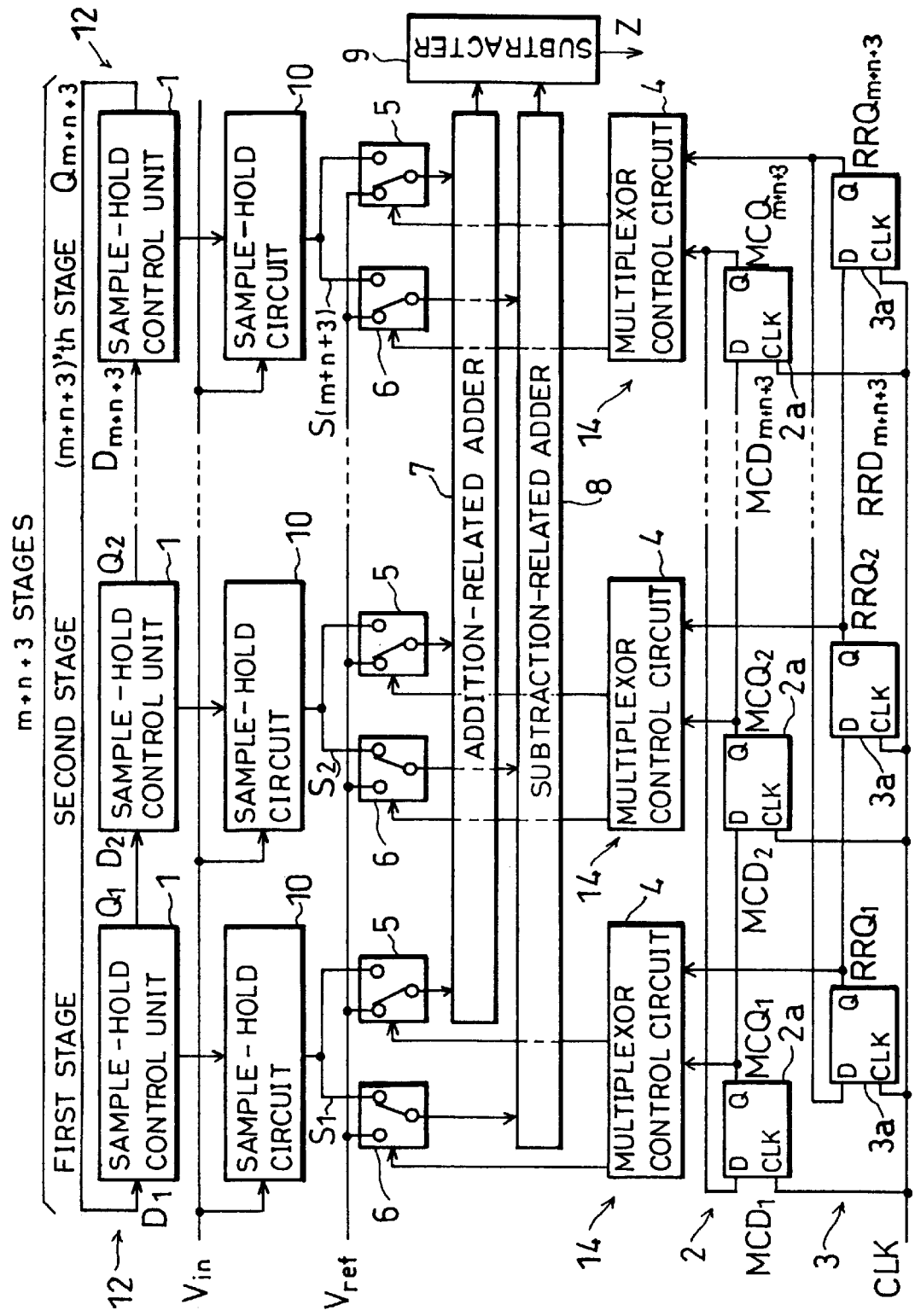
FIG. 7 is a view illustrating an example of a circuit which conducts an analog processing operation to realizes the operation of the matched filter shown in FIG. 6.
Figure 8:
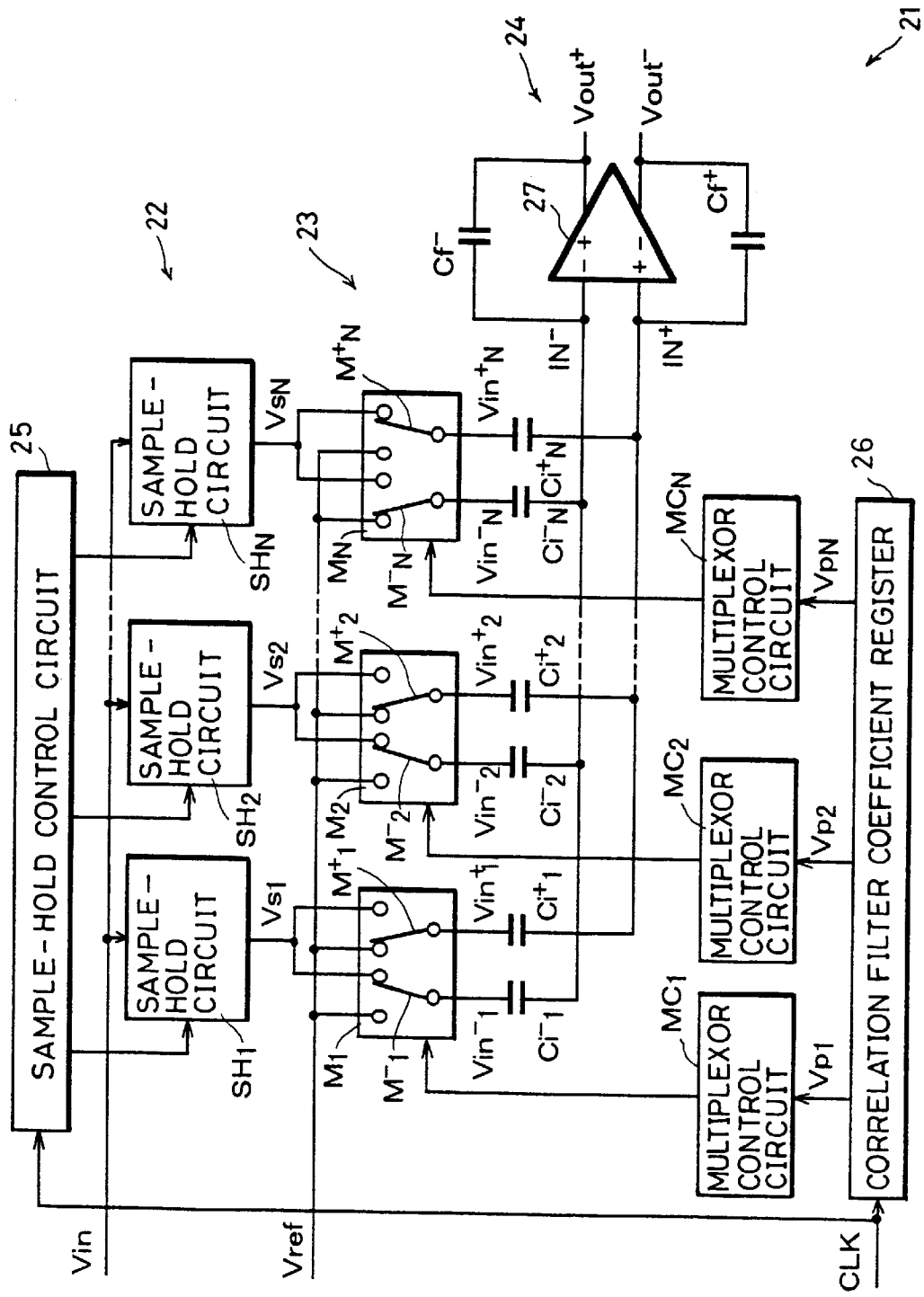
FIG. 8 is a view illustrating another example of the circuit which conducts an analog processing operation to realize the operation of the matched filter shown in FIG. 6.

The following description explains examples of the analog matched filter shown in FIGS. 7 and 8.

The analog matched filter shown in FIG. 7 is equipped with sample-hold circuits 10 each of which samples an input analog signal $V_{in}$ (analog spread spectrum signal) and holds it during a predetermined period. The sample-hold circuits 10 are connected with each other in parallel, and are arranged so as to, not only sample the input analog signal $V_{in}$ and hold it for a predetermined period, but also be refreshed.

Further, the analog matched filter is equipped with an addition-related adder 7, a subtraction-related adder 8, and a subtracter 9. The addition-related adder 7 is supplied with all outputs to be added in correlation operations, among the outputs of the sample-hold circuits 10. The subtraction-related adder 8 is supplied with all outputs to be subtracted in the correlation operation, among the outputs of the sample-hold circuits 10. The subtracter 9 subtracts the output of the subtraction-related adder 8 from the output of the addition-related adder 7, and outputs a subtraction result as a correlation output Z.

In the foregoing matched filter, a sample-hold control unit 1, an added-item integrating multiplexor 5, a subtracted-item integrating multiplexor 6, and a multiplexor control unit 14 are provided with respect to each of the sample-hold circuits 10. The sample-hold control unit 1 successively commands the refreshing, sampling, and holding operations to the sample-hold circuit 10. The added-item integrating multiplexor 5 is provided between the sample-hold circuit 10 and the addition-related adder 7 so that an output S of the sample-hold circuit 10 is supplied therethrough to the addition-related adder 7. The subtracted-item integrating multiplexor 6 is provided between the sample-hold circuit 10 and the subtraction-related adder 8 so that an output S of the sample-hold circuit 10 is supplied therethrough to the subtraction-related adder 8. The multiplexor control unit 14 controls the multiplexors 5 and 6.

As shown in FIG. 7, the multiplexors 5 and 6 have two input terminals each. One of the input terminals is supplied with the output S of the sample-hold circuit 10, whereas a predetermined reference voltage $V_{ref}$ is applied to the other input terminal. Incidentally, the reference voltage $V_{ref}$ is set to a level equal to the operational reference voltage of the adders 7 and 8. Therefore, in the case where the multiplexors 5 and 6 selects the reference voltage $V_{ref}$, the outputs of the multiplexors 5 and 6 do not affect the correlation operation result.

The sample-hold control units 1 are connected in cascade, and so are the multiplexor control units 14, so that an output of the sample-hold control unit 1 at the last stage is supplied to an input terminal of the ample-hold control unit 1 at the first stage, while an output of the multiplexor control unit 14 at the last stage is supplied to an input terminal of the multiplexor control unit 14 at the first stage. Therefore, the internal states in the control units 1 and 14 at a given stage are shifted rightwards every period of $T_O$ of the input clock CLK, thereby circulate. As a result, control with respect to the sample-hold circuit 10 and control with respect to the multiplexors 5 and 6 at a given stage are taken over by the succeeding stage every period $T_O$. Further, since the sample-hold circuits 10 of (m+n+3)(here 'm' is a maximum tap number, 'n' is a value corresponding to a time period which is required to refresh the sample-hold circuits) stages are installed, in the case where only a given stage is viewed, the sample-hold circuit 10 and the multiplexors 5 and 6 at the stage repeat the same operations in the period of (m+n+3)·$T_O$.

Each multiplexor control unit 14 is equipped with a D flip-flop 2a, a D flip-flop 3a, and a multiplexor control circuit 4. The D flip-flop 2a stores a correlation filter coefficient p which corresponds to an output S of the sample-hold circuit 10 at the same stage every period of the input clock CLK. The D flip-flop 3a stores an output suppressing register value indicative of whether or not the output S contributes correlation operations. The multiplexor control circuit 4 generates control signals which respectively control the multiplexors 5 and 6, based on the outputs of the flip-flops 2a and 3a.

With respect to the relationship between the multiplexor control units 14, an output terminal of the D flip-flop 2a of a given stage is connected with an input terminal of the D flip-flop 2a of the next stage, and an output terminal of the D flip-flop 2a of the last stage is connected with an input terminal of the D flip-flop 2a of the first stage. These D flip-flops 2a constitute a correlation filter coefficient register 2 that has a length of (m+n+3) stages and that is allowed to shift its states cyclicly every input clock CLK. Further, the D flip-flops 3a, which are connected in the same manner, constitute a sample-hold output suppressing register 3.

In the case where an output RRQi of the sample-hold output suppressing register 3 at the I-th stage (I=1, 2, . . . , m+n+3) is "0", the multiplexor control circuit 4 of the same stage causes the multiplexors 5 and 6 to select the reference voltage $V_{ref}$, regardless of an output MCQi of the correlation filter coefficient register 2 of the same stage.

With this, the output S of the same stage does not affect the correlation operation result. On the other hand, in the case where the output RRQi is "1", the multiplexor control circuit 4 causes the multiplexors 5 and 6 to select either the output S or the reference voltage $V_{ref}$, based on the output MCQi.

As a result, the output S of the sample-hold circuit 10 is directed to either the addition-related adder 7 or the subtraction-related adder 8, based on the state of the correlation filter coefficient register 2 of the same stage.

A correlation filter coefficient sequence P(t) is stored in the correlation-filter coefficient register 2 of "t" number of successive stages. Besides, "1" is stored in each of the sample-hold output suppressing registers 3 of the same t successive stages, and "0" is stored in each of the sample-hold output suppressing registers 3 of the rest of the stages. Thus, even in the case where the period t of the correlation filter coefficient sequence P(t) is less than the maximum tap number m, accurate correlation operations can be carried out by using only the sample-hold circuits 10 of "t" number of stages that contribute to the correlation operations.

Further, among the sample-hold control units 1 of the (m+n+3) stages constituting the sample-hold control register 12, those of "(n+3)" number of successive stages have "1" stored in each, and those of the remaining "m" number of stages have "0" stored in each. Therefore, the output Qi of the sample-hold control unit 1 at the i'th stage varies in a period of (m+n+3)·Tc, and takes "0" during the period m·Tc, while taking "1" during the period (n+3)·Tc.

The sample-hold control unit 1 at each stage commands the refreshing and sampling operations to the corresponding sample-hold circuit 10 during the period (n+3)·Tc, and also commands the holding operation during the period m·Tc, based on the output Qi, etc., at the corresponding stage.

Therefore, the analog signal $V_{in}$ at a given time is acquired by the same sample-hold circuit 10 during the period m·Tc, and is subjected to a correlation operation with the correlation filter coefficient sequence P(t) that is shifted by one position every time a new input clock CLK was inputted thereto. However, in the case where the period t of the correlation filter coefficient sequence P(t) is less than the maximum tap number m, the outputs of the sample hold circuits 10 of "(m−t)" number of stages are controlled by the sample-hold output suppressing register 3, so as not to contribute to the correlation operations.

Thus, the analog matched filter arranged as above includes sample-hold circuits 10 connected in parallel, which are more than the maximum tap number of the correlation operation, and a portion of the analog matched filter composed of a greater number of the sample-hold circuits 10 than the number of the maximum tap number performs a refreshing operation so that the analog matched filter is driven with a low power consumed for compensating an offset voltage.

Furthermore, the analog matched filter shown in FIG. 8 includes a sample-hold section 22, a selecting section 23, and an adder 24. The sample-hold section 22 outputs a sampled value of the analog input signal $V_{in}$ (analog spread spectrum signal) every time a clock CLK is inputted. The selecting section 23 determines whether an output of the sample-hold section 22 should be added or subtracted, according to a correlation filter coefficient sequence P stored in a correlation filter coefficient register 26 which will be described later. The adder 24 is a capacitive coupling type for differential input and differential output, which adds outputs of the selecting section 23. Thus, the matched filter 21 computes a value of correlation between the analog input signal $V_{in}$ and the correlation filter coefficient sequence P, each time a new input clock CLK is inputted thereto, and outputs the value as a correlation output $V_{out}$.

In the sample-hold section 22, sample-hold circuits $SH_1$ through $SH_N$ are provided, which are connected in parallel. The sample-hold circuits $SH_1$ through $SH_N$ sample the analog input signal $V_{in}$ in response to a command of the sample-hold control circuit 25, and hold respective sampled values at least while the correlation filter coefficient sequence P shifts till it backs to an initial state, that is, while at least m number of the input clocks CLK are inputted. Incidentally, in the following description, regarding the members which are provided in plural, they are referred to without subscriptions indicative of their positions, like "sample-hold circuits SH", in the case where positions thereof do not matter or in the case where they are collectively referred to.

The number N of the sample-hold circuits SH is set greater than m indicative of the length of the correlation filter coefficient sequence P, and the sample-hold control circuit 25 commands sampling of the analog input signal $V_{in}$ to the sample-hold circuits SH which do not hold sampled values for use in the next correlation operation, each time a new input clock CLK is inputted.

For example, the number N of the sample-hold circuits SH is set to about 10 to 512, so as to be equal to the sequence length m of the correlation filter coefficient sequence P for use in spectrum spreading, or so as to be a certain number greater than m. In the present embodiment, the sample-hold control circuit 25 commands a sampling and holding operation to each sample-hold circuit SH by shifting the command to the sample-hold circuits SH from a given stage to the next stage each time a new input clock CLK is inputted.

Thus, the sample-hold section 22 is capable of holding and outputting at least m number of sampled values. Here, with the aforementioned arrangement, the sampling cycle of the sample-hold circuits SH is longer than a time for a full circulation of the input clock CLK correlation filter coefficient sequence P. Therefore, as compared with the case where the sample-hold circuits SH are connected in cascade, power consumption is suppressed, while precision in operation is improved.

The selecting section 23 includes multiplexor pairs $M_1$ through $M_N$ which correspond to the sample-hold circuits SH respectively, a correlation filter coefficient register 26 for storing a correlation filter coefficient sequence P, and multiplexor control circuits $MC_1$ through $MC_N$ for controlling the multiplexor pairs M according to commands of the correlation filter coefficient register 26.

The correlation filter coefficient register 26 is a shift register which is composed of registers (not shown) corresponding to the sample-hold circuits $SH_1$ through $SH_N$, respectively, and which causes a value of each register to shift by one stage, each time a new input clock CLK is inputted. By so doing, in the present period of the input clock CLK, control signals $Vp_1$ through $Vp_N$ indicative of correspondence between the sample-hold circuits SH and the correlation filter coefficient sequence P are supplied to the multiplexor control circuits $MC_1$ through $MC_N$, respectively.

Further, each multiplexor pair M is composed of a multiplexor $M^+$ and a multiplexor $M^-$ each having two input terminals. Each of the multiplexors $M^+$ and $M^-$ selects and outputs either an output signal $V_s$ of its corresponding sample-hold circuit SH or the reference voltage $V_{ref}$, according to the command of its corresponding multiplexor control circuit MC.

For example, in the present period, in the case where among the correlation filter coefficient sequence P, a value of a coefficient p corresponding to the sample-hold circuit $SH_1$ is indicative of addition of an output signal $V_{s1}$, like "1", the multiplexor $M^+_1$ outputs the output signal $V_{s1}$ of the sample-hold circuit $SH_1$, whereas the multiplexor $M^-_1$ outputs the reference voltage $V_{ref}$. On the other hand, the value of the corresponding coefficient p is indicative of subtraction of the output signal $V_{s1}$, like "0", the multiplexor control circuit $MC_1$ causes the multiplexor $M^+_1$ to output the reference voltage $V_{ref}$, while causing the multiplexor $M^-_1$ to select the output signal $V_{s1}$.

Incidentally, in the case where the number N of the sample-hold circuits SH is greater than m indicative of the sequence length of the correlation filter coefficient sequence P, each sample-hold circuit SH falls, during a certain period, in a state where no corresponding coefficient p exists. During this period, both the multiplexors $M^+$ and $M^-$ output a reference voltage $V_{ref}$ each, according to the command of the multiplexor control circuit MC. Here, during the period, the output signals $V_s$ of the sample-hold circuits SH are not transmitted to behind the multiplexor pair M. Therefore, an operation which tends to destabilize the output signal $V_s$, such as refreshing or sampling, is preferably carried out during this period, since by so doing, such operations as refreshing and sampling are conducted without adversely affecting the correlation value.

On the other hand, the adder 24 in accordance with the present embodiment is provided with an amplifier 27 which is a difference input-difference output type. A feedback capacitor $Cf^-$ is provided between an inverting input terminal and a non-inverting output terminal of the amplifier 27, and a non-inverting input terminal and an inverting output terminal are connected with each other with a feedback capacitor $Cf^+$ provided therebetween. Moreover, input capacitors $Ci^-_1$ through $Ci^-_N$ are provided between the inverting input terminal IN of the amplifier 27 and the outputs $Vin_1$ through $Vin^+_n$ multiplexors $M^-$, respectively, so that the outputs $Vin_1$ through $Vin^+_n$ of the addition-related multiplexors $M^+$ are supplied to the non-inverting input terminal IN of the amplifier 27 through the corresponding input capacitors $Ci^+_1$ through $Ci^+_N$, respectively.

The analog matched filter 21 thus arranged uses the adder of the difference input-different output type, thereby not necessitating a code inverting circuit. Thus, a matched filter whose circuit scale and power consumption are small and which is capable of high-speed operation is realized.

Generally, power consumed by the matched filter accounts for about 60 percent of the total power consumed by the base band processing unit. Therefore, by realizing the matched filter with use of an analog circuit, power consumption can be drastically suppressed, as compared with the case where the matched filter is formed with use of a digital circuit which consumes much power.

Therefore, in the spread spectrum communication device of the present invention, as described above, at least the matched filter of the base band processing unit is formed with an analog circuit.

The power computing part 212 finds a power value of the analog spread spectrum signal inputted thereto, by finding a square of an output (peak value) of the matched filter 211. In the case where signals processed by the matched filter 211 include the I signal component and the Q signal component, the power computing part 212 finds the power value of the analog spread spectrum signal inputted thereto, by finding $I^2+Q^2$ from respective peak values of the I and Q signal components.

In the case where a square of an output value of the matched filter 211 is found by analog processing, either a multiplying circuit, or a comparing circuit and an adding circuit disclosed in the Japanese Publication for Laid-Open Patent Application No. 97299/1997 (Tokukaihei 9-97299) can be adapted to be used as the power computing part 212.

Particularly in the case where an analog signal processed by the matched filter 211 includes an I signal component and a Q signal component, the signal processing circuit disclosed in Tokukaihei 9-97299 is preferably adapted to be used as the power computing part 212.

Figure 9:
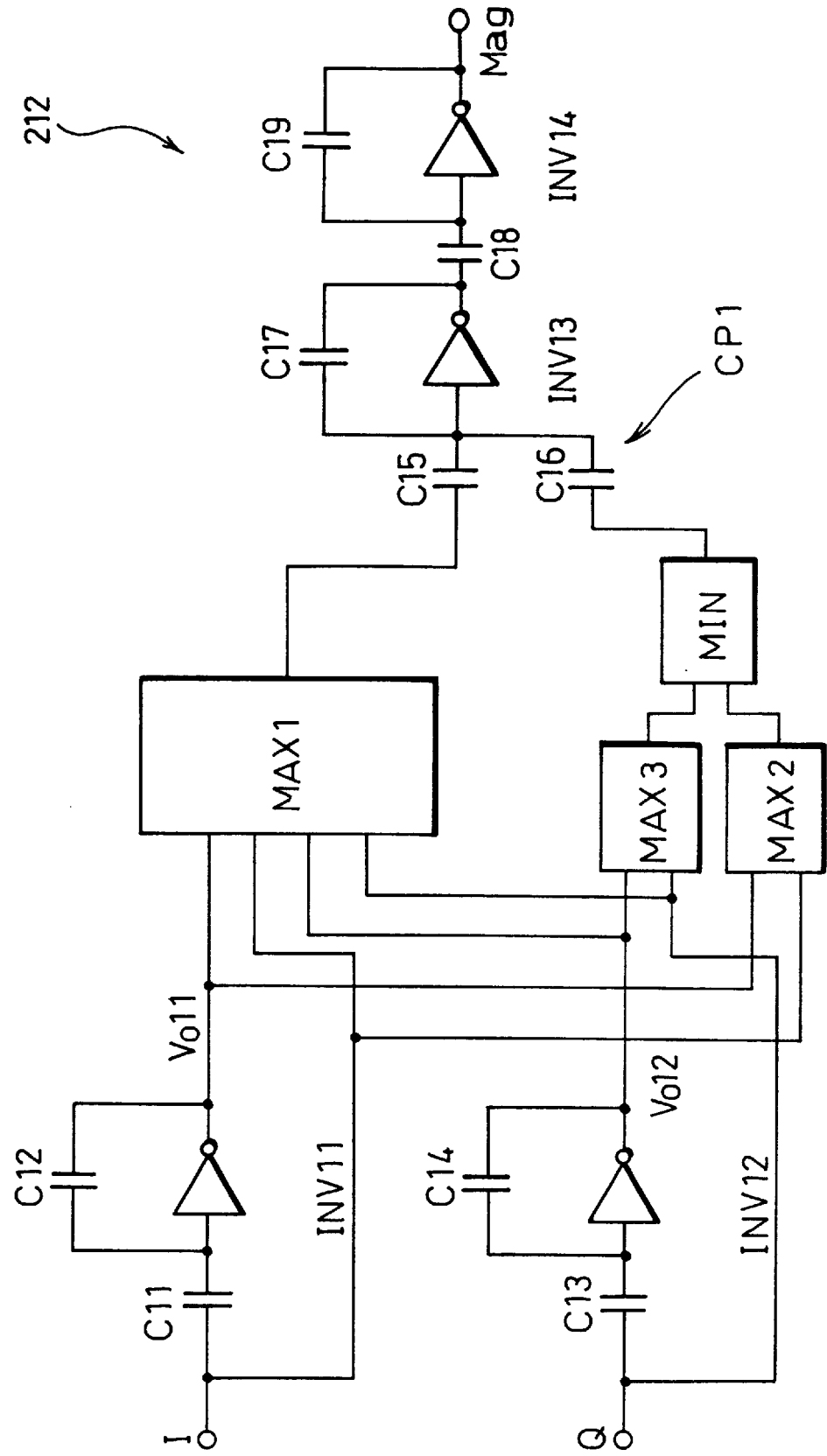
FIG. 9 is a view illustrating an example of a circuit adaptable so as to be used as the power computing part provided in the base band processing unit shown in FIG. 5.

The power computing part 212 is arranged so that the I signal component and the Q signal component are supplied to an inverting circuit INV11 and an inverting circuit INV12, respectively, as shown in FIG. 9.

An input terminal of the inverting circuit INV11 is connected with an input capacitor C11 so that the I signal component is supplied to the inverting circuit INV11 through the input capacitor C11. An output Vo11 of the inverting circuit INV11 is supplied to the input terminal of the inverting circuit INV11 through a feedback capacitor C12.

On the other hand, an input terminal of the inverting circuit INV12 is connected with an input capacitor C13 so that the Q signal component is supplied to the inverting circuit INV12 through the input capacitor C13. An output Vo12 of the inverting circuit INV12 is supplied to the input terminal of the inverting circuit INV12 through a feedback capacitor C14.

The I signal component, the Q signal component, the output Vo11, and the output Vo12 are supplied to a maximum outputting circuit MAX1. The I signal component and the output Vo11 are also supplied to a maximum outputting circuit MAX2. The Q signal component and the output Vo12 are also supplied to a maximum outputting circuit MAX3. Further, respective outputs of the maximum outputting circuit MAX2 and the maximum outputting circuit MAX3 are supplied to a minimum outputting circuit MIN.

Outputs of the MAX1 and the MIN are supplied to a capacitor C15 and a capacitor C16 of a capacitive coupling circuit CP1, respectively. An output of the capacitive coupling CP1 is supplied to an inverting circuit INV13. The inverting circuit INV13 is arranged in the same manner as the inverting circuit INV11, and an output of the inverting circuit INV13 is supplied to an input terminal thereof through a feedback capacitor C17.

Further, an output of the inverting circuit 13 is also supplied to an inverting circuit INV14 through a capacitor C18, and an output of the inverting circuit INV14 is supplied to an input terminal thereof through a feedback capacitor C19.

In the power computing part 212 arranged as above, two inputs, that is, the I signal component and the Q signal component, are transformed into one signal Mag and outputted. The signal Mag is used as a power value of a certain path.

Thus, a peak value of each path can be found by the matched filter 211 and the power computing part 212. Since noise is contained in the analog spread spectrum signal, however, it is preferable to find peaks during a period several times (for example, 3 to 10 times) the period T of the PN code. By averaging the peaks synchronized at the period T of the PN code, the noise can be reduced, whereby peaks more reliably indicative of synchronization positions can be found out.

Such averaging of the peak values of the matched filter outputs for several periods is carried out by an averaging part 213. The output of the matched filter is a power value found by the power computing part 212.

Figures 10A, 10B:
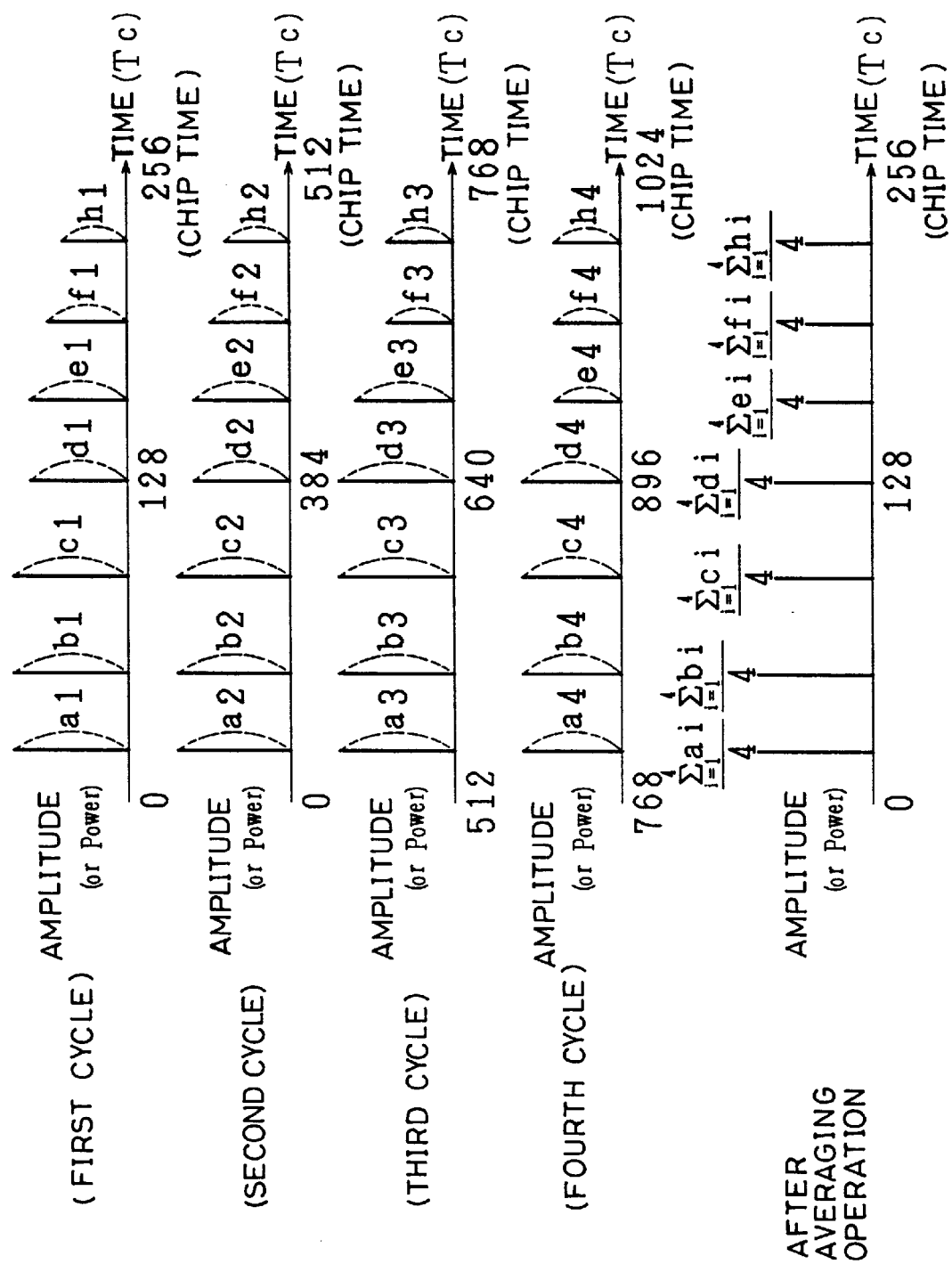
FIGS. 10(a) and 10(b) are explanatory views illustrating an averaging operation.

Here, the following description will explain an averaging operation by the averaging part 213, while referring to FIGS. 10(a) and 10(b). Here, let the number of peaks per one period be 7, the number of periods, 4, and each period has 256 taps.

The averaging part 213 adds amplitudes (power values) at the peaks, period by period (256 taps in this case), and divides added value of each peaks by the number of periods, so that respective averaged amplitudes (power value) at the peaks in 0 to 256 chip times are obtained.

More specifically, in the case where the peaks have seven amplitudes (power values) ai through hi (i=1, 2, 3, 4) respectively in each period as shown in FIG. 10(a), each averaged amplitude of the periods is found with respect to each peak, as shown in FIG. 10(b).

Figure 11:
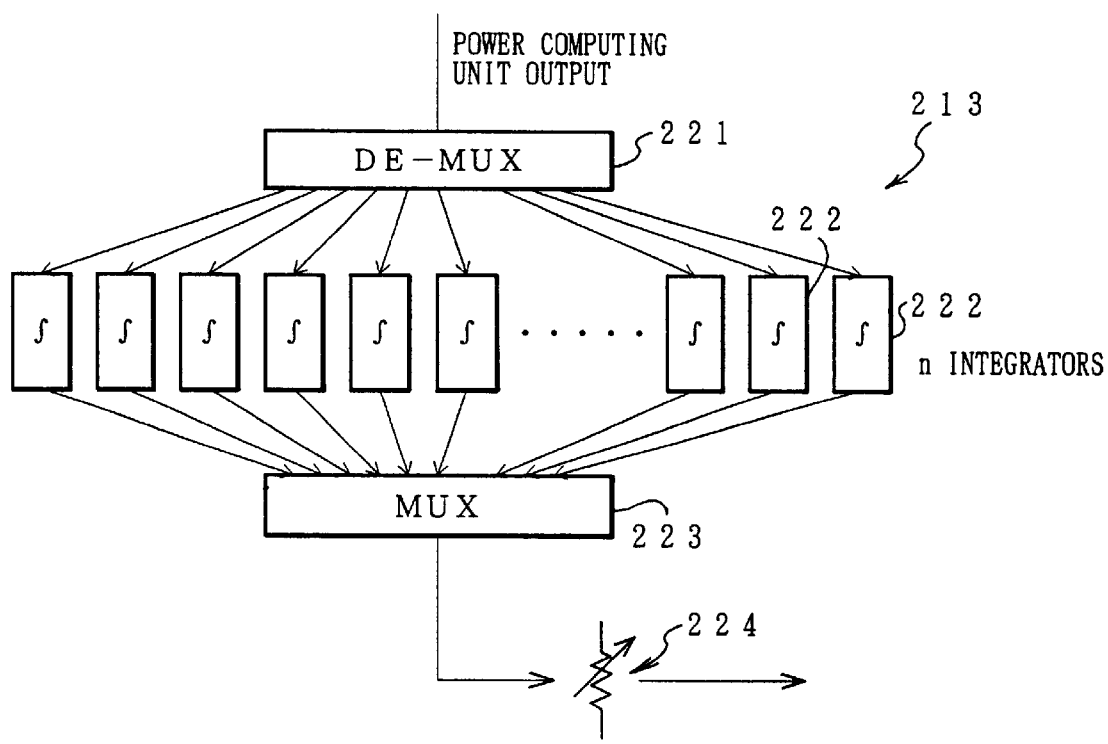
FIG. 11 is a view illustrating an example of a circuit adaptable so as to be used as the averaging part provided in the base band processing unit shown in FIG. 5.

To realize the averaging part 213 with an analog processing circuit, the following members are used as shown in FIG. 11: a de-multiplexor (DE-MUX) 221 for separating a power value supplied from the power computing part 212 into values of respective peaks; an n number of integrators (integrating circuits) 222 for carrying out integration with respect to outputs of the de-multiplexor 221 for several periods T of the PN code; a multiplexor (MUX) 223 for summing the outputs of the one by one; and a variable resistor 224 for averaging outputs of the multiplexor 223.

According to the averaging part 213 thus arranged, outputs of the matched filter 211 (a power value found by the power computing part 212) outputted during each one-chip time length TC is separated and directed to the n integrators 222 by the de-multiplexor 221. More specifically, an output of the matched filter 211 is supplied to each of the integrators 222 once per period T of the PN code. This operation is repeated 3 to 10 times (3 to 10 periods), so that matched filter's outputs for 3 to 10 periods are integrated in each integrator 222, and then, the integrated results are selected one by one by the multiplexor 223. Thereafter, each of the selected results is divided (subject to a dividing operation) by the variable resistor 224, so that the divided result is outputted as an average of the peak values.

The peak value thus averaged through the matched filter 211, the power computing part 212, and the averaging part 213 is sent to a path identifying part 214. The path identifying part 214 is a part for identifying a path indicative of a synchronization position by referring to the peak value inputted thereto.

Figure 12:
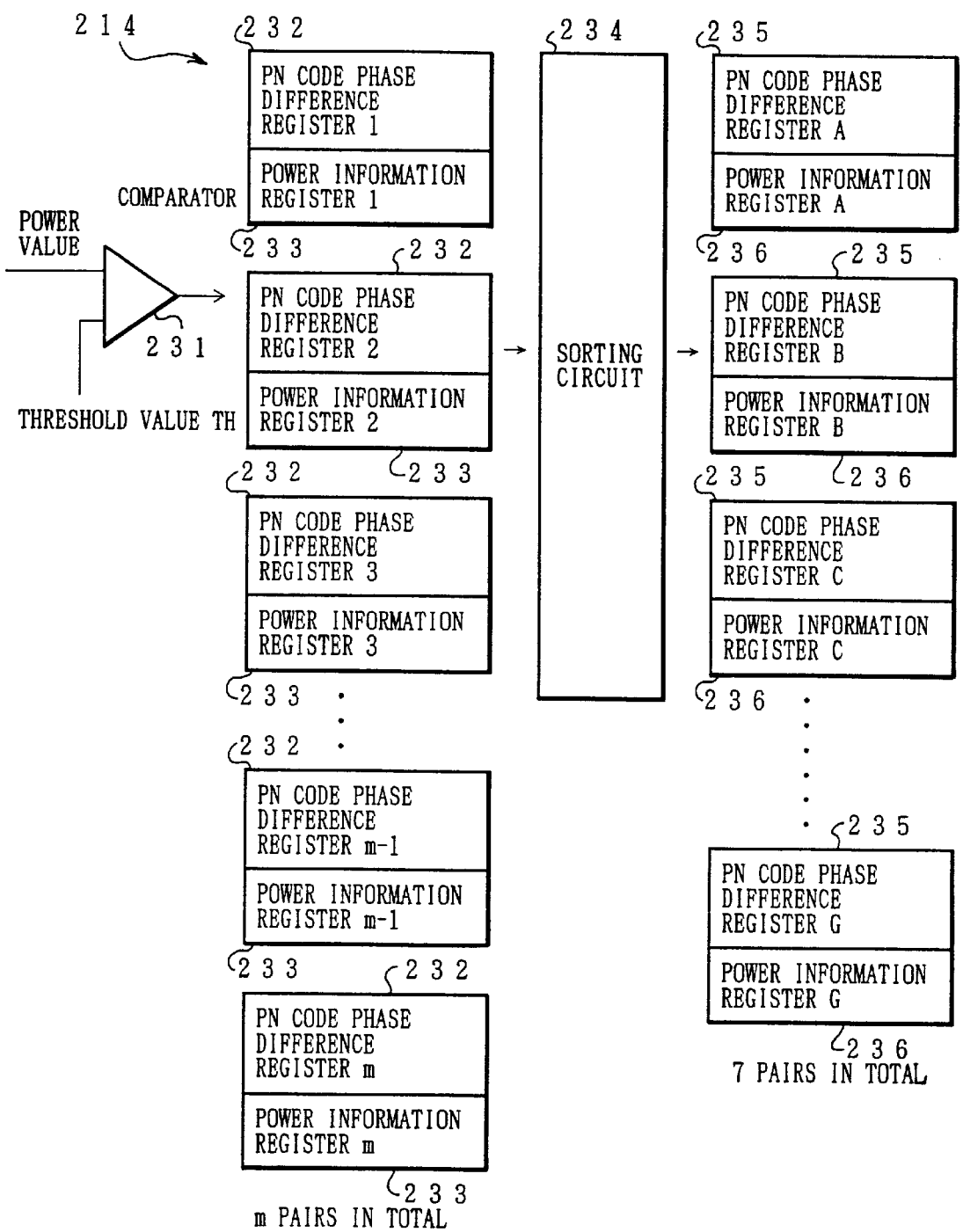
FIG. 12 is a view illustrating an example of a circuit adaptable so as to be used as the path identifying part provided in the base band processing unit shown in FIG. 5.

To realize the path identifying part 214 with an analog processing circuit, a circuit as shown in FIG. 12, for example, is adapted. Here, an averaged peak value is supplied to the path identifying part 214 from the averaging part 213, but this peak value is an average of power values of the paths. Therefore, in the following description, the power value is used instead of the peak value.

The path identifying part 214 as shown in FIG. 12 is equipped with a comparator 231, at most "m" number of PN code phase difference registers 232-n (n=1, . . . , m), a power information register 233-n (n=1, . . . , m), a sorting circuit 234, and PN code phase difference registers R235 which are, for example, seven in number (R=A, B, . . . , G), and seven power information registers R236 (R=A, B, . . . , G). The comparator 231 compares an inputted power value with a predetermined value (a threshold value). The power information registers 233-n store power values corresponding to the PN code phase difference registers 232-n, respectively. The sorting circuit 234 obtains the greatest through, for example, seventh greatest power values so that these power values are identified with phase difference information of the paths with the greatest through seventh greatest power values. The power values thus identified by the sorting circuit 234 are stored in the seven PN code phase difference registers R235 (R=A, B, . . . , G) and the seven power information registers R236 (R=A, B, . . . , G), respectively.

More specifically, in the path identifying part 214 thus arranged, power values and the threshold value are inputted to the comparator 231, where a threshold processing operation is performed so that paths for use in the path identifying operation, which are not more than m in number, are selected. After completion of the threshold processing operation by the comparator 231, the phase differences and the power values of the paths thus selected as candidates of the multiple paths are stored in m PN code phase difference registers 232-n (n=1, . . . , m) and m power information registers 232-n (n=1, . . . , m), respectively.

Next, the greatest through, for example, seventh greatest power values are found by the sorting circuit 234, and the power values and the phase difference information of the paths having the greatest through seventh greatest power values are identified with each other by the sorting circuit 234. The identified phase difference information and power values are stored in the seven PN code phase difference registers R235 (R=A, B, . . . , G) and the seven power information registers R236 (R=A, B, . . . , G), respectively, and thereafter, they are supplied to the data demodulating section 202.

To realize the sorting circuit 234 with an analog signal processing circuit, a WTA (winner take all) circuit, for example, may be used.

The WTA circuit is a circuit which detects, with respect to an analog input signal with a plurality of channels, a maximum value or a minimum value thereof in analog. More specifically, in response to input of an "m" number of power values obtained, the WTA circuit operates until the greatest to seventh greatest values are determined, and identifies the greatest to seventh greatest values, and then, the path identifying part 214 sends to the data demodulating section 202 the power values and phase differences corresponding to the power values.

Those disclosed by the Japanese Publications for Laid-Open Patent Applications No. 321747/1996 (Tokukaihei 8-321747) and No. 229970/1997 (Tokukaihei 9-229970) are suitably applied as the WTA circuit.

Tokukaihei 8-321747 discloses a circuit (WTA circuit) in a simple arrangement without an A/D converter, which can, regarding an analog input signal with a plurality of channels, directly judge which channel corresponds to the maximum value or the minimum value.

Tokukaihei 9-229970 discloses a circuit (WTA circuit) which can easily conduct offset compensation for comparators, by using a switched capacitor.

Figure 13:
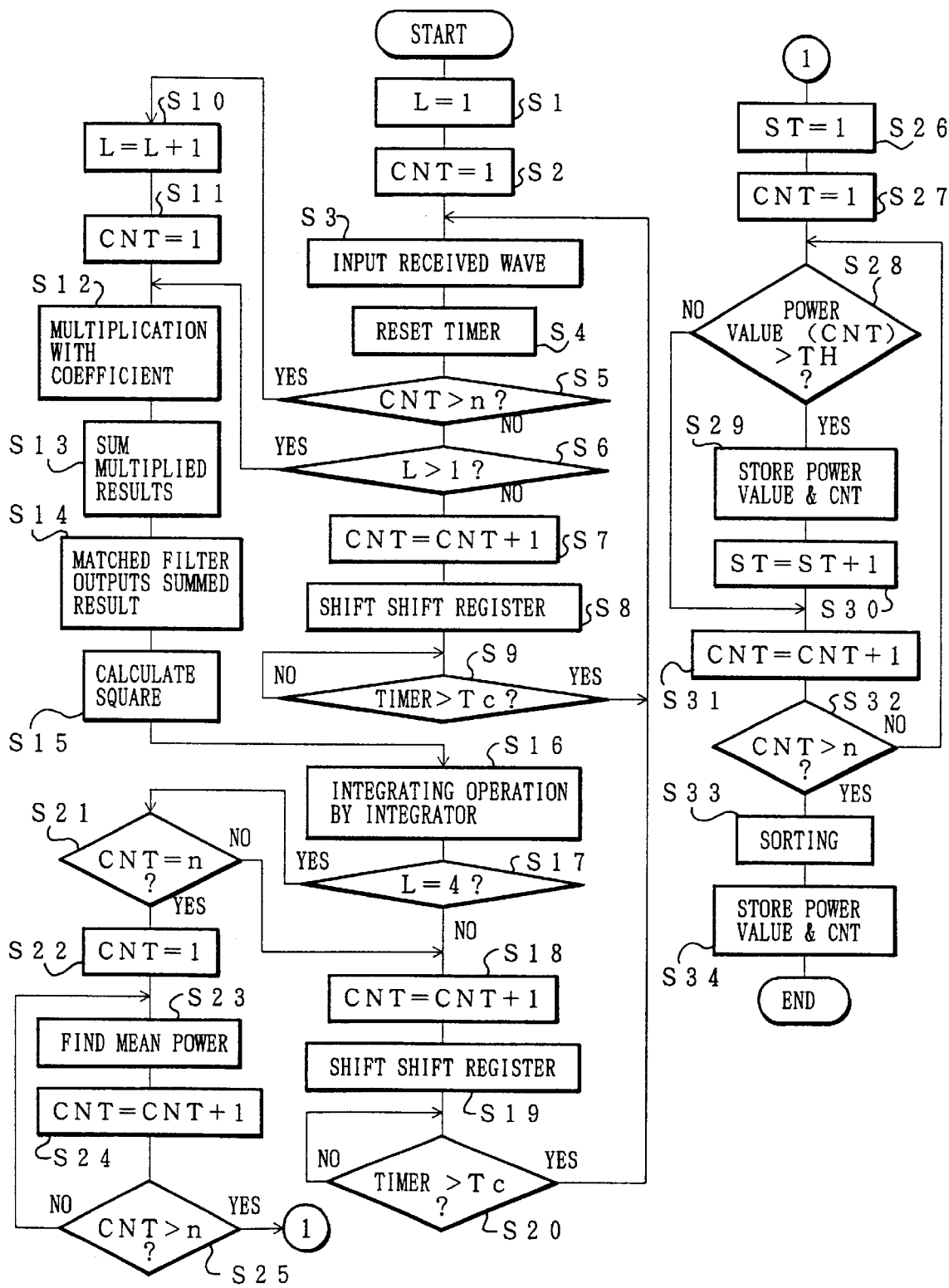
FIG. 13 is a flowchart showing a flow of a processing operation by the synchronization acquiring section in the base band processing unit shown in FIG. 5.

The following description will explain a signal processing process of the synchronization acquiring section 201, while referring to a flowchart shown in FIG. 13.

As shown in FIG. 13, "L" indicative of period is set to "1" in response to start of the processing operation (step S1). Here, L=1 means that the period currently subject to processing is the first period.

Next, "CNT" indicative of which a set of data is currently processed is set to "1", which means that the first set of data is processed (step S2).

Subsequently, when a received wave is inputted (step S3), the received wave is supplied to a shift register of the matched filter 211 every one-chip time length Tc. Therefore, in response to the input of the received wave, timer reset is conducted simultaneously (step S4).

Then, whether or not CNT is greater than n is judged (step S5). Here, in the case where CNT is not greater than n, the flow proceeds to the step S6, whereas in the case where CNT is greater than n, the flow proceeds to the step S10.

At the step S6, whether or not L indicative of period is greater than 1 is judged. Here, in the case where L is greater than 1, the flow proceeds to the step S12, whereas in the case where L is 1, the flow proceeds to the step S7.

More specifically, at the steps S5 and S6, it is checked whether or not the set of data currently processed is one of the first through nth sets of data in the first period, and if it is so, CNT is incremented at the step S7, and a shifting operation is conducted with respect to the shift register at the step S8. Then, when elapse of a one-chip time length Tc is indicated by the timer at the step S9, the flow returns to the step S3, and the next input of the received wave is carried out.

In the receiving operation with respect to the first period (n taps per one period), the received wave is inputted to all the "n" number of the registers of the matched filter 211 through the process of the steps S3 through S9.

In the case where CNT=n+1 at the step S5, the flow proceeds to the step S10, and L indicative of period is incremented.

Then, "CNT" indicative of which set of data in the period L is currently processed is again set to "1" (step S11). Subsequently, the flow proceeds to a step S12.

Subsequently, in the case where it is judged at the step S6 that input of the received wave is conducted with respect to the second period (L=2), an "n" number of register values are multiplied by coefficients A1, A2, A3, A4, . . . , An−2, An−1, and An, respectively at the step S 12. Here, the coefficients multiplied with the register values are previously set so as to match the pattern of the PN code.

Then, the "n" number of multiplied results are summed (step S13), and a summed result is outputted (step S14).

Next, a square of the outputted value is calculated, so that a power value is obtained (step S15). Incidentally, here, let outputs of the matched filter to be averaged be outputs thereof corresponding to three periods of the PN code, and after a power value is supplied to a "CNT"'th integrator (or adder) among the "n" number of integrators (or adders) at the step S16, the power values are subject to an integrating operation (or an adding operation).

Thereafter, whether or not L=4 is judged (step S17). In other words, whether or not the period currently under the processing is the fourth period is judged. Here, in the case where it is the fourth period, the flow proceeds to the step S21, whereas in the case where it is not the fourth period, CNT is incremented (step S18).

After CNT is incremented at the step S18, a shifting operation is conducted with respect to registers of the shift register to which the received wave is inputted (step S19). When elapse of a one-chip time length Tc is indicated by the timer at the step S20, the flow returns to the step S3, and the next input of the received wave is carried out. Thus, input of the received wave of four periods is conducted, and values corresponding to the second, third and fourth periods are averaged (the set of inputted data of the first period is used as initial values by the "n" number of the registers of the matched filter, and is not outputted).

In the case where it is judged at the step S17 that the data of the period currently processed is those of the fourth period, whether or not CNT=n is judged at the step S21. In the case where it is not so, the flow proceeds to the aforementioned step S18.

On the other hand, if CNT=n is judged at the step S21, CNT is set to 1 (step S22).

Then, in the case where it is judged at the steps S17 and S21 that the set of data currently subject to the processing is the nth set of data of the fourth period, CNT is set to the initial value (CNT=1) (step S22), and mean power, or an averaged power value, is found (step S23). More specifically, each output value of the integrators (adders) is divided by three at the step S23, so that an average of the power values of outputs of the matched filter for three periods is obtained. Subsequently, the value of CNT is incremented (step S24), and whether or not the value of CNT is greater than n is judged (step S25).

Through a loop of the aforementioned steps S23 through S25, an average power value is obtained from each of the "n" number of integrators. Then, in the case where it is judged at the step S25 that CNT is greater than n, that is, averaged power values are obtained from all the "n" number of integrators, the flow proceeds to the step S26.

At the steps S26 and S27, the threshold processing with respect to the power values is initialized. To be more specific, a register number ST is set to 1 at the step S26, and CNT is again set to 1 at the step S27.

Subsequently, each power value (CNT) (the power value corresponding to a current value of CNT is hereinafter referred to as "power value (CNT)") is compared with a predetermined threshold value TH so that whether or not the power value is greater than the threshold value TH is judged (step S28). The threshold value TH is set so that the number of values to be used in determination is not greater than m. Here, in the case where a power value (CNT) is greater than the threshold value TH, the power value is stored in a power information register corresponding to a current register number ST (hereinafter referred to as "power information register (ST)") at the step S29, whereas the current CNT is stored in a PN code phase difference register corresponding to the current register number ST (hereinafter referred to as "PN code phase difference register (ST)") at the same step. After these values are stored, ST indicative of the register number is incremented at the step S30. Subsequently, CNT is incremented (step S31), and whether or not CNT is greater than n is judged (step S32).

Thus, through a loop of the steps S28 through S32, the threshold processing is carried out with respect to all the n average power values.

Then, in the case where it is judged at the step S32 that CNT is greater than n, i.e., that the threshold processing is carried out with respect to all the n average power values, a sorting operation is conducted with respect to power information stored in the power information registers (step S33). More specifically, comparison of power information by the comparator 231 of the path identifying part 214 and sorting by the sorting circuit 234 are performed with respect to the power information.

When the sorting at the step S33 finishes, the power values and the CNT values are stored in order of magnitude of the power values (step S34).

To be more specific, the maximum power value is stored in power information register A in the path identifying part 214, while the CNT value corresponding to the power value is stored in the PN code phase difference register A. Subsequently, the second greatest power value is stored in the power information register B, while the CNT value corresponding to the power value is stored in the PN code phase difference register B. Subsequently, the third greatest power value is stored in the power information register C, while the CNT value corresponding to the power value is stored in the PN code phase difference register C. Likewise, the fourth, fifth, and sixth greatest power values are stored in the power information registers D, E, and F, respectively, while the CNT values corresponding to the power values are stored in the PN code phase difference registers D, E, and F, respectively. Lastly, the seventh greatest power value is stored in the power information register G, while the CNT value corresponding to the power value is stored in the PN code phase difference register G, and then, the synchronization acquiring operation is perfected.

The following description will explain the data demodulating section 202. In the data demodulating section 202, the demodulator circuits 203, the RAKE combining part 204, and the A/D converter 205 are installed, as shown in FIG. 5.

Each demodulator circuit 203 is composed of a synchronization follow-up part 215, a spreading code generator 216, and an inverse-spreading part 217. In the data demodulating section 202, seven of the demodulator circuits 203 are provided as shown in FIG. 1, so as to correspond to at most seven paths, respectively. Incidentally, FIG. 5 shows only one demodulator circuit 203 for conveniences' sake.

To be more specific, in the data demodulating section 202, phase difference information and power values outputted from the path identifying part 214 of the synchronization acquiring section 201 are supplied to the synchronization follow-up part 215 of the data demodulating section 202, and are used as synchronization signals of the spreading code generator 216 for respective paths, and as weights used in combination by the RAKE combining part 204.

Incidentally, as synchronization positions are thus successfully found by the aforementioned synchronization acquiring section 201, a device for performing mode change and fine adjustment of the synchronization system is preferably provided to observe and correct the synchronization positions so that the synchronization positions are not lost due to noise in the subsequent process. Such a device is the synchronization follow-up part 215 provided in the data demodulating section 202.

Figure 14:
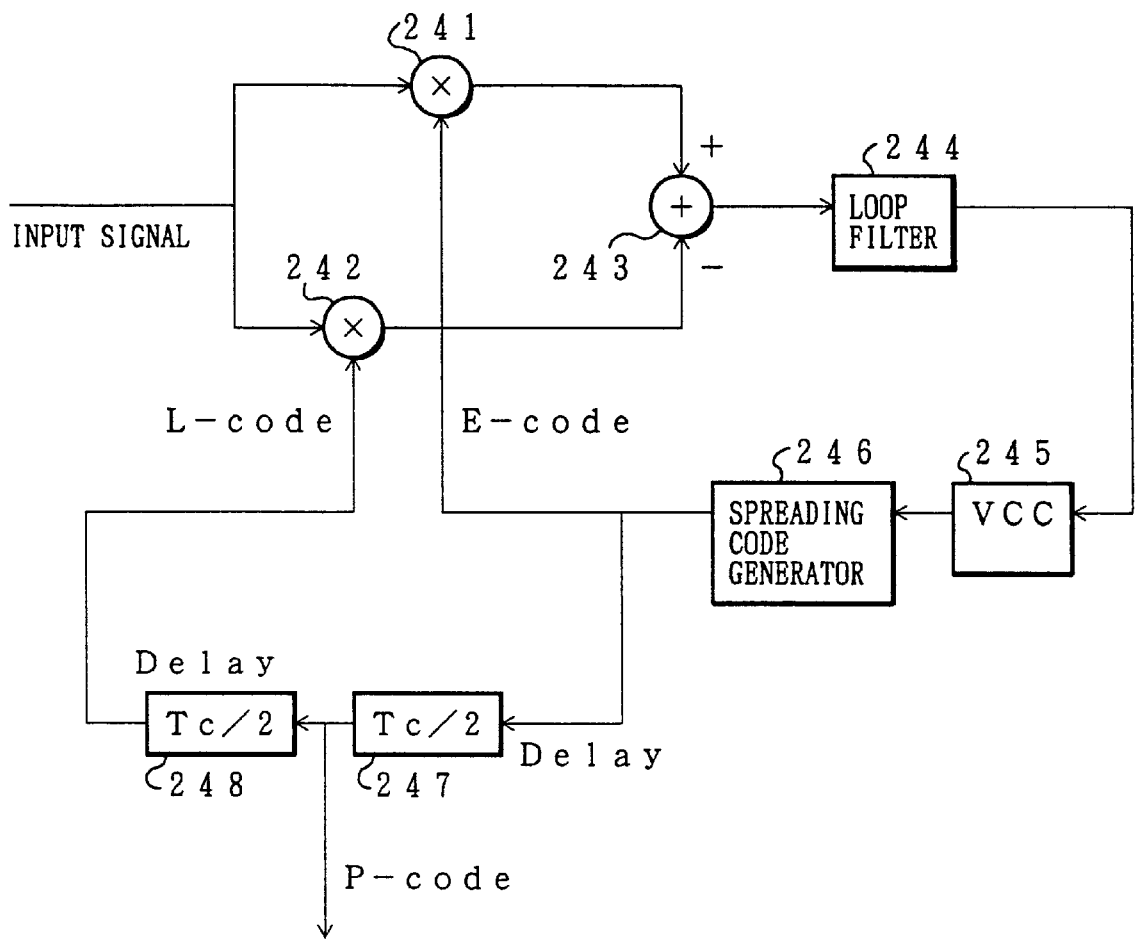
FIG. 14 is a view illustrating an example of a circuit adaptable so as to be used as the synchronization follow-up part provided in the base band processing unit shown in FIG. 5.

The following description will explain a case where a delay lock loop (DLL) shown in FIG. 14 is used so as to realize the synchronization follow-up part 215. This case, however, is an example wherein the spreading code generator 216 is included in the synchronization follow-up part 215, and hence, the spreading code generator 216 appears in the Fig. as the spreading code generator 246. The same applies to FIGS. 14 through 23.

As shown in FIG. 14, the DLL is composed of a phase comparator, a loop filter 244, a VCC (voltage control clock) 245, a spreading code generator 246, and delay circuits 247 and 248. The phase comparator is composed of multipliers 241 and 242 and an adder 243.

The multiplier 241 is supplied with not only input signals, but also a PN code (E-code) whose phase is advanced by half chip as compared with a PN code (P-code) used in inverse-spreading of a spread signal which will be described later. Likewise, the multiplier 242 is supplied with not only the input signals, but also a PN code (L-code) whose phase is delayed by half chip as compared with the PN code (P-code).

Thus, two types of PN codes (E-code, L-code) differing in phase are supplied from the spreading code generator 246 to the DLL. Therefore, the oscillation phase of the PN code as reference is sequentially changed, and each time, cross-correlation functions with the received signal, namely a cross-correlation function between the received signal and the E-code and a cross-correlation function between the received signal and the L-code, are taken so that a difference between the two cross-correlation functions is found and outputted.

In the DLL, in a limited range where $\tau=\pm Tc/2$ (Tc is a one-chip time length of the PN code) is satisfied, the output linearly responds to the phase change. That output is fed back to the spreading code generator 246. Here, an oscillation phase of the PN code is advanced slightly (for example, $Tc/4-Tc/10$) in the case where that output is positive, or the phase is delayed slightly (for example, $Tc/4-Tc/10$) in the case where the output is negative, so that a difference between the two cross-correlation functions becomes exactly 0. When it is exactly 0, the phase of the PN code to be sent to the inverse-spreading part 217 shown in FIG. 5 completely coincides with the phase of the spreading code of the received signal, and hence, the maximum output is outputted from the inverse spreading part 217.

A low-pass filter is adapted so as to be used as the loop filter 244, so that high frequency components and noise unnecessary to the loop are removed from a signal outputted from the phase comparator.

The VCC 245 is an oscillator for generating a clock with a frequency proportional to an input voltage. It generates a clock with a frequency proportional to a control voltage supplied from the loop filter 244, and the clock is supplied to the spreading code generator 246.

From the spreading code generator 246, a PN code (E-code) which is advanced by half chip phase as compared with the PN code (P-code) used in inverse spreading is supplied to the multiplier 241 and the delay circuit 247.

The delay circuit 247 is arranged so as to generate a P-code by delaying the inputted E-code by half chip. The P-code thus generated by the delay circuit 247 is sent to the delay circuit 248 at the subsequent stage as well as to an inverse spreading part which is not shown.

The delay circuit 248 is arranged so as to generate an L-code by delaying the inputted P-code by half chip. The L-code thus generated by the delay circuit 248 is sent to the multiplier 242 at the subsequent stage.

In the DLL, to perform analog signal processing, an integrator is adapted so as to be used as the loop filter 244. An integration interval here is greater than the period T of the PN code and is an integer times the period T. Further, to form a multiplying part of the DLL, that is, the multipliers 241 and 242, a circuit shown as an example of the inverse-spreading part 217 which will be described later is used (see FIG. 24).

Figure 15:
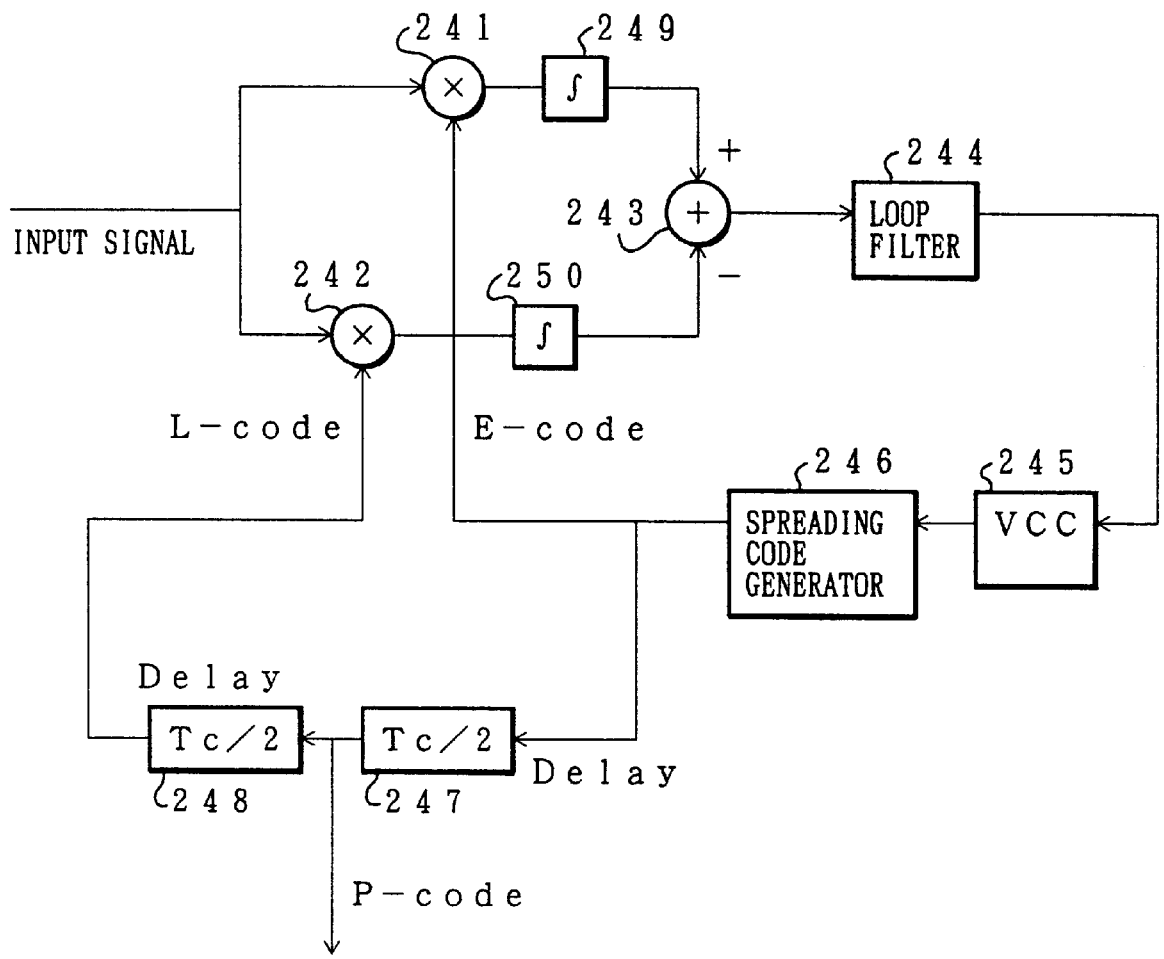
FIG. 15 is a view illustrating another example of the circuit adaptable so as to be used as the synchronization follow-up part provided in the base band processing unit shown in FIG. 5.

Furthermore, as shown in FIG. 15, integrators 249 and 250 may be provided between output terminals of the multipliers 241 and 242 and input terminals of the adder 243 of the DLL shown in FIG. 14, respectively.

Figure 16:
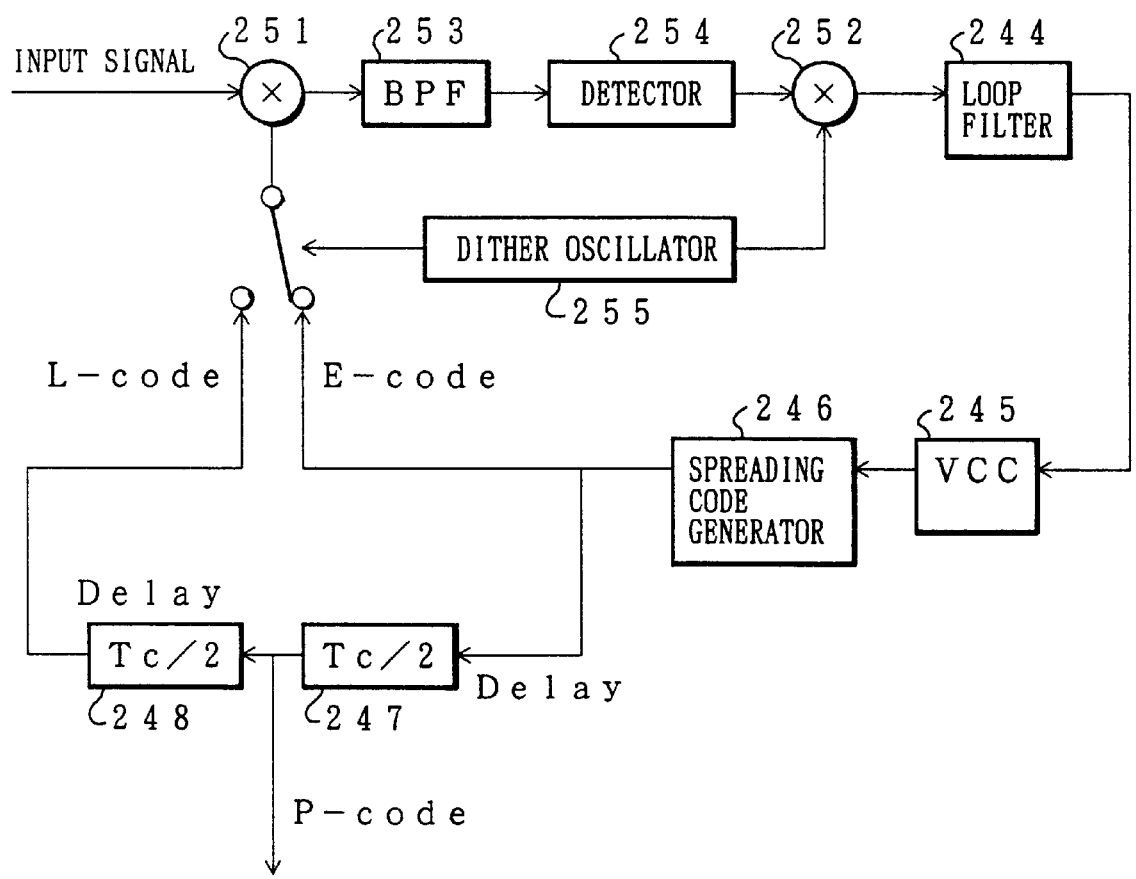
FIG. 16 is a view illustrating still another example of the circuit adaptable so as to be used as the synchronization follow-up part provided in the base band processing unit shown in FIG. 5.
Figure 17:
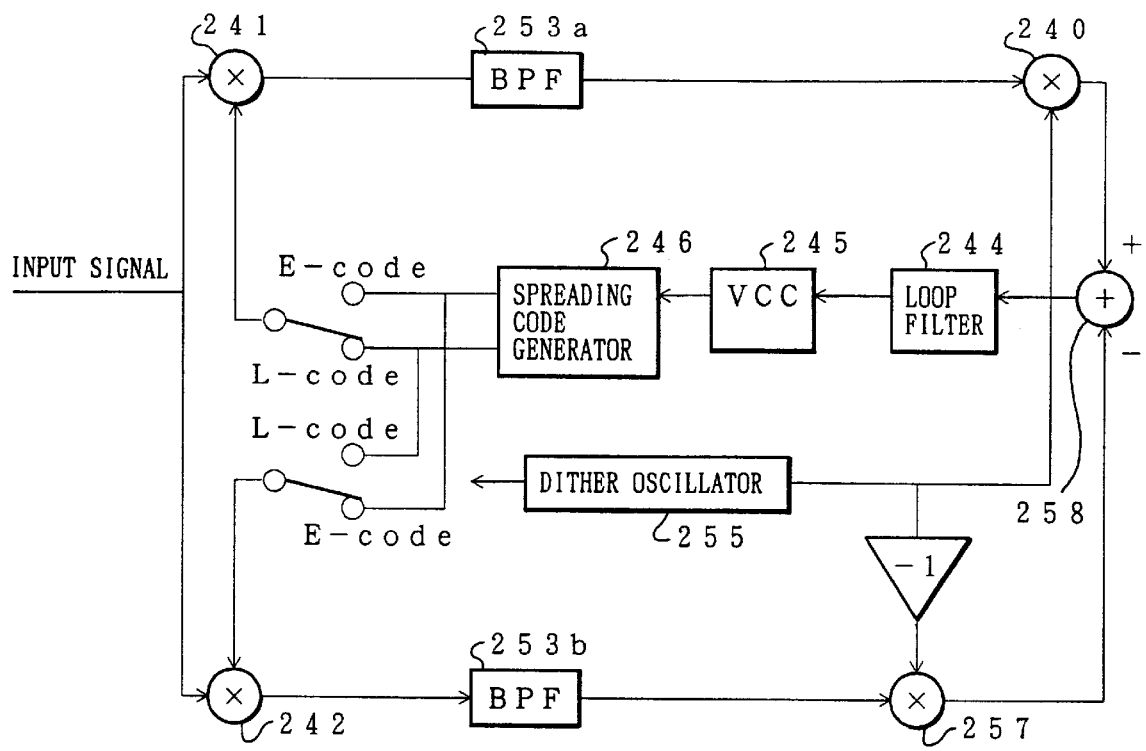
FIG. 17 is a view illustrating still another example of the circuit adaptable so as to be used as the synchronization follow-up part provided in the base band processing unit shown in FIG. 5.
Figure 18:
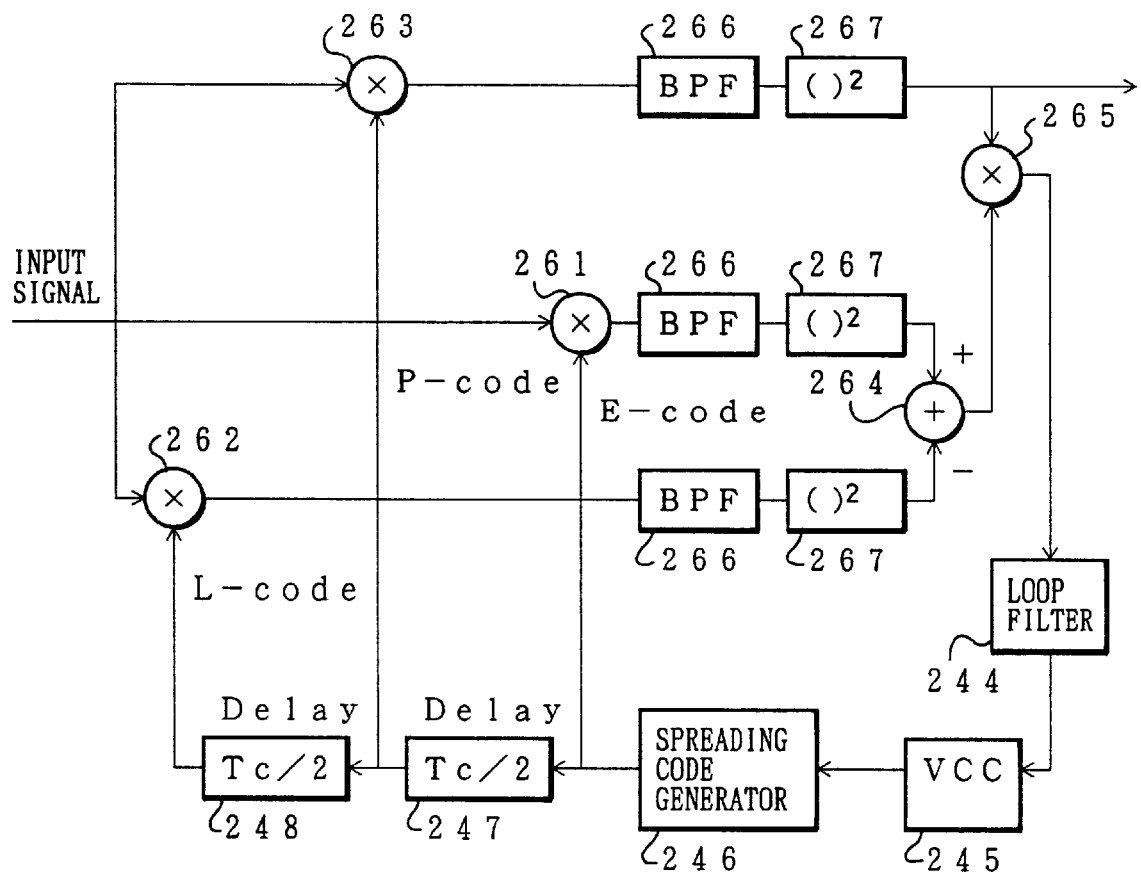
FIG. 18 is a view illustrating still another example of the circuit adaptable so as to be used as the synchronization follow-up part provided in the base band processing unit shown in FIG. 5.

The DLL used here does not need to be the DLL shown in FIG. 14 or 15, but it may be either a τ dither loop (TDL) shown in FIG. 16, a double dither loop (DDL) shown in FIG. 17, or a modified delay lock loop (MDLL) shown in FIG. 18.

The following description will explain the TDL, the DDL, and the MDLL which may be adapted so as to be used as the synchronization follow-up part 215 in the place of the DLL shown in FIG. 14 or 15. Incidentally, the members having the same structure (function) as those in the DLL shown in FIG. 14 will be designated by the same reference numerals and their description will be omitted.

Applied to the TDL shown in FIG. 16 is the following technique of controlling the oscillation phase in whole: focusing on that an auto-correlation function which takes, when plotted, a peak of a chevron in the vicinity of the correct synchronization position, the phase of the PN code generated on the receiving side is slightly advanced or delayed, and a change in a correlation value caused by such shift of the phase is taken out and supplied to the loop filter 244, and further, a phase of an output of the spreading code generator 246 is controlled by the VCC 245 so that an output value outputted from the loop filter 244 becomes zero.

Functions necessary for the TDL to operate as above are a function of smoothly changing the oscillation phase of the PN code in a wide range after multiplication of an input signal by use of the multiplier 251, as well as a function of digitally shifting the phase of the PN code by about Tc/10 forward or backward. To realize these functions, a dither oscillator 255, for example, is used.

A signal outputted from the dither oscillator 255 is supplied to a switching element for switching the E-code or the L-code to be supplied to the multiplier 251 at the first stage of input, while being also supplied to the multiplier 252 to which a signal outputted from the multiplier 251 is sent through a band-pass filter (BPF) 253 and a detector 254.

Thus, by using the dither oscillator 255, the phase of the PN code is digitally shifted by about Tc/10, resulting in that it is possible to control the oscillation phase of the TDL in whole.

The DDL shown in FIG. 17 is equipped with a pair of multipliers 241 and 242 to which an input signal is supplied. The multipliers 241 and 242 are arranged so as to be supplied with the E-code and the L-code, respectively, so that correlations with respect to the input signal are taken.

The multiplier 241 is supplied with an input signal as well as the E-code or the L-code. Then, a signal resulting on multiplication of the input signal with the E-code or the L-code is supplied to a multiplier 240 via a band-pass filter (BPF) 253a.

To the multiplier 240, a signal from the dither oscillator 255 is supplied as well, and the signal from the dither oscillator 255 is multiplied by the signal supplied thereto through the band-pass filter 253a. The multiplied result is inputted to an adder 258.

On the other hand, the multiplier 242 mated with the multiplier 241 is, like the multiplier 241, supplied with the input signal as well as the E-code or the L-code. A signal resulting on multiplication of the input signal with the E-code or the L-code is supplied to a multiplier 257 via a band-pass filter (BPF) 253b.

To the multiplier 257, an inverted result of a signal from the dither oscillator 255 is supplied, and the inverted result is multiplied by the signal supplied thereto through the band-pass filter 253b. The multiplied result is inputted to the adder 258.

The adder 258 adds the two input signals and output the result to the loop filter 244. The process ensuing to this is the same as that in the case of the aforementioned DLL, and the codes generated by the spreading code generator 246 are switched from one to another so as to be outputted, in response to a signal supplied from the dither oscillator 255.

Therefore, the foregoing DDL operates in substantially the same manner as the foregoing TDL does, but they differ from each other in correlations taken between the input signal and the two codes outputted from the spreading code generator 246. More specifically, in the case of the DDL, two types of codes are outputted from the spreading code generator 246. The E-code is supplied to the multiplier 242 when the L-code is supplied to the multiplier 241, whereas the L-code is supplied to the multiplier 242 when the E-code is supplied to the multiplier 241.

In the DDL, one arm (upper arm) correlates the E-code with an input signal while the other arm (lower arm) correlates the L-code with an input signal, or alternatively, the upper arm correlates the L-code with an input signal while the lower arm correlates the E-code with an input signal.

The MDLL shown in FIG. 18 has three arms which realize three correlations, respectively. The MDLL has three multipliers 261 through 263, each of which is arranged so as to be supplied with codes obtained by the spreading code generator 246, i.e., an L-code, an E-code, and a P-code, respectively, as well as an input signal.

An output of the multiplier 261 that takes correlation of the input signal with the E-code is supplied to an adder 264 through a band-pass filter (BPF) 266 and a squaring circuit 267. An output of the multiplier 262 that takes correlation of the input signal with the L-code is supplied to the adder 264 through another band-pass filter 266 and another squaring circuit 267.

On the other hand, an output of the multiplier 263 that takes correlation of the input signal with the P-code is supplied to a multiplier 265 through a still another band-pass filter 266 and still another squaring circuit 267, and it is also sent outside.

To another input terminal of the multiplier 265, an added result of the aforementioned adder 264 is supplied. An output of the multiplier 265 (correlation output) is sent to the loop filter 244.

Therefore, in the case where a correlation by an arm, that is, correlation between X and Y, in the MDLL is expressed as Rxy and a gain of the arm is expressed as Ki, the correlation output is found in the following manner. By the two arms, one for correlation with the E-code and another for correlation with the L-code, demodulation signals $(K1Rse)^2$ and $(K2Rse)^2$ are obtained respectively as signals before input to the adder 264. Then, by the adder 264, a correlation output $(K1Rse)^2-(K2Rse)^2$ is obtained. The correlation output is multiplied by the demodulation signal $(K3Rse)^2$ obtained from the arm for correlation with the P-code by the multiplier 265, resulting in that a correlation output $(K3Rse)^2((K1Rse)^2-(K2Rse)^2)$ is obtained.

Then, by supplying the correlation output to the loop filter 244, the phase of the code generated by the spreading code generator 246 is controlled by the VCC 245 so that an output of the loop filter 244 becomes zero, thereby ensuring that the oscillation phase of the MDLL in whole is controlled. Basic operations other than the foregoing operation of the MDLL are identical to those of the aforementioned TDL.

The following description will explain effects of the aforementioned DLL, TDL, DDL, and MDLL.

Effects of the DLL: The TDL cannot take correlations with the E-code and with the L-code simultaneously, signal holding characteristic deteriorates. On the other hand, in the case of the DLL, both the upper and lower arms realize correlations respectively. Therefore, the DLL has no deterioration in signal holding characteristic.

Effects of the TDL: Since the DLL simultaneously takes correlations by the two arms, BPF properties inherent in the respect arms tend to vary, and hence, precision deteriorates. In contrast, since the TDL has only one arm for correlation, such deterioration does not occur. Besides, the structure can be simplified.

Effects of the DDL: The TDL takes only one correlation by the upper arm, by which an input signal is correlated with the E-code and the L-code alternately. In contrast, in the case of the DDL, correlations are taken by the upper and lower arms simultaneously. Therefore, the TDL inevitably has deterioration in signal holding characteristic since correlation of the E-code and correlation of the L-code cannot be taken simultaneously, whereas, in contrast, the DDL has no deterioration in the signal holding characteristic, since correlation of the E-code and correlation of the L-code can be taken simultaneously.

Effects of the MDLL: In the case of the MDLL, like the DLL, both the upper and lower arms realize correlations respectively. Therefore, the DLL has no deterioration in signal holding characteristic. By multiplication with the demodulation signal, the difference between differential outputs is stressed by an arm of the demodulation signal.

Incidentally, a circuit adaptable so as to be used as the synchronization follow-up part 215 may be a circuit obtained by adding an A/D converter to the circuit shown in FIG. 15, 16, 17, or 18 so that the A/D converter comes before the loop filter.

Figure 19:
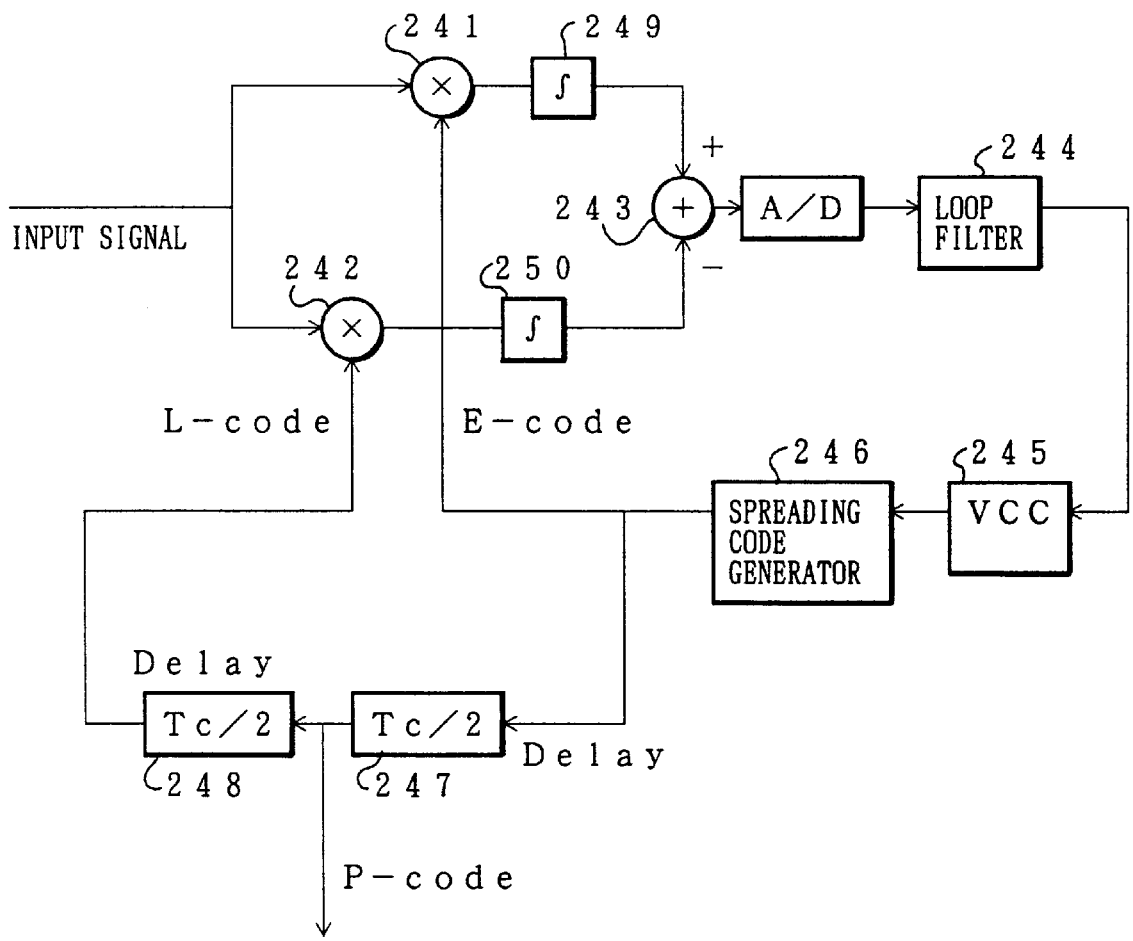
FIG. 19 is a view illustrating an example of the synchronization follow-up part obtained by adding an A/D converter to the synchronization follow-up part shown in FIG. 15.

For example, in the case where an A/D converter is, as shown in FIG. 19, provided before the loop filter 244 in the DLL shown in FIG. 15, received signals for one period are supplied all together at one time by the phase comparator to the loop filter 244, by providing the integrators 249 and 250 on the output side of the multipliers 241 and 242. Therefore, in the case where the A/D conversion is thus carried out before the loop filter 244, only one A/D converter is necessary. As a result, power consumption in A/D conversion can be reduced.

In the case where an A/D converter is, as shown in FIGS. through 22, provided before the loop filter 244 in each circuit shown in FIGS. 16 through 18, respectively, power consumption in A/D conversion can be reduced, like in the case of the DLL shown in FIG. 19.

Figure 20:
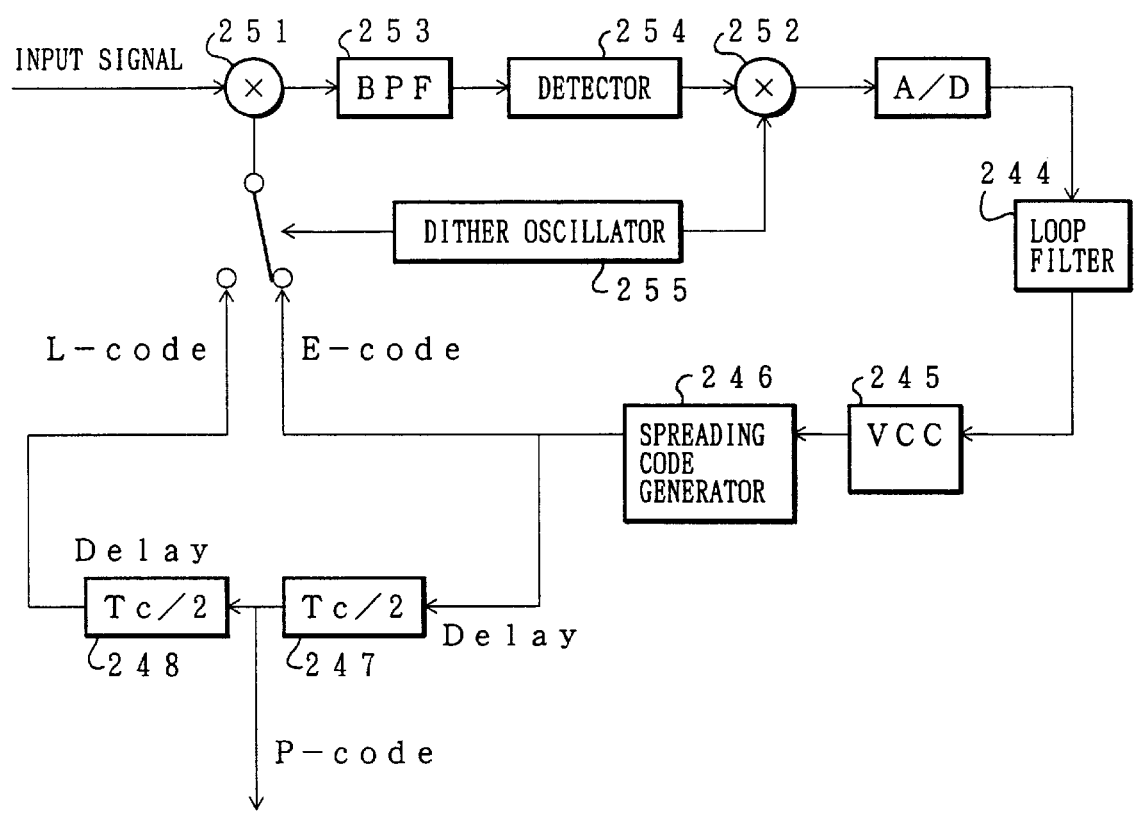
FIG. 20 is a view illustrating an example of the synchronization follow-up part obtained by adding an A/D converter to the synchronization follow-up part shown in FIG. 16.
Figure 21:
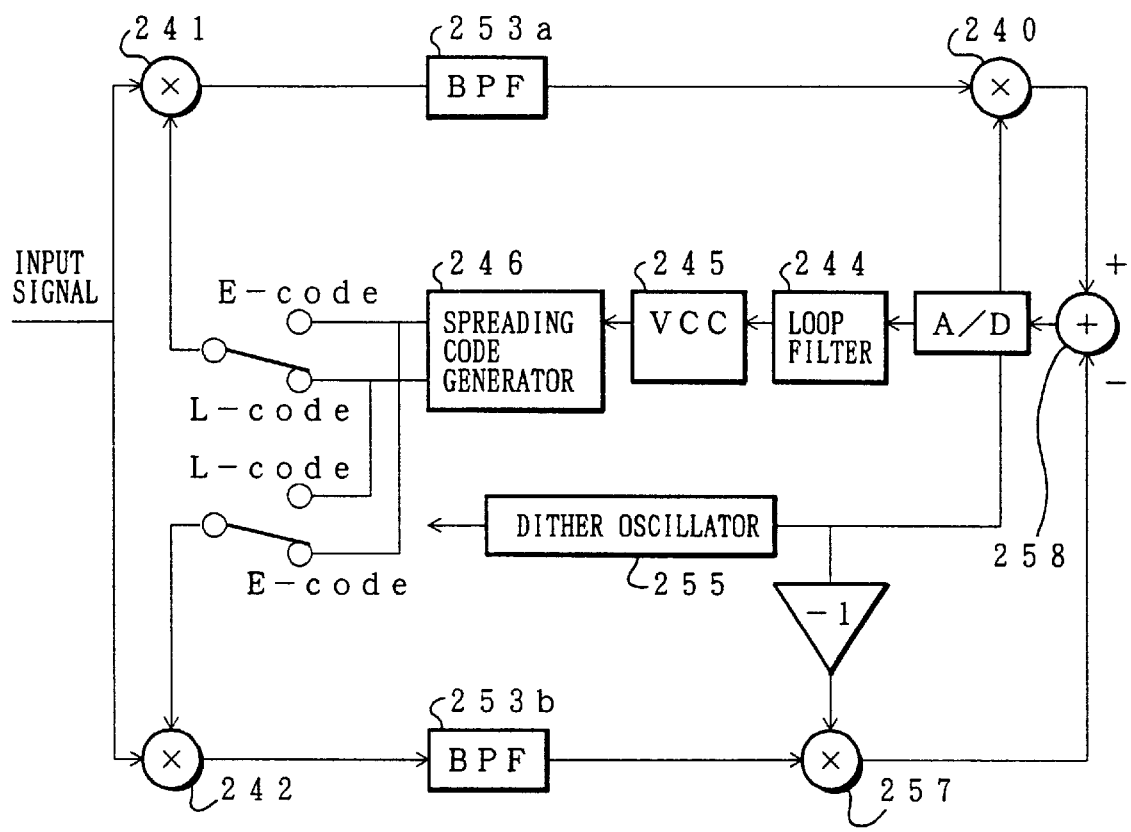
FIG. 21 is a view illustrating an example of the synchronization follow-up part obtained by adding an A/D converter to the synchronization follow-up part shown in FIG. 17.
Figure 22:
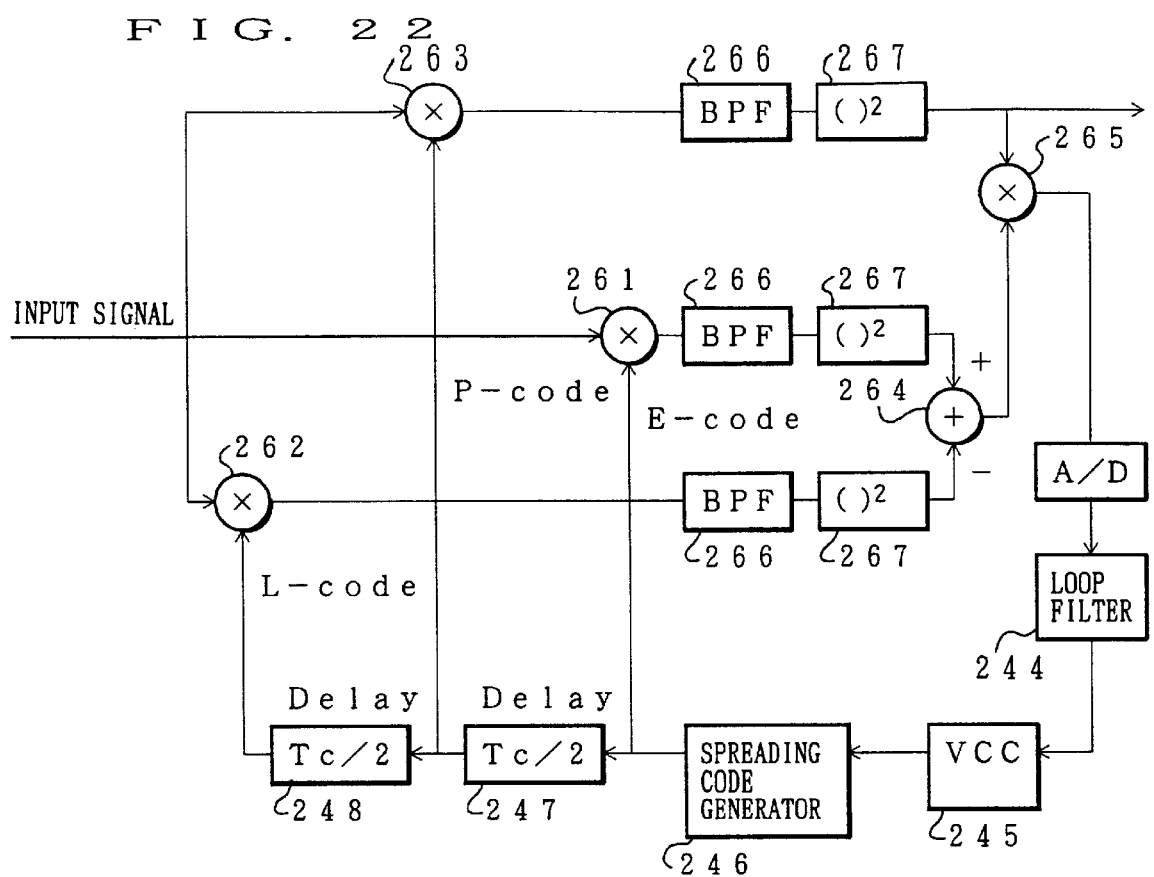
FIG. 22 is a view illustrating an example of the synchronization follow-up part obtained by adding an A/D converter to the synchronization follow-up part shown in FIG. 18.

More specifically, in the TDL shown in FIG. 20, an A/D converter is provided between the multiplier 252 and the loop filter 244. In the DDL shown in FIG. 21, an A/D converter is provided between the adder 258 and the loop filter 244. Further, in the case of the MDLL, an A/D converter is provided between the multiplier 265 and the loop filter 244.

The spreading code generator 246 of the data demodulating section 202 is arranged so as to perform a shifting operation in response to each clock supplied from the VCC 245 to generate a spreading code identical to that of a transmitting side. It is, however, necessary that a phase difference between a PN code on the receiving side and a PN code of a spread signal received becomes within a range of $\pm Tc/2$, by the time when a synchronization follow-up operation by the synchronization follow-up part 215 starts. In other words, the present base band processing unit 200 is controlled so that the synchronization follow-up part 215 starts operating after an error in synchronization is corrected by the synchronization acquiring section 201 so as to fall in a range of $\pm Tc/2$.

Figure 23:
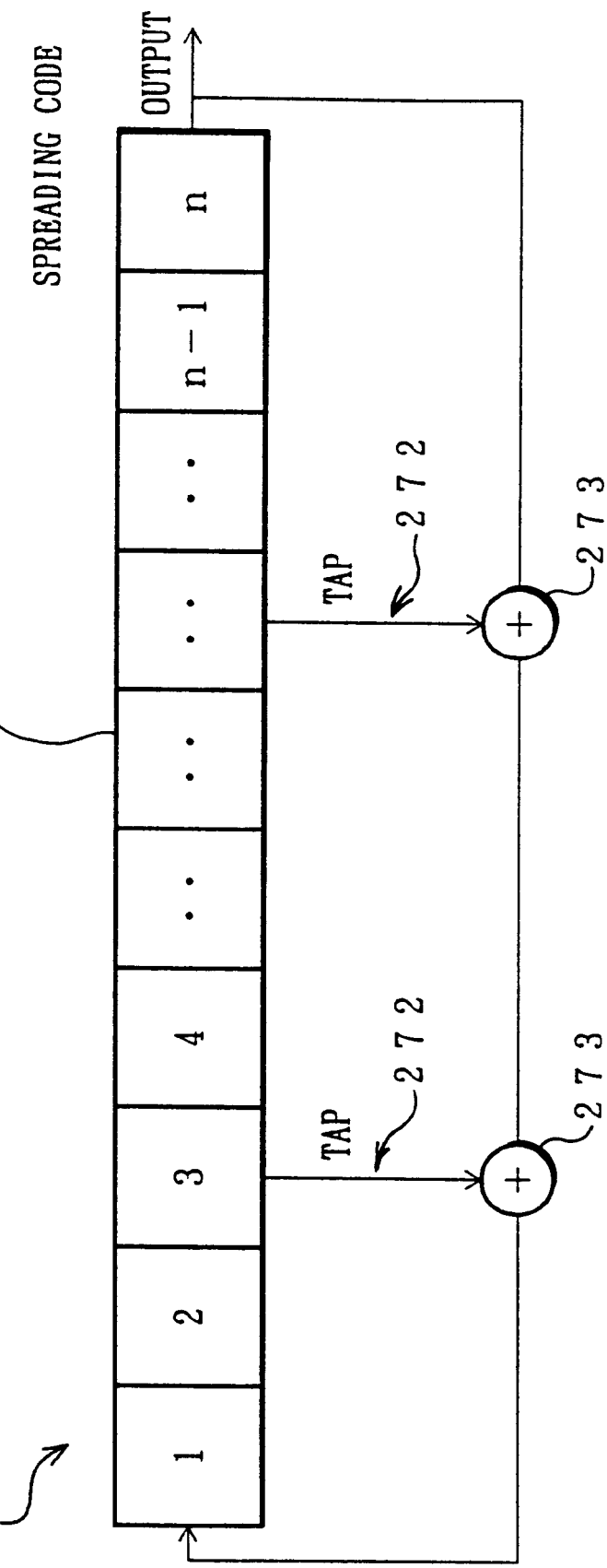
FIG. 23 is a view illustrating an example of a circuit adaptable so as to be used as the spreading code generator provided in the base band processing unit shown in FIG. 5.

The following description will explain a concrete example of the spreading code generator 246, while referring to FIG. 23.

As shown in FIG. 23, the spreading code generator 246 is provided for generating an E-code, an L-code, and a P-code which are PN codes. The spreading code generator 246 includes a shift register 271 composed of an "n" number of 1-bit registers, a feedback tap 272, and an EX-OR gate 273.

An output of the feedback tap 272 is sent to the first stage of the shift register through the EX-OR gate 273. The shift register 271 shifts states stored therein in response to a clock pulse identical to a chip rate of a predetermined PN code. Here, a value at the last step of the shift register 271 is an output of the PN code at that time. Upon outputting, level changing is performed so that "1" is changed to "−1" and "0" is changed to "1". A delay of Tc/2 is caused between the E-code and the P-code, while a delay of Tc/2 is also caused between the P-code and the L-code. Examples of the PN code used herein include an M type and a Gold type.

Next, the inverse-spreading part 217 of the data demodulating section 202 is explained below. Used as a PN code of a received analog spread spectrum signal to be supplied to the inverse-spreading part 217 is a PN code identical to the PN code used for spreading on the transmitting side, that is, the P-code generated by the spreading code generator 246. Let a first-order modulated wave and the PN code on the transmitting side be g(t) and c(t), respectively, and a transmitted wave x(t) satisfies $x(t)=c(t)\cdot g(t)$. The inverse-spreading part 217 multiplies the received signal by the signal c(t) which is entirely identical to the PN code c(t) used for spreading on the transmitting side.

Since it is considered that the received wave in the case where multiple paths are not present can be expressed in the same manner as the transmitted wave, that is, x(t), a multiplied result y(t) of the received wave by the PN code satisfies $y(t)=c(t)\cdot x(t)=c^2(t)\cdot g(t)$. Since a waveform of c(t) is a waveform of a random square wave of $\pm 1$, a square of c(t) is always 1. Since $c^2(t)=1$, y(t) becomes equal to g(t), and therefore, the data are demodulated by inverse-spreading performed by the inverse-spreading part 217 which multiplies the received wave by the spreading code (P-code).

To realize such function of the inverse-spreading part 217 with analog processing operations, the base band signal of the received wave and the spreading code of the P-code may be multiplied by the multiplying circuit at a speed of a chip rate of the spreading code. Alternatively, instead of such multiplication, non-inversion of a waveform which represents information (in the case where the PN code is "1") or inversion of the same by an inverting circuit (in the case where the PN code is "−1") at a speed of a chip rate of the spreading code may be carried out for inversion spreading.

An example of an analog circuit adaptable as the inverse-spreading part 217 is explained below, with reference to FIG. 24. In the following description, an analog signal integrator 283 of a switched capacitor type and an analog correlator 285 using multiplexors will be taken as an example of the inverse-spreading part 217.

Figure 24:
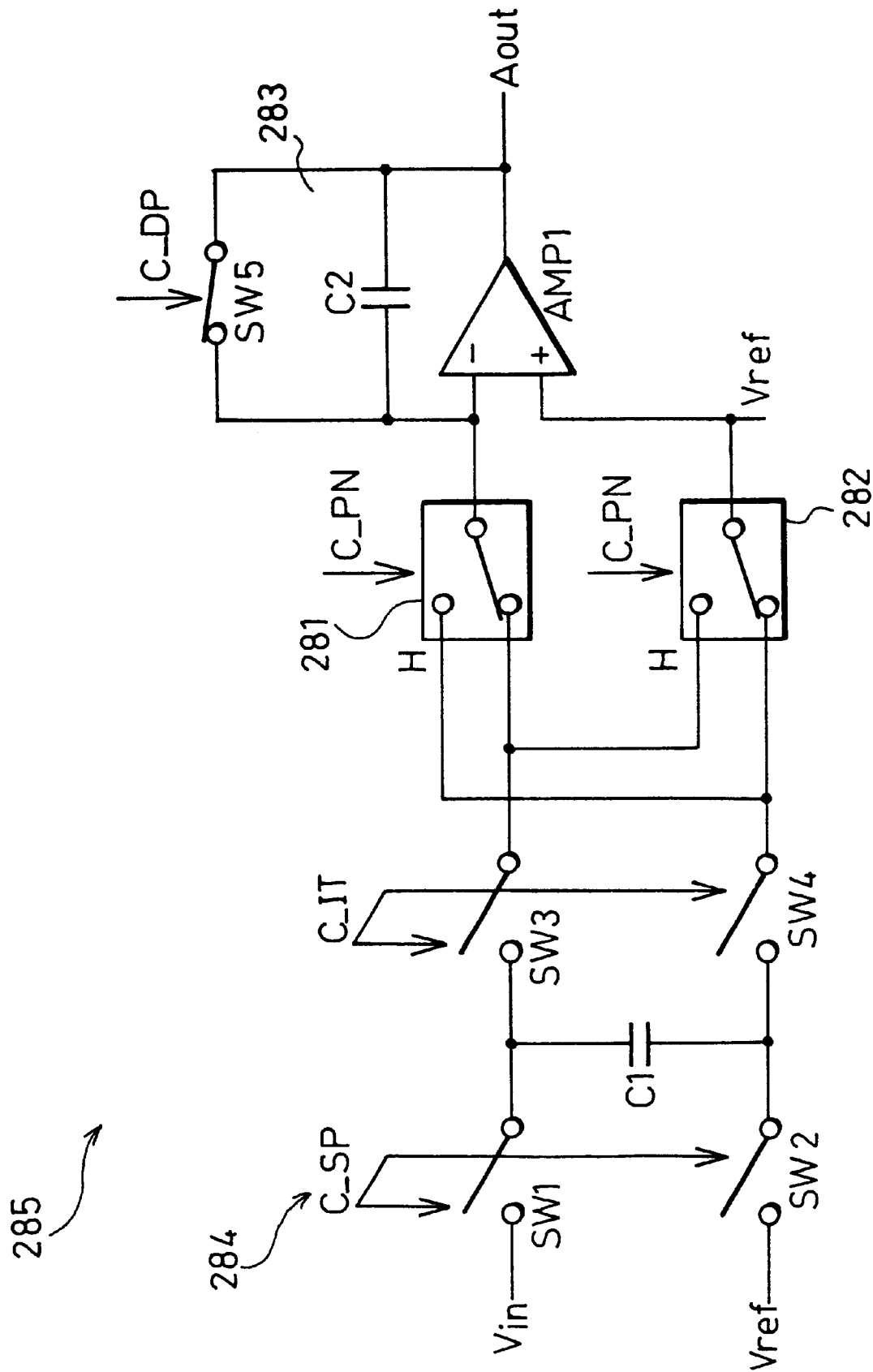
FIG. 24 is a view illustrating an example of a circuit adaptable so as to be used as the inverse-spreading part provided in the base band processing unit shown in FIG. 5.

As shown in FIG. 24, the correlator 285 as the inverse-spreading part 217 is composed of a sampling circuit 284, multiplexors 281 and 282, and an analog signal integrator 283.

Figure 25:
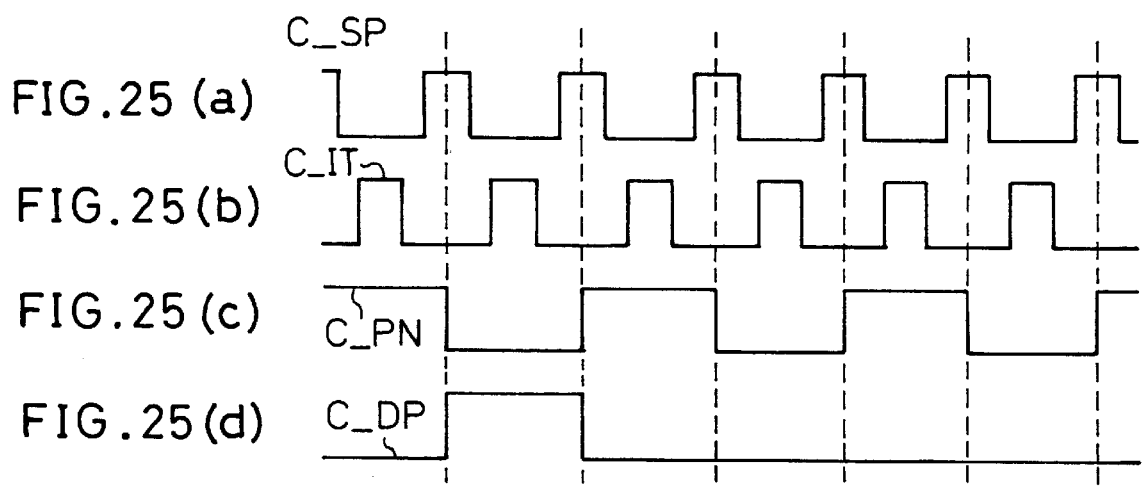
FIGS. 25(a) through 25(d) are waveform charts of control signals used in the inverse-spreading part shown in FIG. 19.

Specifically, by turning ON/OFF a switching element SW1 and a switching element SW2 in accordance with a control signal C_SP shown in FIG. 25(a), the sampling circuit 284 accumulates in a sampling capacitor C1 electric charge in accordance with an analog input signal Vin. Further, the multiplexors 281 and 282 apply the charge accumulated in the sampling capacitor C1 to the analog signal integrator 283, with a polarity remained without inverting, or with the polarity inverted, in accordance with a binary code series signal C_PN shown in FIG. 25(c). The charge is accumulated in a feedback capacitor C2 of the analog signal integrator 283. Here, the turning ON/OFF of the switching elements SW3 and SW4 provided behind the sampling circuit 284 is controlled in accordance with a control signal C_IT shown in FIG. 25(b).

Incidentally, the multiplexors 281 and 282 shown in FIG. 24 are connected with an inverting input terminal and a non-inverting input terminal of an operational amplifier AMP1, respectively.

In the foregoing arrangement, the charge accumulated in the feedback capacitor C2 provided across an input terminal and an output terminal of the operational amplifier AMP1 is discharged by the turning ON of a switching element SW5 at a time when a dump control signal C_DP shown in FIG. 25(d) commands a start of binarization of code series.

To be more specific, when the signal C_PN for controlling the multiplexors 281 and 282 is "H", a non-inversion signal (in the case where the PN code is "1") is supplied to the integrator 283, and when the signal C_PN is "L", an inversion signal (in the case where the PN code is "−1") is supplied thereto, so that the correlator 285 performs inversion spreading. Therefore, since the level of the signal C_PN is switched between H and L at the speed of the chip rate, the inverse-spreading operation is carried out at the speed of the chip rate, in the correlator 285.

By so doing, the correlator 285 performs an integrating operation in accordance with an analog input voltage Vin at a time when the dump control signal C_DP commands. Therefore, operational errors stemming from fluctuation of the analog input voltage Vin at other times than the sampling timings can be reduced, thereby resulting in improvement of operational precision.

Incidentally, a radio wave which is received by the spread spectrum communication device after being reflected by buildings and the like has reached to the device with a delay in time, as compared with a radio wave which has directly reached thereto, and moreover, the former has a smaller amplitude than that of the latter. The delay in time appears as a phase difference between the PN code of the directly received wave and the PN code of the received wave with multiple paths, and as a time difference in peak occurrence in the matched filter. An amplitude appears as a magnitude of a signal, and the amplitude correlates an amplitude of a peak of the matched filter.

Therefore, in the case where a same signal is to be received under different conditions, a signal received under a better condition is preferably selected on the receiving side. As a method for doing so, a method utilizing a space diversity, a frequency diversity, a time diversity, or the like is applicable. Further, examples of the method utilizing the special diversity include a method utilizing a switching diversity whereby a received wave with a greater strength is selected in switching, and a method utilizing a RAKE combining method whereby received waves from RAKE fingers are combined.

In the present embodiment, the method of utilizing space diversity based on the RAKE combination is used as the method for receiving waves. The part which combines signals indicative of multiple paths is the RAKE combining part 204. Another method utilizing combination diversity such as maximal-ratio combining diversity may be applied.

The RAKE combining part 204 distinguishes paths which have a plurality of peaks differing in arrival time and signal strength, and combines the paths by respectively giving appropriate weights thereto in accordance with reliabilities thereof.

In the present embodiment, a synchronization position of the PN code is found with respect to each path, inverse-spreading is performed, and weight is given to each in accordance with reliability thereof, so that the paths are combined by the RAKE combining part 204.

Incidentally, a plurality of inverse-spreading parts 217 and a plurality of spreading code generators 216, which independently work in parallel for inverse-spreading the plural paths, are required for RAKE combination.

In the present embodiment, taken as an example is a case where the greatest through seventh greatest powers are found by the path identifying part 214 of the synchronization acquiring section 201 so that phase difference information and power values of the paths with the greatest through seventh greatest powers are identified with each other, and the phase difference information and power values of the paths are sent to the data demodulating section 202.

The data demodulating section 202 is equipped with plural inverse-spreading parts 217 and spreading code generators 216 corresponding to at most 7 paths, respectively. The phase difference information and power values of the multiple paths outputted from the path identifying part 214 are used as synchronization signals of the spreading code generators 216 for the respective paths in the data demodulating section 202, and as weights which are to be used in a combining operation by the RAKE combining part 204. The number of the plural inverse-spreading part 217 is the same as the number of the multiple paths to be combined, and therefore, the same number of the spreading code generators 216 and the same number of synchronization follow-up parts 215 are provided.

Figure 26:
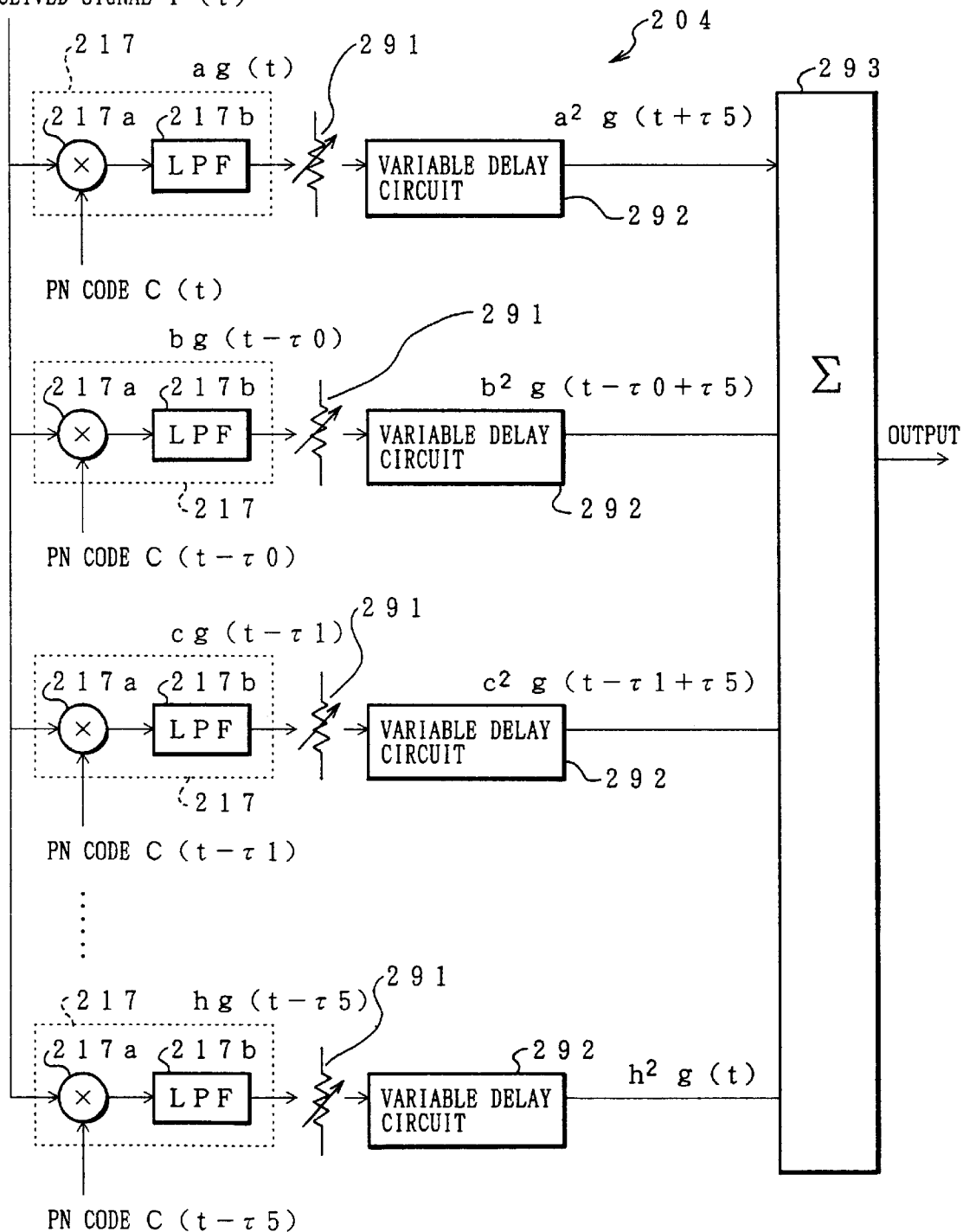
FIG. 26 is a view illustrating an example of a circuit adaptable so as to be used as the RAKE combining part provided in the base band processing unit shown in FIG. 5.

An example of the RAKE combining part 204 is shown in FIG. 26. In the RAKE combining part 204, a variable resister 291 and a variable delay circuit 292 are provided in this order on an output side of each inverse-spreading part 217 corresponding to each path, and there is also provided an adder 293 for adding outputs of the variable delay circuits 292.

Let a first-order modulated wave and a PN code series on the transmitting side be g(t) and c(t), respectively, and a transmitted wave x(t) is expressed as x(t)=c(t)·g(t). In the case where there are multiple paths in the received wave, a signal time delay occurs in each path. Let the time delays be τ0, τ1, τ2, τ3, τ4, and τ5, and let gains be a, b, c, d, e, f, and h, respectively. Then, a spread spectrum received signal r(t) as a received signal is expressed as:

r(t)=ax(t)+bx(t−τ0)+cx(t−τ1)+dx(t−τ2)+ex(t−τ3)+fx(t−τ4)+hx(t−τ5)

The PN codes identical to the PN code series used in spreading on the transmitting side are processed with the phase differences in the paths taken into consideration, and the PN codes thus obtained are subject to multiplication in the inverse-spreading parts 217, respectively. Each inverse-spreading part 217 is composed of a multiplier 217a and a low-pass filter (LPF) 217b. Therefore, by subjecting the spread spectrum received signal to a multiplying operation by the multiplier 217a and filtering it by the low-pass filter 217b, only base band signal components of the analog spread spectrum signal whose phases match those of the PN code remain.

For this reason, considering that the multiple paths are seven in number, output signals from the inverse-spreading parts 217 are ag(t), bg(t−τ0), cg(t−τ1), dg(t−τ2), eg(t−τ3), fg(t−τ4), and hg(t−τ5), respectively. In other words, waves differing in amplitude and phase (delay time) are outputted from the inverse-spreading parts 217, respectively.

The multiplying portion in each inverse-spreading part 217 performs an inverse-spreading operation. To conduct the inverse-spreading operation by analog signal processing, as shown in FIG. 24, input signals are directed according to the values (c(t)) of the PN codes by the multiplexor, and are summed.

In the case of analog signal processing, the RAKE combining part 204 multiplies the outputs of the inverse-spreading parts 217 by weight values (a, b, c, d, e, f, h), respectively, by using the variable resistors 219 which are respectively provided for the paths, so that $a^2g(t)$, $b^2g(t-\tau0)$, $c^2g(t-\tau1)$, $d^2g(t-\tau2)$, $e^2g(t-\tau3)$, $f^2g(t-\tau4)$, and $h^2g(t-\tau5)$ are obtained. In other words, in each variable resistor 291, each resistance is varied in accordance with the corresponding weight so that the signal supplied from the corresponding inverse-spreading part 217 is multiplied by the weight.

Subsequently, to make synchronization positions of peaks of the paths coincide with each other, they are adjusted by using the maximum delay. Here, if τ5 is the maximum delay and the synchronization positions are made to coincide with each other by using τ5, the aforementioned seven values become $a^2g(t+\tau5)$, $b^2g(t-\tau0+\tau5)$, $c^2g(t-\tau1+\tau5)$, $d^2g(t-\tau2+\tau5)$, $e^2g(t-\tau3+\tau5)$, $f^2g(t-4+\tau5)$, and $h^2g(t)$. Incidentally, such synchronizing operation is carried out by the variable delay circuits 292 provided in the RAKE combining part 204.

Thereafter, the outputs of the variable delay circuits 292 are summed by the adder 293, whereby the paths are combined and outputted from the RAKE combining part 204. Therefore, the RAKE combining part 204 outputs a signal having a waveform obtained by combining waveforms of signals in accordance with the paths.

Figure 27:
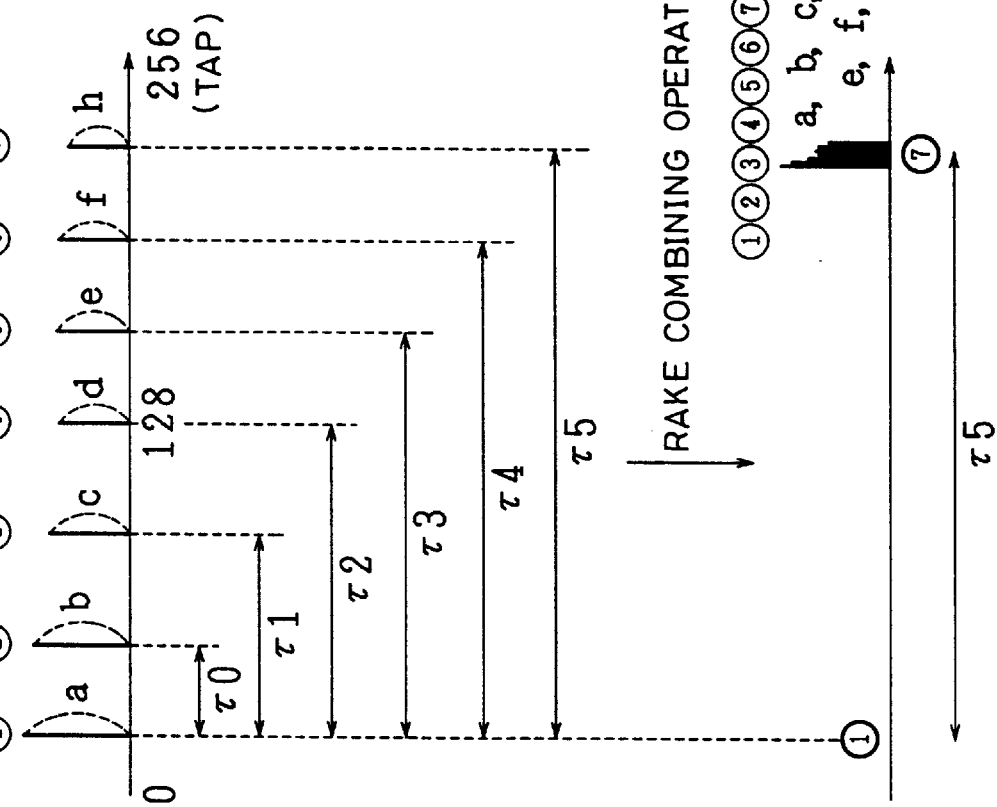
FIG. 27 is an explanatory view illustrating a RAKE combining operation.

Incidentally, the RAKE combining part may be concretely explained as follows. ①, ②, ③, ④, ⑤, ⑥, and ⑦ in FIG. 27 show amplitudes or power values at peaks in one period, respectively.

First, let a timing of a peak at which ① is obtained be a synchronization point. A path received at this synchronization point is represented as $a^2g(t)$, i.e., a product of ag(t) and a weight a.

Next, let a timing of a peak at which ② is obtained be a synchronization point. This synchronization point is (t−τ0), which is delayed by τ0 with respect to the timing of the peak at which ① is obtained. A path received at this synchronization point is represented as $b^2g(t-\tau0)$, i.e., a product of bg(t−τ0) and a weight b.

Likewise, paths received in synchronization with peaks at which ③, ④, ⑤, and ⑥ are obtained, respectively, are obtained.

Then, let a timing of a peak at which ② is obtained be a synchronization point. This synchronization point is (t−τ5), which is delayed by τ5 with respect to the timing of the peak at which ① is obtained. A path received at this synchronization point is represented as $h^2g(t-\tau5)$, i.e., a product of hg(t−τ5) and a weight h.

When the combining operation is performed, let the synchronization point of ⑦ be a reference point. To adjust the timings of the paths to the reference point so that the reference point becomes the synchronization point of the paths in calculation, the delay of the synchronization point is added to the synchronization points of the other paths. Therefore, the seven paths become $a^2g(t+\tau5)$, $b^2g(t-\tau0+\tau5)$, $c^2g(t-\tau1+\tau5)$, $d^2g(t-\tau2+\tau5)$, $e^2g(t-\tau3+\tau5)$, $f^2g(t-\tau4+\tau5)$, and $h^2g(t)$.

Here, the operations of respective parts of the data demodulating section 202 will be explained below with reference to flowcharts of FIGS. 28 and 29.

First of all, the following description will explain an operation of the synchronization follow-up part 215 of the data demodulating section 202. In FIG. 28, the processing operation begins, and the synchronization follow-up part 215 starts clocks (step S51). In other words, the synchronization follow-up part 215 starts a clock generating operation of the spreading code generator 216 in accordance with the peak values indicative of the phase difference information supplied from the path identifying part 214 of the synchronization acquiring section 201.

With this, the spreading code generator 216 generates an E-code (step S52) and a delay time of Tc/2 (step S53), thereby generating a P-code from Tc/2 and the E-code (step S54). Subsequently, the spreading code generator 216 generates a delay time Tc/2 again (step S55), thereby generating an L-code from the P-code generated at the step S54 (step S56).

Subsequently, in response to input of a received wave (step S57), the synchronization follow-up part 215 multiplies the received wave by the E-code, so as to obtain a multiplied result De (step S58). Likewise, the synchronization follow-up part 215 multiplies the same received wave by the L-code, so as to obtain a multiplied value D1 (step S59). Here, there is a time difference of Tc (a phase difference of 1 chip) between the E-code and the L-code, and either of them that has stronger correlation (a smaller phase difference) with the PN code of the received wave comes to have a greater magnitude when being multiplied by the received wave.

Subsequently, a difference (De−D1) between the multiplied value De thus obtained at the step S58 and the multiplied value D1 obtained at the step S59 is obtained (step S60). In the case where a value of the difference thus obtained is positive, i.e., in the case where the value De is greater, this means that the correlation of the PN code of the received wave with the E-code is greater than that with the L-code, and it is necessary to advance the phase of the PN code generated on the spread spectrum receiving side. On the other hand, in the case where the aforementioned value of the difference is negative, i.e., in the case where the value D1 is greater, this means that the correlation of the PN code of the received wave with the L-code is greater than that with the E-code, and it is necessary to delay the phase of the PN code generated on the spread spectrum receiving side.

Subsequently, the synchronization follow-up part 215 integrates the values (De−D1) by using the loop filter 244 (step S61). By so doing, high frequency components and noises from the phase comparator, which are unnecessary for loop control, are removed.

Thereafter, whether or not the output of the loop filter 244 is positive or negative is judged (step S62).

Here, if the output is positive at the step S62, the flow proceeds to a step S64, so that the clock frequency of the VCC 245 is raised, whereby the phase of the PN code generated by the spreading code generator 216 is advanced. If the aforementioned output if negative, the flow proceeds to a step S63, so that the clock frequency of the VCC 245 is lowered, whereby the phase of the PN code generated by the spreading code generator 216 is delayed. If the aforementioned output is zero, the flow simply proceeds to a next step S65 with nothing done.

At the step S65, generation of a next clock pulse is awaited, and in response to the generation of the clock pulse, the flow proceeds to a step S66.

Then, at the step S66, the synchronization follow-up part 215 causes the shift resistor of the spreading code generator 216 to shift, and thereafter, the flow proceeds to the step S52 so that the next PN code is generated on the spread spectrum receiving side.

As described above, in the case where seven paths exist, the synchronization follow-up parts 215 and the spreading code generator 216 for performing the operation of the steps S51 through S66 are seven each in number. Here, the start of clocks at the step S51 is in synchronization with the phases of the peaks of the seven paths.

Figure 29:
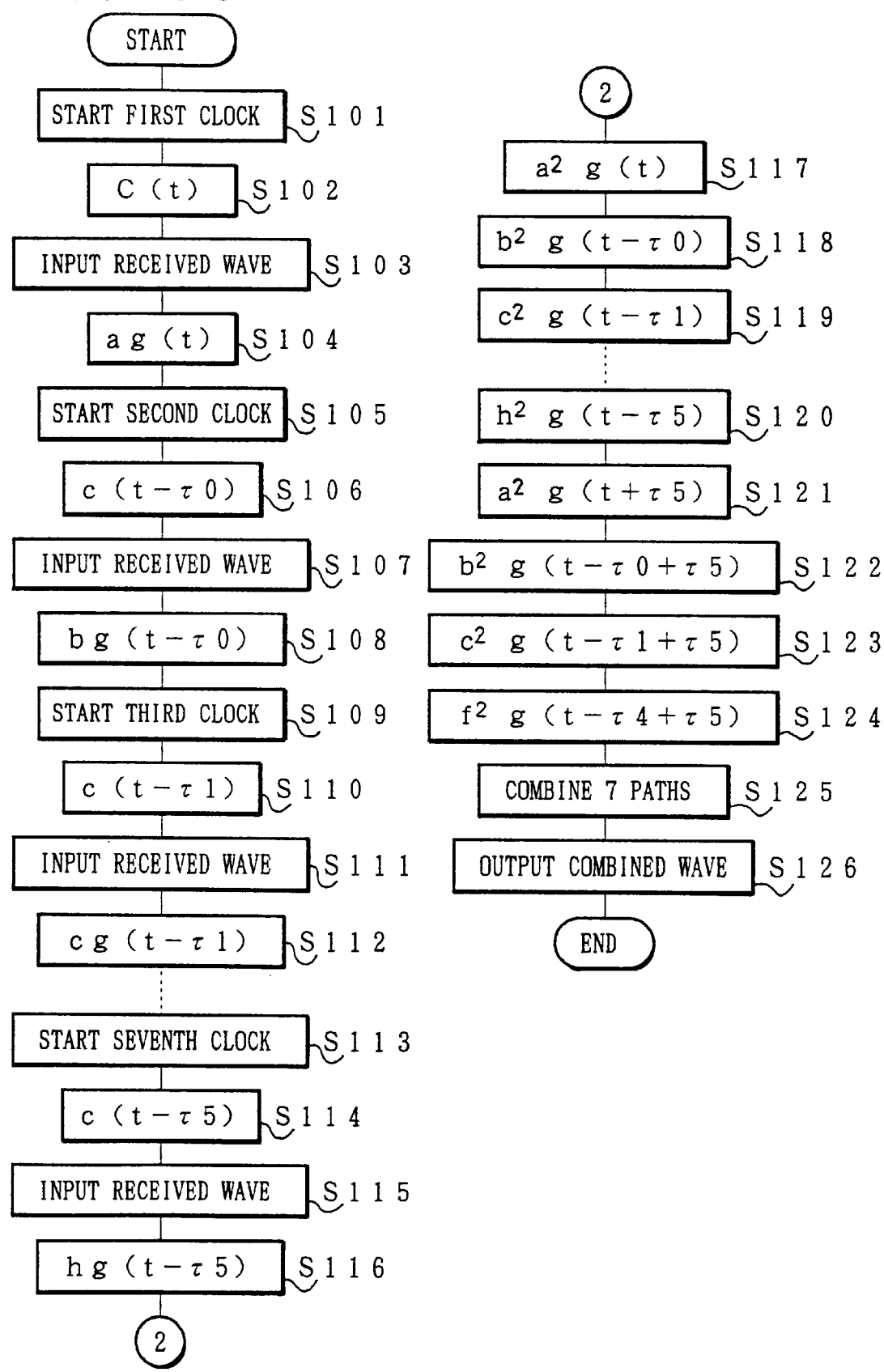
FIG. 29 is a flowchart showing a flow of a processing operation by the data demodulating section shown in FIG. 5.

Next, the following description will explain operations of the inverse-spreading parts 217 and the RAKE combining parts 204 of the data demodulating section 202, while referring to the flowchart shown in FIG. 29. Here, to make it clear that 7 paths are subject to a processing operation, the spreading code generators 216 are designated by A through F and H.

First of all, in FIG. 29, at the start of the processing operation, the clock of the spreading code generator 216A (first clock) starts in synchronization with the peak value (A) which is the greatest among those supplied from the path identifying part 214 (step S101), and in response to this, the inverse-spreading part 217 generates a function c(t) indicative of the P-code (step S102). Then, a received wave is inputted (step S103), and the inverse-spreading part 217 multiplies the received wave by the c(t) generated at the step S102, so as to obtain ag(t) (step S104).

Likewise, when the clock of the spreading code generator 216B (second clock) starts in synchronization with the peak value (B) which is the second greatest among those supplied from the path identifying part 214 (step S105), the inverse-spreading part 217 generates a function $c(t-\tau 0)$ indicative of the P-code (step S106). Then, a received wave is inputted (step S107), and is multiplied by the $c(t-\tau 0)$ generated at the step S106, whereby $bg(t-\tau 0)$ is obtained (step S108).

Likewise, when the clock of the spreading code generator 216C (third clock) starts in synchronization with the peak value (C) which is the third greatest among those supplied from the path identifying part 214 (step S109), the inverse-spreading part 217 generates a function $c(t-\tau 1)$ indicative of the P-code (step S110). Then, a received wave is inputted (step S111), and is multiplied by the $c(t-\tau 1)$ generated at the step S110, whereby $cg(t-\tau 1)$ is obtained (step S112).

Thereafter, identical operations are carried out with respect to the fourth, fifth, and sixth greatest peak values (D), (E), and (F). In so doing, functions $c(t-\tau 2)$, $c(t-\tau 3)$, and $c(t-\tau 4)$ indicative of P-codes are generated, and the received waves are multiplied by this functions, respectively, so that $dg(t-\tau 2)$, $eg(t-\tau 3)$, and $fg(t-\tau 4)$ are obtained.

Finally, when the clock of the spreading code generator 216H (seventh clock) starts in synchronization with the peak value (H) which is the seventh greatest among those supplied from the path identifying part 214 (step S113), the inverse-spreading part 217 generates a function $c(t-\tau 5)$ indicative of the P-code (step S114). Then, a received wave is inputted (step S115), and is multiplied by the $c(t-\tau 5)$ generated at the step S114, whereby $hg(t-\tau 5)$ is obtained (step S116).

The foregoing operation of the steps S101 through S116 is the operation of the inverse-spreading part 217 in the case where the multiple paths are seven in number.

Subsequently, a weighting operation is performed by the RAKE combining part 204. More specifically, the RAKE combining part 204 multiplies ag(t) obtained at the step S104 by "a" which is a value of the power information register A of the path identifying part 214, so as to find $a^2 g(t)$ (step S117).

Then, the RAKE combining part 204 multiplies $bg(t-\tau 0)$ obtained at the step S108 by "b" which is a value of the power information register B of the path identifying part 214, so as to find $b^2 g(t-\tau 0)$ (step S118).

Then, the RAKE combining part 204 multiplies $cg(t-\tau 1)$ obtained at the step S112 by "c" which is a value of the power information register C of the path identifying part 214, so as to find $c^2 g(t-\tau 1)$ (step S119).

Likewise, $dg(t-\tau 2)$, $eg(t-\tau 3)$ and $fg(t-\tau 4)$ are multiplied by "d," "e," and "f" which are values of the power information registers D, E, and F of the path identifying part 214, respectively, so that $d^2 g(t-\tau 2)$, $e^2 g(t-\tau 3)$ and $f_2 g(t-\tau 4)$ are obtained.

Then, the RAKE combining part 204 multiplies $hg(t-\tau 5)$ obtained at the step S116 by "h" which is a value of the power information register G of the path identifying part 214, so as to find $h^2 g(t-\tau 5)$ (step S120).

The foregoing operation of steps S117 through S120 is a weighting operation by the RAKE combining part 204 in the case where the multiple paths are seven in number. In other words, the RAKE combining part 204 is arranged so as to give weights in accordance with reliabilities, respectively.

Subsequently, a synchronous addition is performed by the RAKE combining part 204. More specifically, in the case where the τ5 is the greatest delay time, the RAKE combining part 204 synchronizes the peak position represented as $a^2 g(t)$ found at the step S117 with $h^2 g(t-\tau 5)$ according to information of the PN code phase difference registers A and G of the path identifying part 214, so as to find $a^2 g(t+\tau 5)$ (step S121).

Subsequently, the RAKE combining part 204 synchronizes the peak position represented as $b^2 g(t-\tau 0)$ found at the step S118 with $h^2 g(t-\tau 5)$ according to information of the PN code phase difference registers B and G of the path identifying part 214, so as to find $b^2 g(t-\tau+\square 5)$ (step S122).

Subsequently, the RAKE combining part 204 synchronizes the peak position represented as $c^2 g(t-\tau 1)$ found at the step S119 with $h^2 g(t-\tau 5)$ according to information of the PN code phase difference registers C and G of the path identifying part 214, so as to find $c^2 g(t-\tau 1+\tau 5)$ (step S123).

Likewise, the RAKE combining part 204 synchronizes the peak positions represented as $d^2 g(t-\tau 2)$ and $e^2 g(t-\tau 3)$ with $h^2 g(t-\tau 5)$ according to information of the PN code phase difference registers D, E and G of the path identifying part 214, respectively, so as to find $d^2g(t-\tau2+\tau5)$ and $e^2g(t-\tau3+\tau5)$, respectively.

Subsequently, the RAKE combining part 204 synchronizes the peak position represented as $f^2g(t-\tau4)$ with $h^2g(t-\tau5)$ according to information of the PN code phase difference registers F and G of the path identifying part 214, so as to find $f^2g(t-\tau4+\tau5)$ (step S124).

Finally, seven paths thus obtained through the steps S122 through 124 are combined (step S125). Here, waves of the seven multiple paths are combined. More specifically, $a^2g(t+\tau5)+b^2g(t-\tau0+\tau5)+c^2g(t-\tau1+\tau5)+d^2g(t-\tau2+\tau5)+e^2g(t-\tau3+\tau5)+f^2g(t-\tau4+\tau5)+h^2g(t)$ is found.

Then, the combined wave is outputted at a step S126, whereby the operation finishes.

The foregoing operation of the steps S121 through S125 is the synchronous adding operation by the RAKE combining part 204 in the case where the multiple paths are seven in number.

In the base band processing unit 200 arranged as described above, all the processing operations in the synchronization acquiring section 201 are analog processing operations, while in the data demodulating section 202, the processing operations performed by the members up to the RAKE combining part 204 inclusive are analog processing operations. In the data demodulating section 202, only the output of the RAKE combining part 204 is subject to a digital processing operation.

Generally, in the case where all the processing operations performed in the base band processing unit 200 are digital processing operations, power consumed by the matched filter 211 of the synchronization acquiring section 201 accounts for about 60 percent of the total power consumption, that of the A/D converter 205, about 30 percent, and that of the other processing parts, about 10 percent. Therefore, in the case where substantially all the processing operations in the base band processing unit 200 are performed in analog like the aforementioned spread spectrum communication device, the power consumption can be considerably reduced, as compared with the case where the substantially all the processing operations in the base band processing unit 200 are digital processing operations.

Besides, according to the base band processing unit 200 provided in the spread spectrum communication device arranged as above, the synchronization acquiring section 201 is, as shown in FIG. 5, equipped on the output side of the matched filter 211 with (1) the averaging part 213 for finding an average value of a plurality of peak positions detected by the matched filter 211 and found by the power computing part 212, and (2) the path identifying part 214 for identifying paths of a received analog spread spectrum signal in accordance with the peak position averaged. Therefore, paths of the received analog spread spectrum signal are identified by using the plurality of peak positions of the analog spread spectrum signal.

Thus, as compared with the conventional cases where identification of paths is carried out by using only one peak of a received analog signal, identification of paths of a received analog signal is more precisely conducted. As a result, precision in reception of an analog spread spectrum signal by the spread spectrum communication device is improved.

Incidentally, in the present embodiment, as shown in FIG. 5, the A/D converter 205 for converting an analog signal to a digital signal is provided on the output side of the RAKE combining part 204 in the base band processing unit 200, but the arrangement is not be limited to that. The reason is as follows: to drastically suppress power consumption as compared with the case where all the processing operations in the base band processing unit 200 are digital processing operations, the function of the matched filter 211 which consumes much power in the case where it is realized by digital processing should be realized by analog processing, and the A/D conversion may be performed at any stage behind the matched filter 211.

Therefore, the A/D converter 205 may be provided at various positions in the base band processing unit 200. The following description will explain each case where the A/D converter 205 is provided at a different position in the base band processing unit 200.

First of all, the case where the A/D converter 205 is provided in the synchronization acquiring section 201 is explained, with reference to FIGS. 30 through 34. Incidentally, for the conveniences' sake, in the following description, the members having the same structures (functions) as those in the synchronization acquiring section 201 and the data demodulating section 202 shown in FIG. 5 will be designated by the same reference numerals and their description will be omitted.

Second Embodiment

Figure 30:
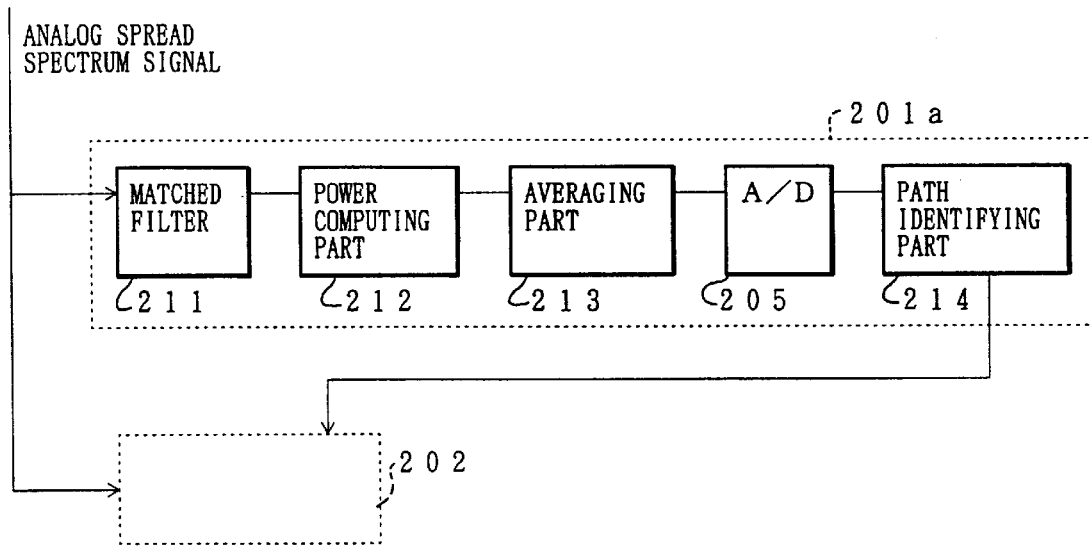
FIG. 30 is a block diagram illustrating a schematic arrangement of a synchronization acquiring section of a base band processing unit in accordance with another embodiment of the present invention.

A base band processing unit installed in the spread spectrum communication device in accordance with the present embodiment has a synchronization acquiring section 201$a$ in which the A/D converter 205 is provided between the averaging part 213 and the path identifying part 214, as shown in FIG. 30.

In the synchronization acquiring section 201 a thus arranged, analog signals are supplied to input stages of blocks of the matched filter 211, the power computing part 212, and the averaging part 213, and the blocks perform analog signal processing operations based on the received analog spread spectrum signal. On the other hand, since the A/D converter 205 is provided on an output stage of the averaging part 213, a processing operation with respect to a digital signal is performed by the path identifying part 214.

Therefore, a signal outputted from the path identifying part 214 of the synchronization acquiring section 201$a$ is digitized before being supplied to the data demodulating section 202. In other words, the path identifying part 214 has to be a circuit which realizes the digital processing operation.

Incidentally, the data demodulating section 202 in this case may have a structure shown in FIG. 5, in which the A/D converter 205 is provided at the output stage of the RAKE combining part 204, or may have another structure. This applies to various synchronization acquiring sections shown below.

Since in the aforementioned arrangement the A/D converter 205 is provided at the output stage of the averaging part 213, the operation of the A/D converter 205 can be suspended during the averaging operation by the averaging part 213. For example, in the case where the averaging operation is conducted four times by the averaging part 213, power consumption is reduced to $\frac{1}{4}$ as compared with the case where the A/D converter 205 is provided before the averaging part 213.

Therefore, in the case where all the operations in the base band processing unit 200 are digital processing operations, power consumption of the A/D converter 205 which consumes relatively much power can be suppressed, whereby all-out power consumption of the base band processing unit can be suppressed as well.

Third Embodiment

Figure 31:
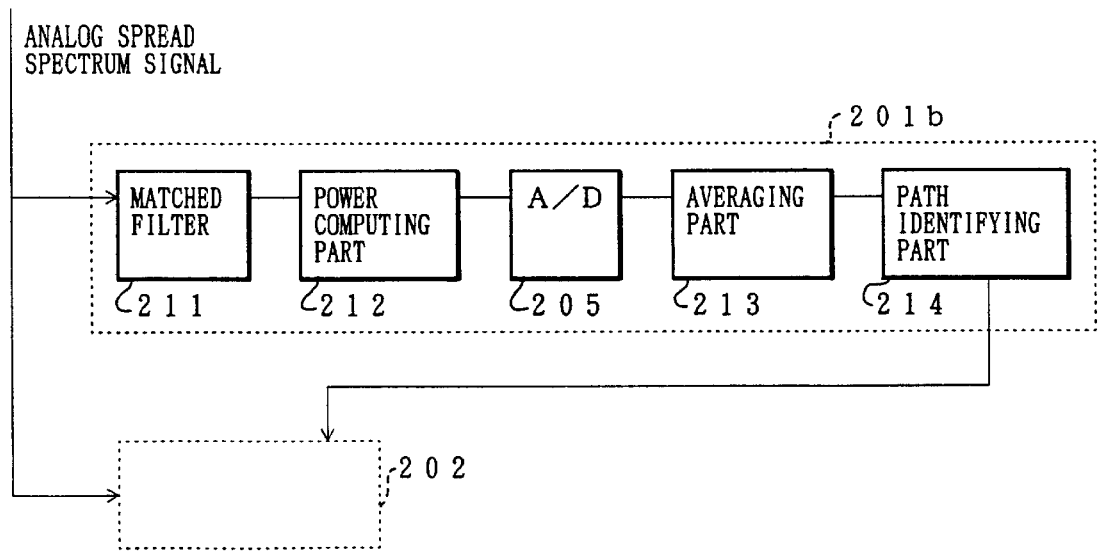
FIG. 31 is a block diagram illustrating a schematic arrangement of a synchronization acquiring section of a base band processing unit in accordance with still another embodiment of the present invention.

A base band processing unit installed in the spread spectrum communication device in accordance with the present embodiment has a synchronization acquiring section 201b in which the A/D converter 205 is provided between the power computing part 212 and the averaging part 213, as shown in FIG. 31.

In the synchronization acquiring section 201b thus arranged, analog signals are supplied to input stages of the matched filter 211 and the power computing part 212, and analog signal processing operations are performed therein. On the other hand, since the A/D converter 205 is provided on an output stage of the power computing part 212, processing operations with respect to a digital signal are performed in blocks of the averaging part 213 and the path identifying part 214.

Therefore, the averaging part 213 and the path identifying part 214 have to be circuits which realize the digital processing operations. Besides, a signal outputted from the path identifying part 214 of the synchronization acquiring section 201b is digitized before being supplied to the data demodulating section 202.

Generally, in the case where the received signal has an I signal component and a Q signal component, the power computing part 212 is arranged so as to perform processing operations through two systems and outputs one signal. In other words, to provide the A/D converter 205 before the power computing part 212, two A/D converters 205 are required so as to process the I component and the Q component, respectively.

However, in the case where the A/D converting operation is performed behind the power computing part 212 as described above, only one A/D converter 205 is required. More specifically, since the A/D converting operation has to be carried out with respect to only one output from the power computing part 212, only one A/D converter 205 needs to be provided behind the power computing part 212.

Therefore, as compared with the case where the A/D converting operation is performed before the power computing part 212, the number of the A/D converter 205 is reduced, thereby resulting in that power consumed in the base band processing unit 200 can be reduced.

Fourth Embodiment

Figure 32:
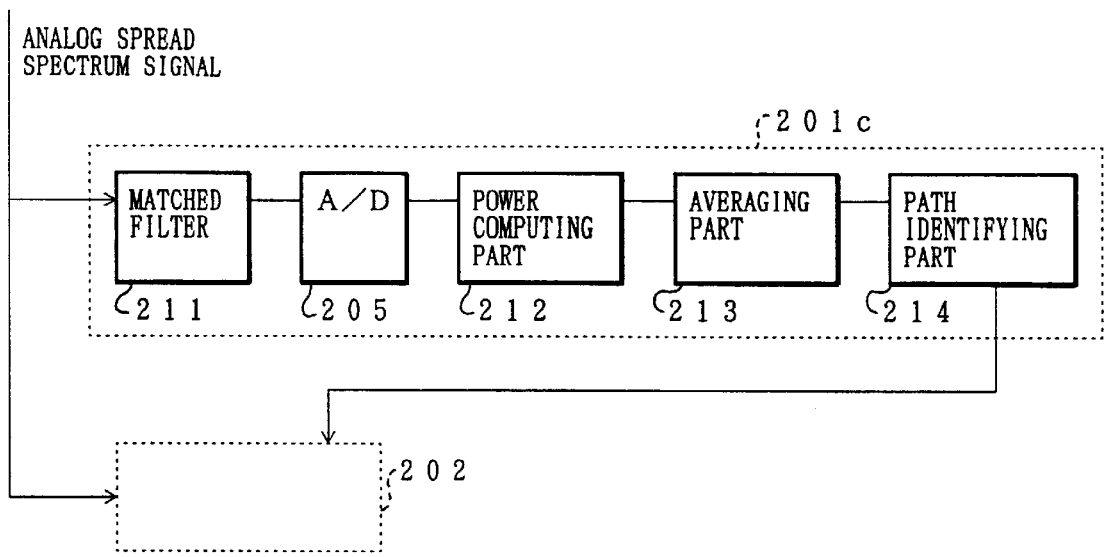
FIG. 32 is a block diagram illustrating a schematic arrangement of a synchronization acquiring section of a base band processing unit in accordance with still another embodiment of the present invention.

A base band processing unit installed in the spread spectrum communication device in accordance with the present embodiment has a synchronization acquiring section 201c in which the A/D converter 205 is provided between the matched filter 211 and the power computing part 212, as shown in FIG. 32.

The synchronization acquiring section 201c thus arranged, an input stage of the matched filter 211 is supplied with analog signals, and the block performs an analog signal processing operation. On the other hand, since the A/D converter 205 is provided at an output stage of the matched filter 211, digital signal processing operations are performed in blocks of the power computing part 212, the averaging part 213, and the path identifying part 214.

Therefore, the power computing part 212, the averaging part 213, and the path identifying part 214 have to be circuits which realize the digital processing operations. Besides, a signal outputted from the path identifying part 214 of the synchronization acquiring section 201c is digitized before being supplied to the data demodulating section 202.

In the aforementioned arrangement, since the A/D converter 205 is provided behind the matched filter 211 whose consumed power accounts for more than half of the total consumed power of the base band processing unit 200, the power consumption in this case can be reduced to a fragment of that in the case where all the operations of the base band processing unit 200 are digital processing operations.

Furthermore, in the case where the matched filter 211 is realized with an analog processing circuit, the circuit size thereof can be reduced as compared with the case where that is realized with a digital processing circuit.

Therefore, power consumed by the base band processing unit 200 is decreased while the circuit size is reduced, thereby resulting in that suppression of power consumption of the spread spectrum communication device and reduction of the size of the device can be achieved.

Fifth Embodiment

Figure 33:
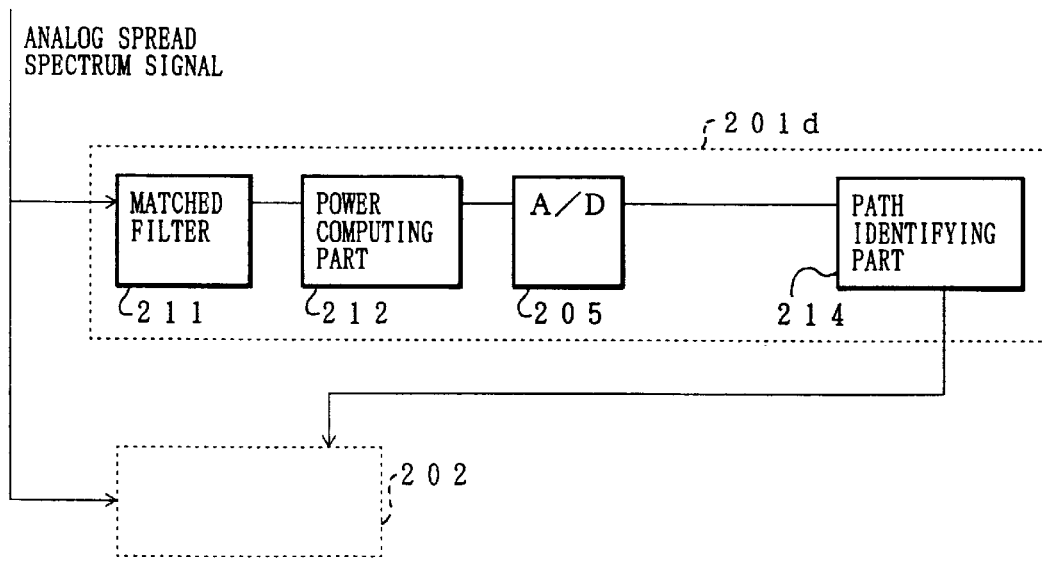
FIG. 33 is a block diagram illustrating a schematic arrangement of a synchronization acquiring section of a base band processing unit in accordance with still another embodiment of the present invention.

A base band processing unit installed in the spread spectrum communication device in accordance with the present embodiment has a synchronization acquiring section 201d in which the A/D converter 205 is provided between the power computing part 212 and the path identifying part 214, as shown in FIG. 33.

In the synchronization acquiring section 201 d thus arranged, analog signals are supplied to input stages of blocks of the matched filter 211 and the power computing part 212, and these blocks perform analog signal processing operations. On the other hand, since the A/D converter 205 is provided at an output stage of the power computing part 212 of the synchronization acquiring section 201d, a digital signal processing operation is performed in a block of the path identifying part 214.

Therefore, the path identifying part 214 has to be a circuit which realizes the digital processing operation.

Further, the synchronization acquiring section 201d is arranged so that the path identification operation is carried out based on outputs of the matched filter 211 for one period of the PN code, not based on averaged results of outputs of the matched filter 211 for several periods. Therefore, the averaging part 213 is omitted.

Furthermore, a signal outputted from the path identifying part 214 of the synchronization acquiring section 201d is digitized before being supplied to the data demodulating section 202.

With the foregoing arrangement wherein the A/D converter 205 is provided behind the power computing part 212, power consumption is, as described above, drastically reduced as compared with the aforementioned case where all the operations of the base band processing unit 200 are digital processing operations.

Furthermore, since the synchronization acquiring section 201d does not have the averaging part 213, suppression of the power consumption of the base band processing unit 200 and reduction of the circuit size thereof can be achieved.

Sixth Embodiment

Figure 34:
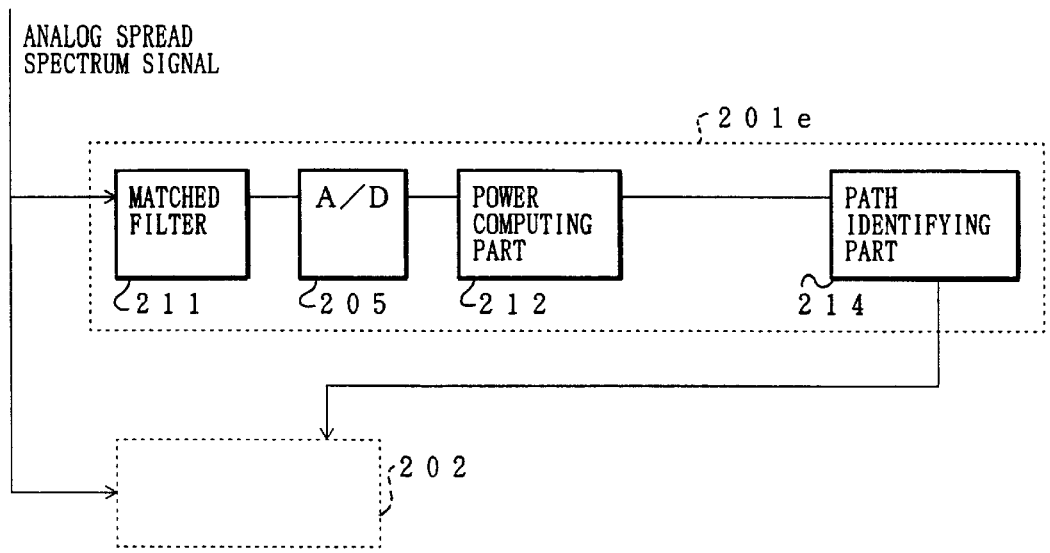
FIG. 34 is a block diagram illustrating a schematic arrangement of a synchronization acquiring section of a base band processing unit in accordance with still another embodiment of the present invention.

A base band processing unit installed in the spread spectrum communication device in accordance with the present embodiment has a synchronization acquiring section 201e in which the A/D converter 205 is provided between the matched filter 211 and the power computing part 212, as shown in FIG. 34.

In the synchronization acquiring section 201e thus arranged, an input stage of a block of the matched filter 211 is supplied with analog signals, and the block performs an analog signal processing operation. On the other hand, since the A/D converter 205 is provided at an output stage of the matched filter 211, digital signal processing operations are performed in blocks of the power computing part 212 and the path identifying part 214.

Therefore, the power computing part 212 and the path identifying part 214 have to be circuits which realize the digital processing operations.

Further, the synchronization acquiring section 201e, like the synchronization acquiring section 201d shown in FIG. 33, is arranged so that the path identification operation is carried out based on outputs of the matched filter 211 for one period of the PN code, not based on averaged results of outputs of the matched filter 211 for several periods. Therefore, in the synchronization acquiring section 201e as well, the averaging part 213 is not provided.

Furthermore, a signal outputted from the path identifying part 214 of the synchronization acquiring section 201e is digitized before being supplied to the data demodulating section 202.

Furthermore, in the aforementioned arrangement, like in the case of the synchronization acquiring section 201c shown in FIG. 32, since the A/D converter 205 is provided behind the matched filter 211 whose consumed power accounts for more than half of the total consumed power of the base band processing unit 200, the consumed power in this case can be reduced to a fragment of that in the case where all the operations of the base band processing unit 200 are digital processing operations.

Furthermore, the synchronization acquiring section 201e does not have the averaging part 213, and by so doing, suppression of the power consumption of the base band processing unit 200 can be achieved as well. Besides, in the case where the matched filter 211 is realized with an analog processing circuit, the circuit size can be reduced as compared with the case where it is realized with a digital processing circuit. Moreover, as described above, since the averaging part 213 is not provided in the synchronization acquiring section 201e, the circuit size of the base band processing unit 200 can be made the smaller for the space of the averaging part 213 omitted.

Therefore, power consumed by the base band processing unit 200 is decreased while the circuit size is reduced, thereby resulting in that suppression of power consumption of the spread spectrum communication device and reduction of the size of the device can be achieved.

The synchronization acquiring sections 201a through 201e of the second through sixth embodiments have substantially the same flow of the signal processing process as that of the first embodiment.

Namely, in the flowchart shown in FIG. 13, the step of the A/D conversion comes after the step S25, after the step S15, or after the step S14, in the cases of the aforementioned synchronization acquiring sections. Regarding the operations of the synchronization acquiring section in the case where it does not include the averaging part, in the flowchart shown in FIG. 13, L of the step S17 is set to 2, and the steps S22 through S25 for the averaging operation are removed.

Furthermore, the following description explains cases where, in the base band processing unit 200, the A/D conversion is conducted not by the synchronization acquiring section 201, but by the data demodulating section 202.

Seventh Embodiment

Figure 35:
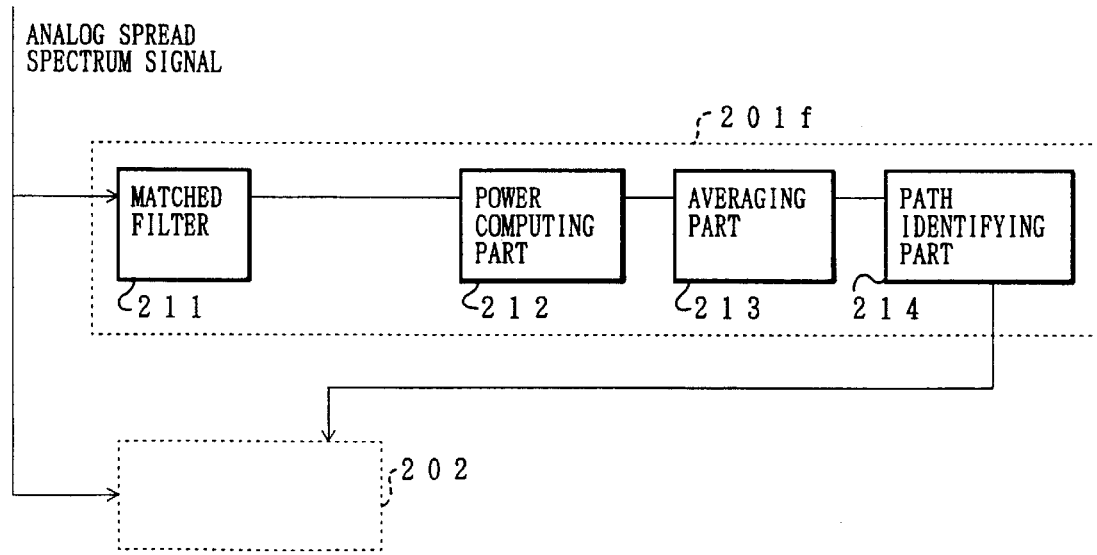
FIG. 35 is a block diagram illustrating a schematic arrangement of a synchronization acquiring section of a base band processing unit in accordance with still another embodiment of the present invention.

A base band processing unit installed in the spread spectrum communication device in accordance with the present embodiment has a synchronization acquiring section 201f which is arranged so that all blocks therein are supplied with analog signals and perform analog signal processing operations, and so that analog signals are transferred from the synchronization acquiring section 201f to the data demodulating section 202, as shown in FIG. 35.

Eighth Embodiment

Figure 36:
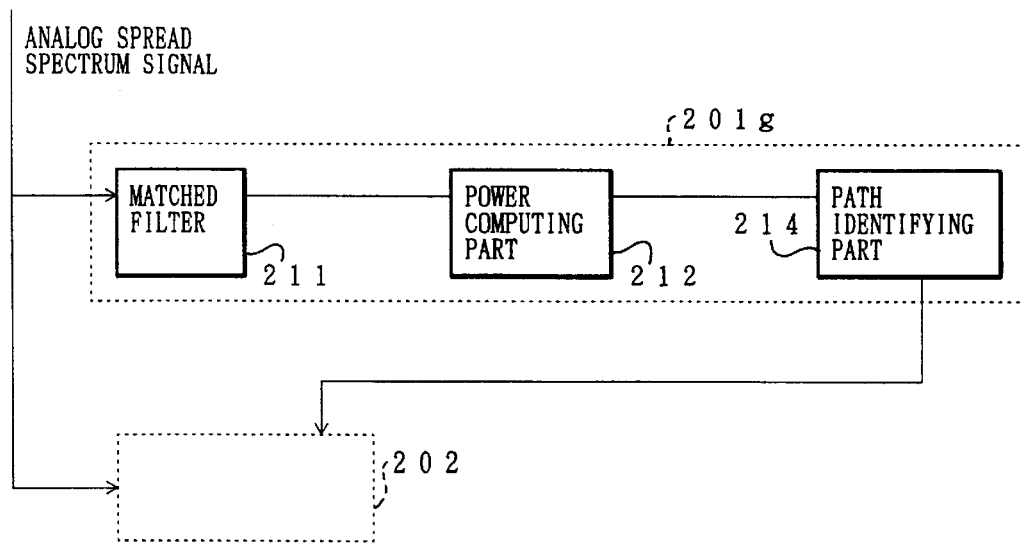
FIG. 36 is a block diagram illustrating a schematic arrangement of a synchronization acquiring section of a base band processing unit in accordance with still another embodiment of the present invention.

A base band processing unit installed in the spread spectrum communication device in accordance with the present embodiment has a synchronization acquiring section 201g which is, like the synchronization acquiring section 201f shown in FIG. 35, arranged so that all blocks therein are supplied with analog signals and perform analog signal processing operations, and so that analog signals are transferred from the synchronization acquiring section 201g to the data demodulating section 202, as shown in FIG. 36.

Further, the synchronization acquiring section 201g is arranged so that the path identification operation is carried out based on outputs of the matched filter 211 for one period of the PN code, not based on averaged results of outputs of the matched filter 211 for several periods. Therefore, in the synchronization acquiring section 201g, the averaging part 213 is not provided.

Furthermore, since regarding the present invention it is required that A/D conversion is carried out at anywhere in the base band processing unit 200, A/D conversion is performed at anywhere in the data demodulating section 202 shown in FIGS. 35 and 36.

The following description will explain each case where the A/D converter 205 is provided at a different position in the data demodulating section 202. Incidentally, since the data demodulating section explained in the following description includes members having the same functions as those provided in the data demodulating section 202 shown in FIG. 5, the members having the same structures (functions) as those in the data demodulating section 202 will be designated by the same reference numerals and their description will be omitted. Regarding the synchronization acquiring section, the synchronization acquiring section 201 shown in FIG. 5 which does not have the averaging part 205 is used in the following embodiments. The present invention, however, is not limited to that, and the A/D converter 205 as shown in FIGS. 30 through 34 may be used.

Ninth Embodiment

Figure 37:
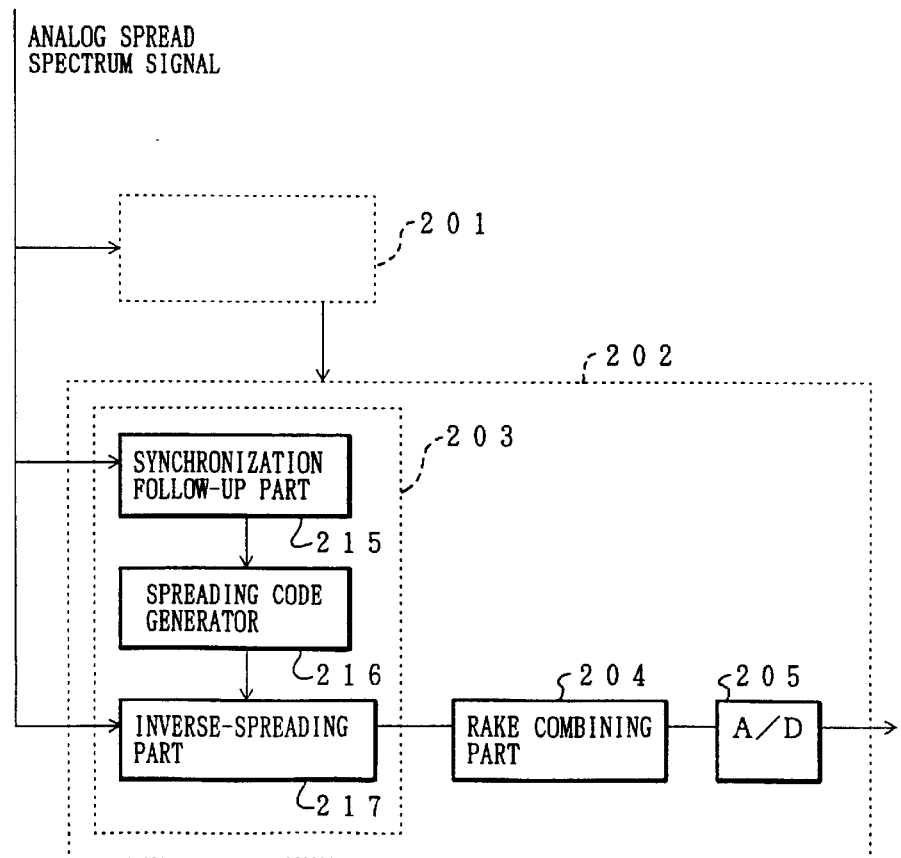
FIG. 37 is a block diagram illustrating a schematic arrangement of a data demodulating section of a base band processing unit in accordance with still another embodiment of the present invention.

As shown in FIG. 37, a base band processing unit installed in the spread spectrum communication device in accordance with the present invention has the same data demodulating section 202 as that shown in FIG. 5, in which the A/D converter 205 is provided at an output stage of the RAKE combining part 204.

In the data demodulating section 202 thus arranged, analog signals are supplied to an input stage of the demodulator circuit 203, that is, to an input stage of the synchronization follow-up part 215, to an input stage of the inverse-spreading part 217, and then, to an input stage of the RAKE combining part 204, and these blocks perform analog signal processing operations. On the other hand, since the A/D converter 205 is provided at an output stage of the RAKE combining part 204 of the data demodulating section 202, only a final output of the base band processing unit 200 is digitized.

Therefore, all operations performed by the synchronization follow-up part 215, the spreading code generator 216, the inverse-spreading part 217, the RAKE combining part 204 composing the data demodulating section 202 are analog processing operations.

With the foregoing arrangement wherein substantially all the operations in the data demodulating section 202 are analog signal processing operations, power consumption is suppressed as compared with the case where all the operations are digital signal processing operations.

Besides, a space of the circuit as well as power consumed therein are reduced by about 30 percent, as compared with the case where all the operations of the data demodulating section 202 are digital processing operations.

Tenth Embodiment

Figure 38:
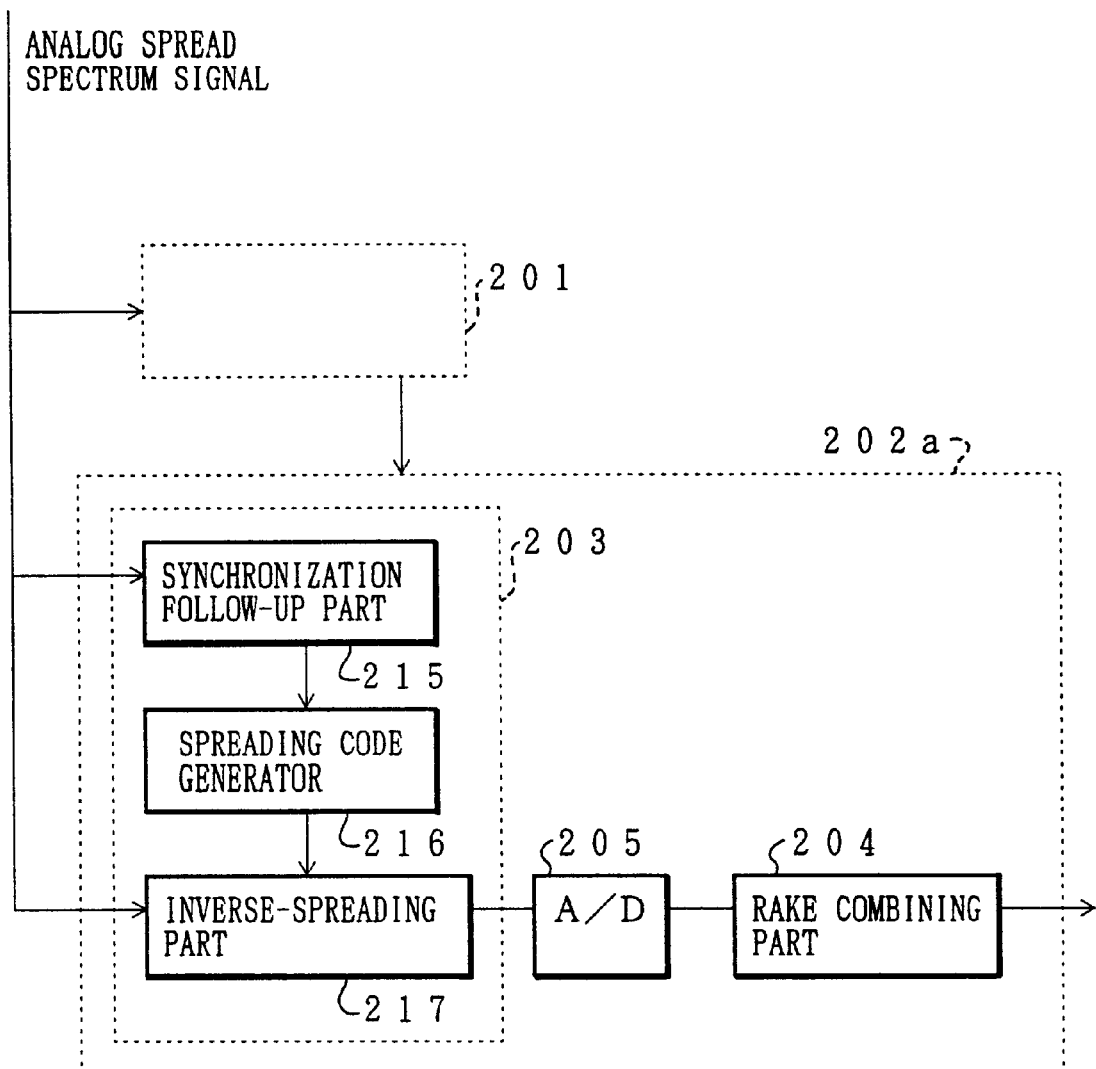
FIG. 38 is a block diagram illustrating a schematic arrangement of a data demodulating section of a base band processing unit in accordance with still another embodiment of the present invention.

A base band processing unit installed in the spread spectrum communication device in accordance with the present embodiment has a data demodulating section 202a in which the A/D converter 205 is provided between the inverse-spreading part 217 and the RAKE combining part 204, as shown in FIG. 38.

In the data demodulating section 202a, an input signal is supplied to an input stage of the demodulator circuit 203, that is, to an input stage of the synchronization follow-up part 215, then to an input stage of the inverse-spreading part 217, and hence, the demodulator circuit 203 performs an analog signal processing operation. On the other hand, since the A/D converter 205 is provided on an output stage of the inverse-spreading part 217 of the demodulator circuit 203, a block of the RAKE combining part 204 performs a digital signal processing operation.

Therefore, it is necessary to make the RAKE combining part 204 a circuit for carrying out a digital processing operation.

If the synchronization follow-up part 215 is made to perform a digital processing operation, an operational speed of the A/D converter 205 provided before the synchronization follow-up part 215 has to be extremely increased. In the case where an input is subject to analog signal processing by the inverse-spreading part 217, there is no need to increase the operational speed of the A/D converter 205 provided behind the inverse-spreading part 217.

Besides, if the A/D converter 205 is provided behind the loop filter of the synchronization follow-up part 215, there is no need to conduct A/D conversion with respect to two input signals which are to be multiplied with the spreading codes of the E-code and the L-code from the spreading code generator 216, respectively, and only one A/D converter is required with respect to a result of calculating a difference between a multiplied result of the E-code and an input signal and a multiplied result of the L-code and an input signal. Moreover, in such a case, the speed fc of the A/D converter 205 is lowered to a divided result of the speed fc by the number of taps of one period of the PN code, by providing an integrator conducting an analog processing operation before the A/D converter. For example, in the case where the period has 256 taps, the speed becomes fc/256.

More specifically, if the A/D conversion is carried out before the synchronization follow-up part 215 or the inverse-spreading part 217, the operational speed fc of the A/D converter 205 becomes 4 to 10 times greater, namely, 4 fc to 10 fc, whereas in the case where the A/D conversion is carried out behind the inverse-spreading part 217, the operational speed fc of the A/D converter 205 becomes a divided result of the speed fc by the number of taps of one period of the PN code (fc/256).

Therefore, with the data demodulating section 202a shown in FIG. 38, power consumption is the more reduced for decrease in the operational speed of the A/D converter 205.

Eleventh Embodiment

Figure 39:
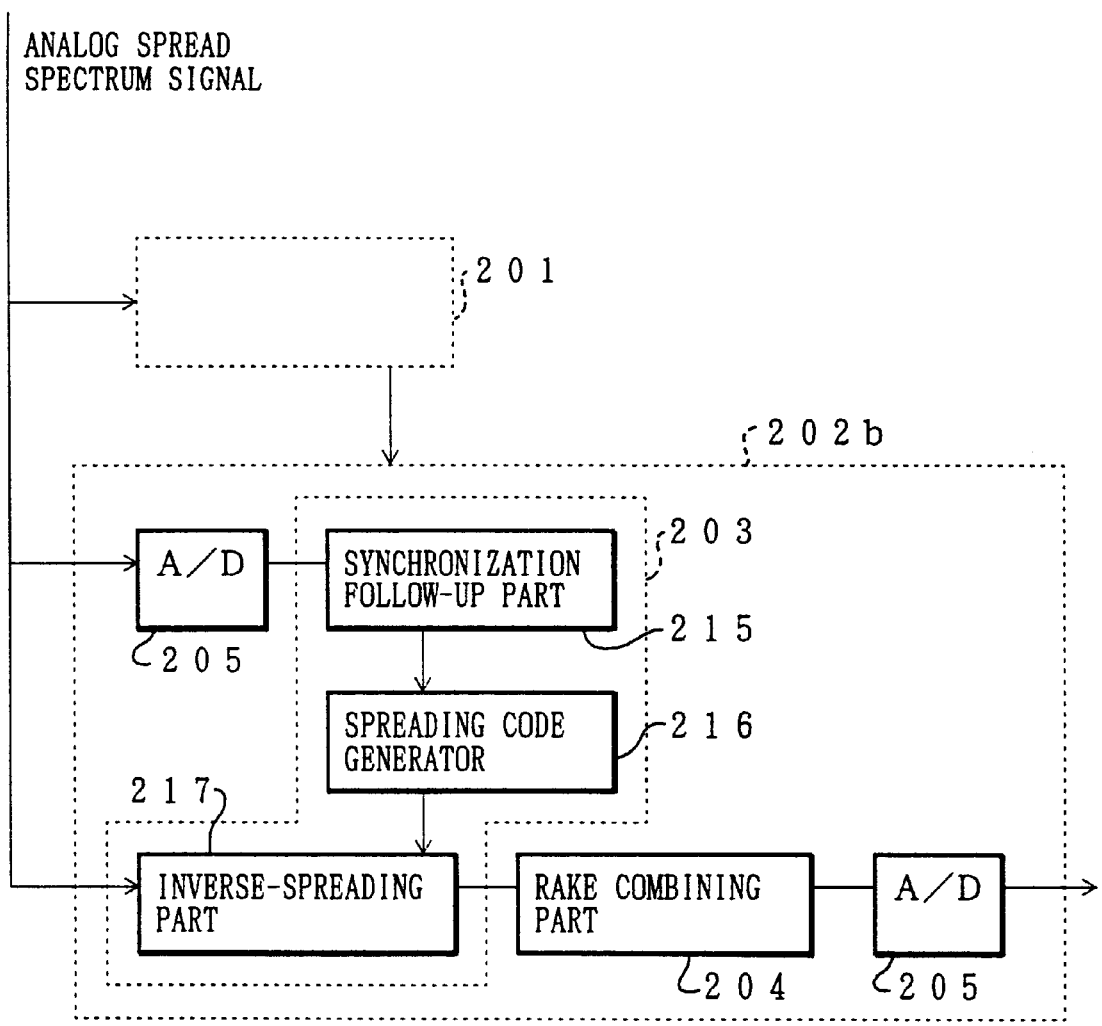
FIG. 39 is a block diagram illustrating a schematic arrangement of a data demodulating section of a base band processing unit in accordance with still another embodiment of the present invention.

A base band processing unit installed in the spread spectrum communication device in accordance with the present embodiment has a data demodulating section 202b in which two of the A/D converters 205 are provided at an input stage of the synchronization follow-up part 215 and at an output stage of the RAKE combining part 204, as shown in FIG. 39. To be more specific, the data demodulating part 202b has an arrangement resulting on adding another A/D converter 205 at the input stage of the synchronization follow-up part 215 in the data demodulating section 202 shown in FIG. 37.

In the data demodulating section 202b, analog signals are supplied to input stages of blocks of the inverse-spreading part 217 and the RAKE combining part 204, and hence, these blocks perform analog signal processing operations. On the other hand, since the A/D converters 205 are provided at an input stage of the synchronization follow-up part 215 and at an output stage of the RAKE combining part 204 respectively in the demodulator circuit 203, the synchronization follow-up part 215 performs a digital signal processing operation, while a final output of the base band processing unit is digitized.

Therefore, it is necessary to make the synchronization follow-up part 215 a circuit for carrying out a digital processing operation.

Twelfth Embodiment

Figure 40:
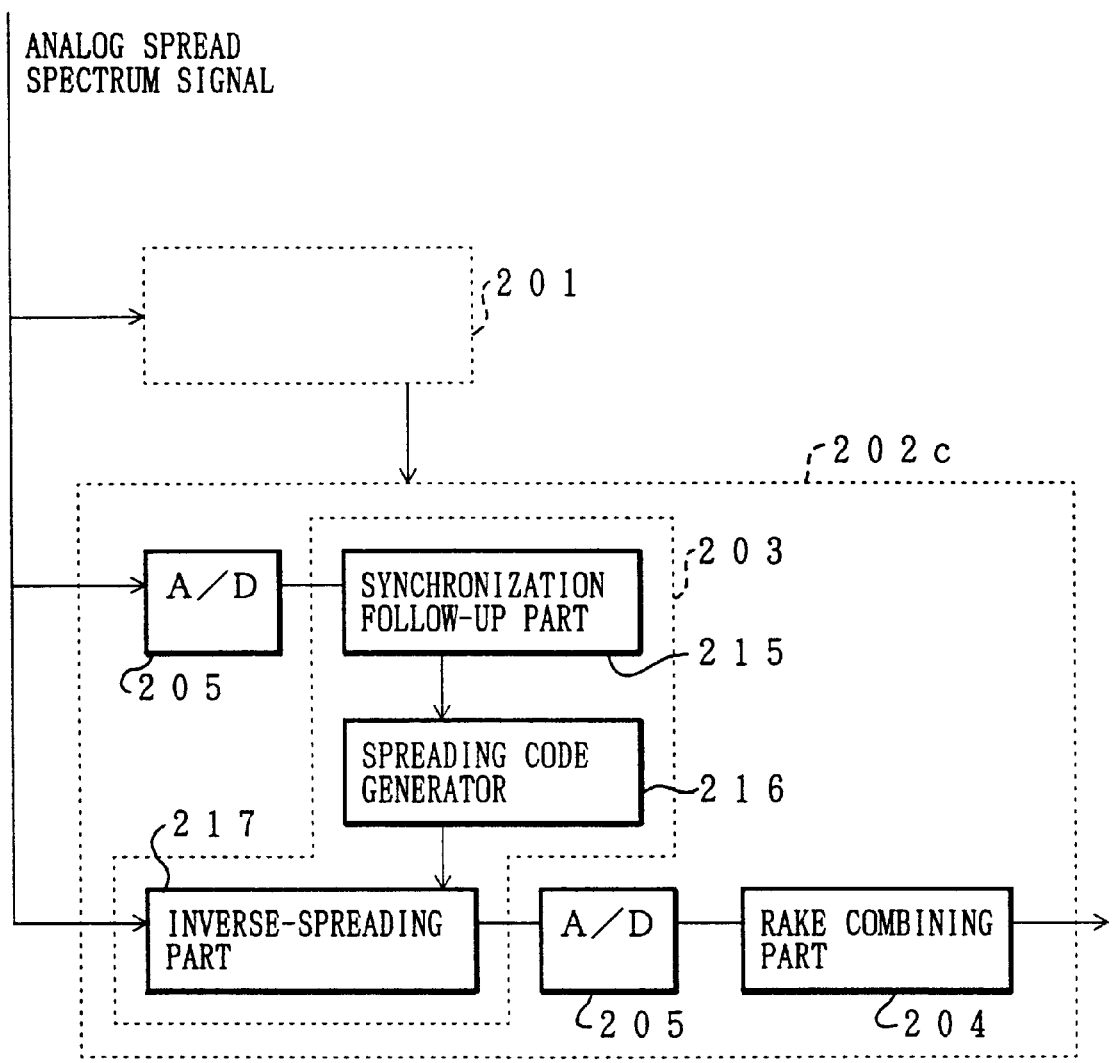
FIG. 40 is a block diagram illustrating a schematic arrangement of a data demodulating section of a base band processing unit in accordance with still another embodiment of the present invention.

A base band processing unit installed in the spread spectrum communication device in accordance with the present embodiment has a data demodulating section 202c in which two of the A/D converters 205 are provided at an input stage of the synchronization follow-up part 215 and at an output stage of the inverse-spreading part 217, as shown in FIG. 40. To be more specific, the data demodulating part 202c has an arrangement resulting on adding another A/D converter 205 at the input stage of the synchronization follow-up part 215 in the data demodulating section 202a shown in FIG. 38.

In the data demodulating section 202c, analog signals are supplied to an input stage of a block of the inverse-spreading part 217, and hence, the block performs an analog signal processing operation. On the other hand, since the A/D converters 205 are provided at an input stage of the synchronization follow-up part 215 and at an output stage of the inverse-spreading part 217, respectively, the synchronization follow-up part 215, the spreading code generator 216, and the RAKE combining part 204 perform digital signal processing operations.

Therefore, like the data demodulating section 202b shown in FIG. 39, almost all the blocks of the data demodulating section 202c perform digital processing operations.

Incidentally, in any one of the cases of the arrangements shown in FIGS. 37 through 40, the synchronization follow-up part 215 is provided so as to apply fine adjustment to the synchronization position found by the synchronization acquiring part 201. However, generally, the synchronization position found by the synchronization acquiring part 201 is sufficiently feasible for practical application without fine adjustment. Therefore, the following description will explain cases where the synchronization follow-up part 215 is not provided.

Thirteenth Embodiment

Figure 41:
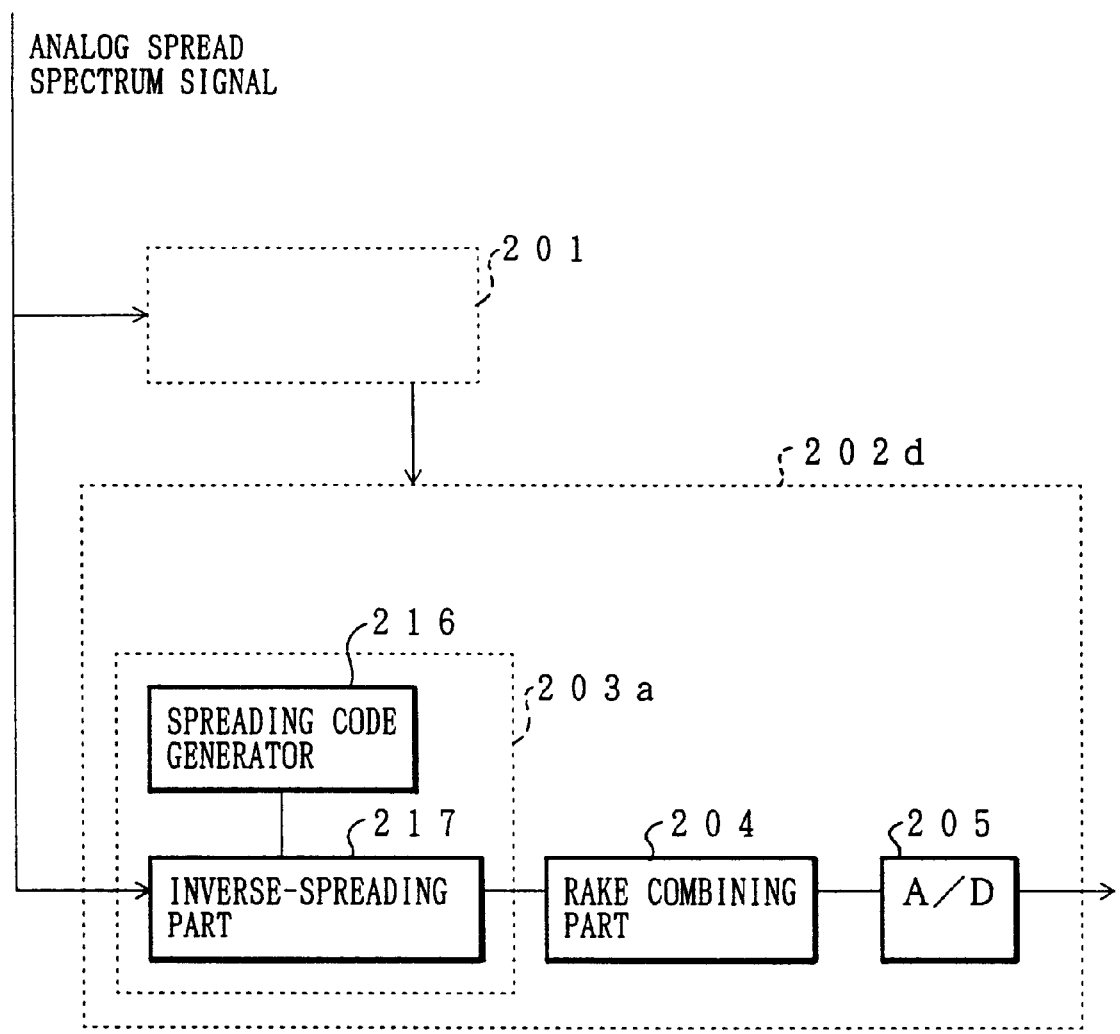
FIG. 41 is a block diagram illustrating a schematic arrangement of a data demodulating section of a base band processing unit in accordance with still another embodiment of the present invention.

A base band processing unit installed in the spread spectrum communication device in accordance with the present embodiment has a data demodulating section 202d which is arranged in the same manner as the data demodulating section 202 shown in FIG. 37 except that a demodulator circuit 203a is provided in lieu of the demodulator circuit 203, as shown in FIG. 41.

More specifically, the modulating circuit 203a does not have the synchronization follow-up part 215 which is provided in the demodulator circuit 203. In other words, this exemplifies a case where a function for applying fine adjustment to the synchronization position found by the synchronization acquiring section 201 is not provided.

The data demodulating section 202d, the A/D converter 205 is provided at an output stage of the RAKE combining part 204. In this case, analog signals are supplied to input stages of the inverse-spreading part 217 and the RAKE combining part 204, and these blocks perform analog signal processing operations. On the other hand, since the A/D converter 205 is provided on the output stage of the RAKE combining part 204, the output of the RAKE combining part 204 is digitized, which means that only a final output of the data demodulating section 202d is digitized.

Fourteenth Embodiment

Figure 42:
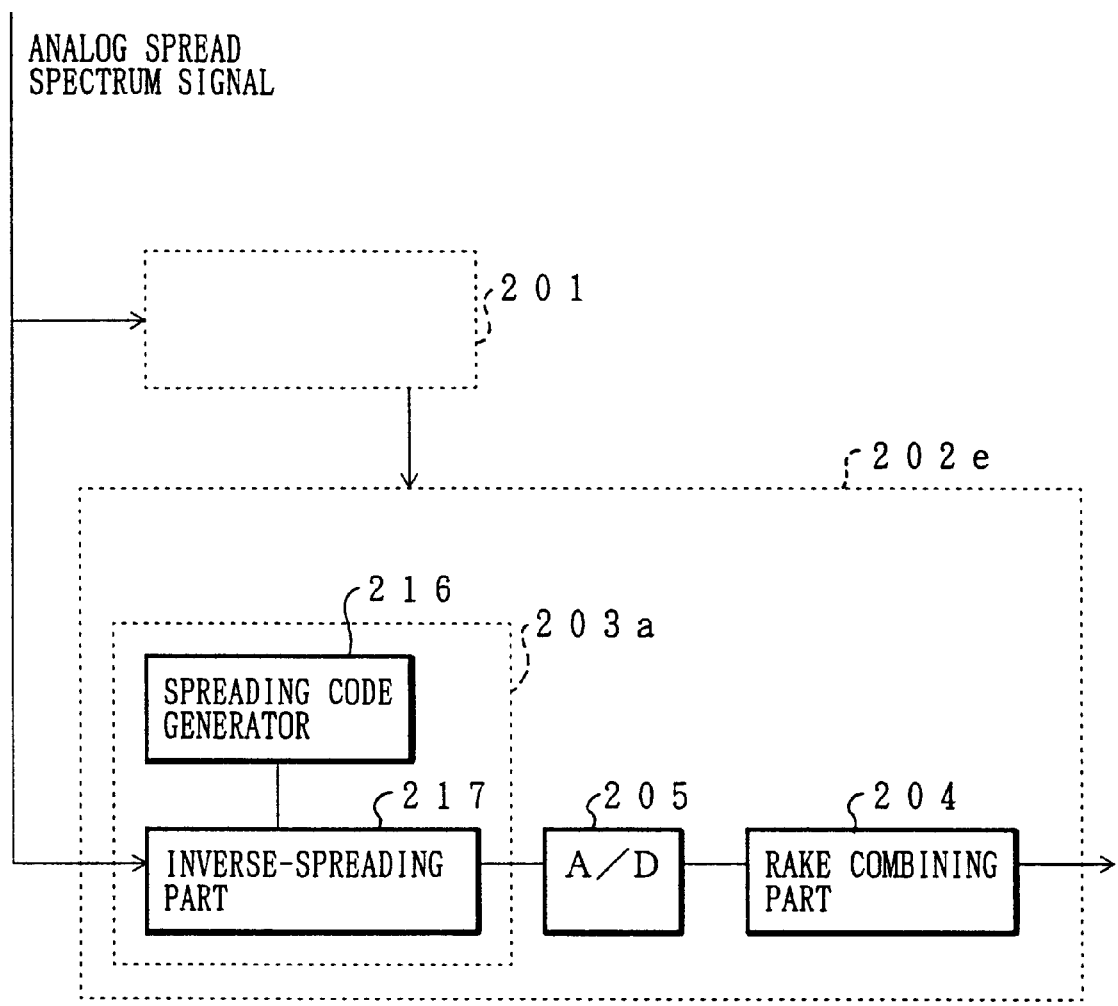
FIG. 42 is a block diagram illustrating a schematic arrangement of a data demodulating section of a base band processing unit in accordance with still another embodiment of the present invention.

As shown in FIG. 42, a base band processing unit installed in the spread spectrum communication device in accordance with the present embodiment has a data demodulating section 202e which is arranged in the same manner as the data demodulating section 202a shown in FIG. 38 except that a demodulator circuit 203a is provided in lieu of the demodulator circuit 203. The data demodulating section 202e does not have the synchronization follow-up part 215, like the data demodulating section 202d.

In the data demodulating section 202e, the A/D converter 205 is provided between the inverse-spreading part 217 of the demodulator circuit 203a and the RAKE combining part 204. In this case, analog signals are supplied to an input stage of a block of the inverse-spreading part 217, in which an analog signal processing operation is conducted. On the other hand, since the A/D converter 205 is provided at the output stage of the inverse-spreading part 217, a digital signal processing operation is carried out in the block of the RAKE combining part 204.

Therefore, neither the demodulator circuit 203a of the thirteenth embodiment nor that of the fourteenth embodiment has the synchronization follow-up part 215. For this reason, follow-up processing precision more or less deteriorates, but the circuit size can be reduced.

Incidentally, in any one of the cases of FIGS. 37 through 42, a plurality of signals inverse-spread by the inverse-spreading part 217 are combined by the RAKE combining part 204 and the combined result is outputted as an output wave of the base band processing unit 200. This aims to achieve an effect of improvement of S/N, by taking multiple paths into consideration and combining the paths. Therefore, even without such combination, loss of a specific function of the spread spectrum communication device does not occur.

Therefore, the following description will explain a data demodulating section in which the RAKE combining part 204 is not provided.

Fifteenth Embodiment

Figure 43:
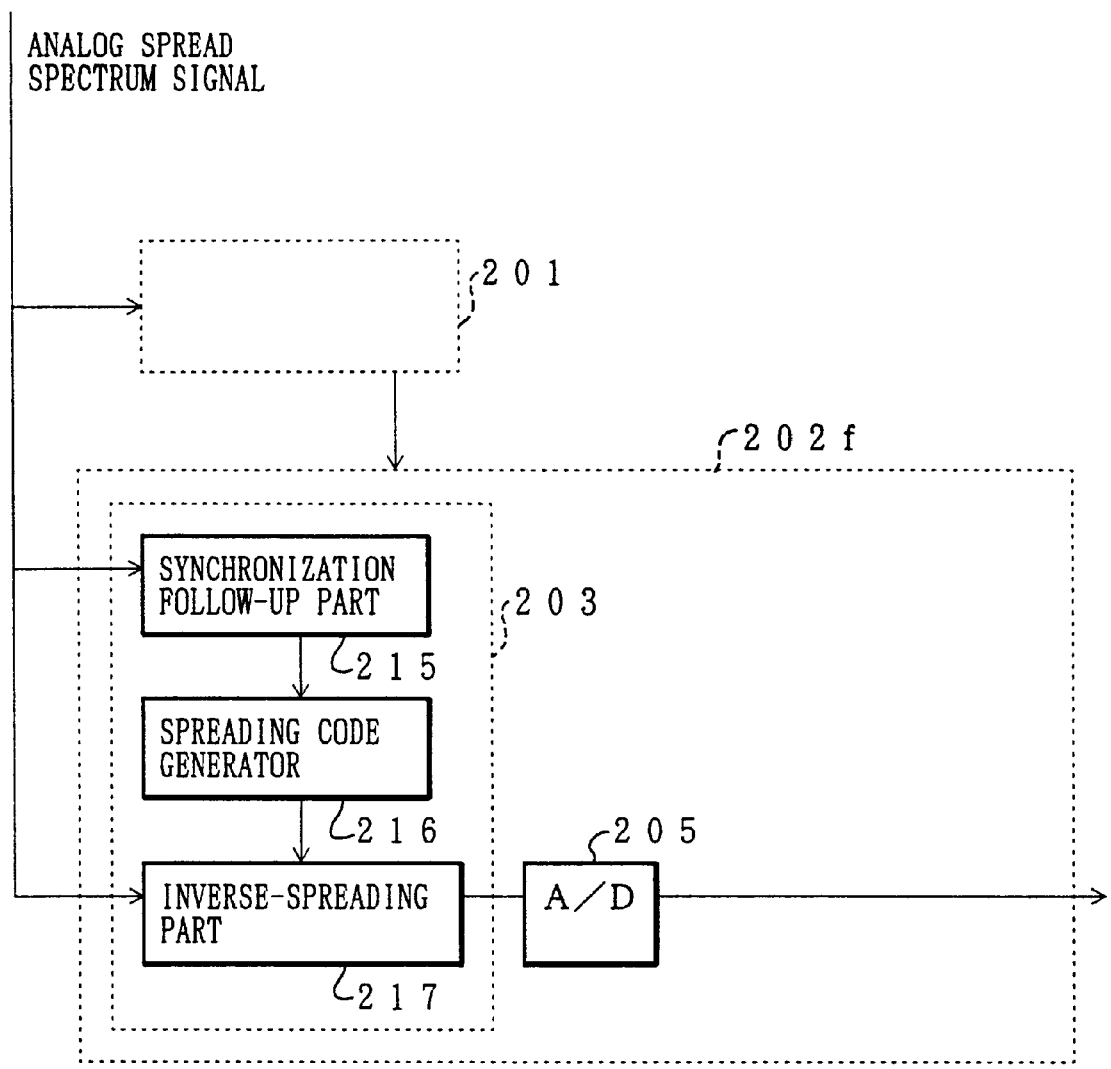
FIG. 43 is a block diagram illustrating a schematic arrangement of a data demodulating section of a base band processing unit in accordance with still another embodiment of the present invention.

As shown in FIG. 43, a base band processing unit of the spread spectrum communication device in accordance with the present embodiment has a data demodulating section 202f which results on removing the RAKE combining part 204 from the data demodulating section 202 shown in FIG. 37. More specifically, the data demodulating section 202f is arranged so that the A/D converter 205 is provided at an output stage of the inverse-spreading part 217, and so that an output of the A/D converter 205 is an output of the base band processing unit.

Therefore, in the data demodulating section 202f, analog signals are supplied to an input stage of a block of the synchronization follow-up part 215 and the inverse-spreading part 217, which is an input stage of the demodulator circuit 203, and the block performs an analog signal processing operation. On the other hand, since the A/D converter 205 is provided at the output stage of the inverse-spreading part 217 of the demodulator circuit 203, only a digital signal of a path with the greatest amplitude is outputted from the A/D converter 205, without RAKE combination. The output is treated as an output of the data demodulating section 202f.

Sixteenth Embodiment

Figure 44:
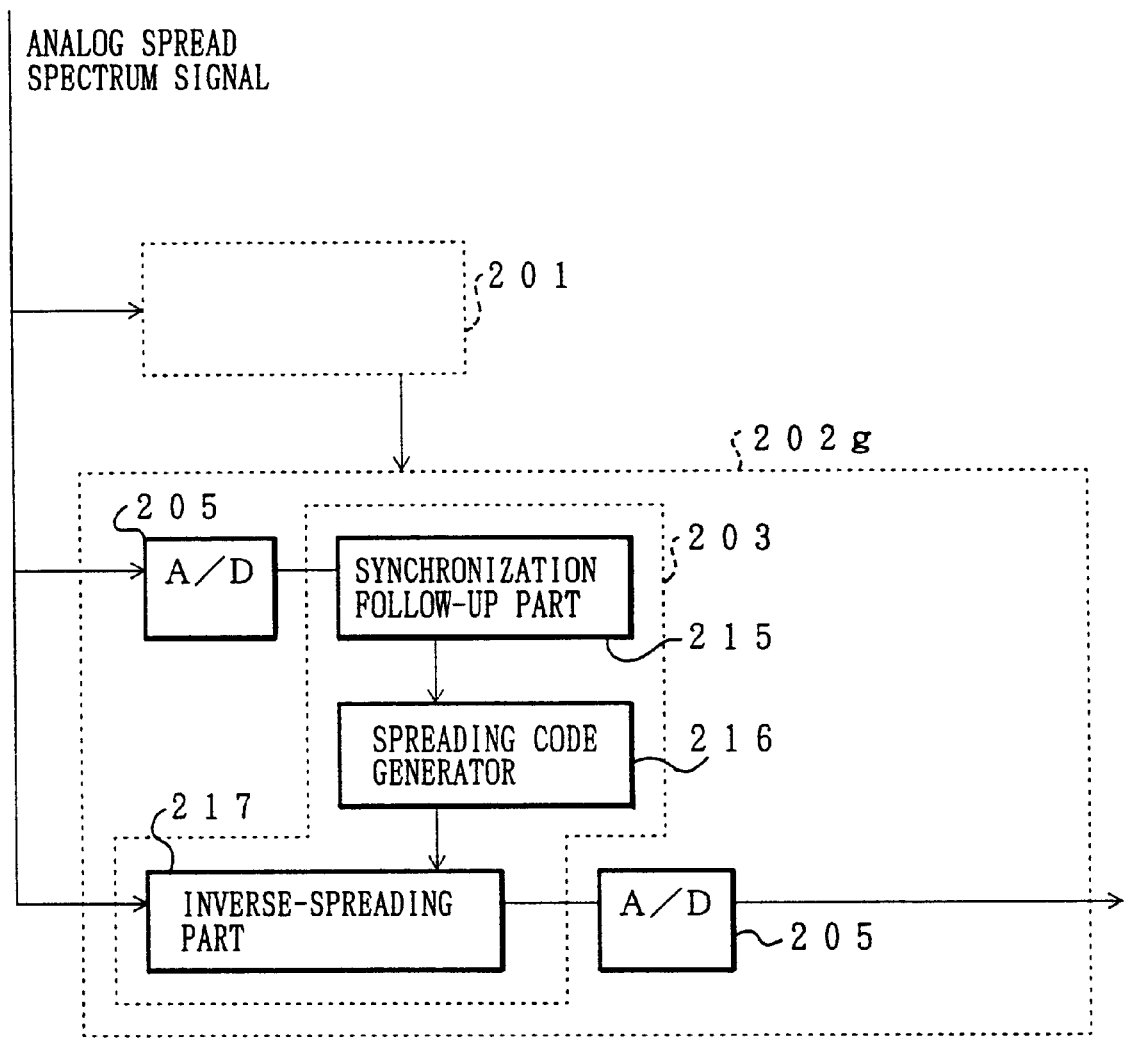
FIG. 44 is a block diagram illustrating a schematic arrangement of a data demodulating section of a base band processing unit in accordance with still another embodiment of the present invention.

As shown in FIG. 44, a base band processing unit of the spread spectrum communication device in accordance with the present embodiment has a data demodulating section 202g which results on removing the RAKE combining part 204 from the data demodulating section 202b shown in FIG. 39. More specifically, the data demodulating section 202g is arranged so that one A/D converter 205 is provided at an input stage of the synchronization follow-up part 215 of the demodulator circuit 203, while another A/D converter 205 is provided at an output stage of the inverse-spreading part 217 of the demodulator circuit 203, and so that an output of the A/D converter 205 provided at the output stage of the inverse-spreading part 217 is an output of the base band processing unit.

Therefore, in the data demodulating section 202g, an input stage of a block of the inverse-spreading part 217 is supplied with analog signals, and this functional block performs an analog signal processing operation. On the other hand, since the A/D converters 205 are provided at the input stage of the synchronization follow-up part 215 and the output stage of the inverse-spreading part 217 respectively in the demodulator circuit 203, the block of the synchronization follow-up part 215 of the demodulator circuit 203 performs a digital signal processing operation, while signals inverse-spread by the inverse-spreading part 217 are digitized. Then, one signal of a path with the greatest amplitude among the signals thus digitized at the inverse-spreading part 217 is outputted as an output of the data demodulating section 202g.

Seventeenth Embodiment

Figure 45:
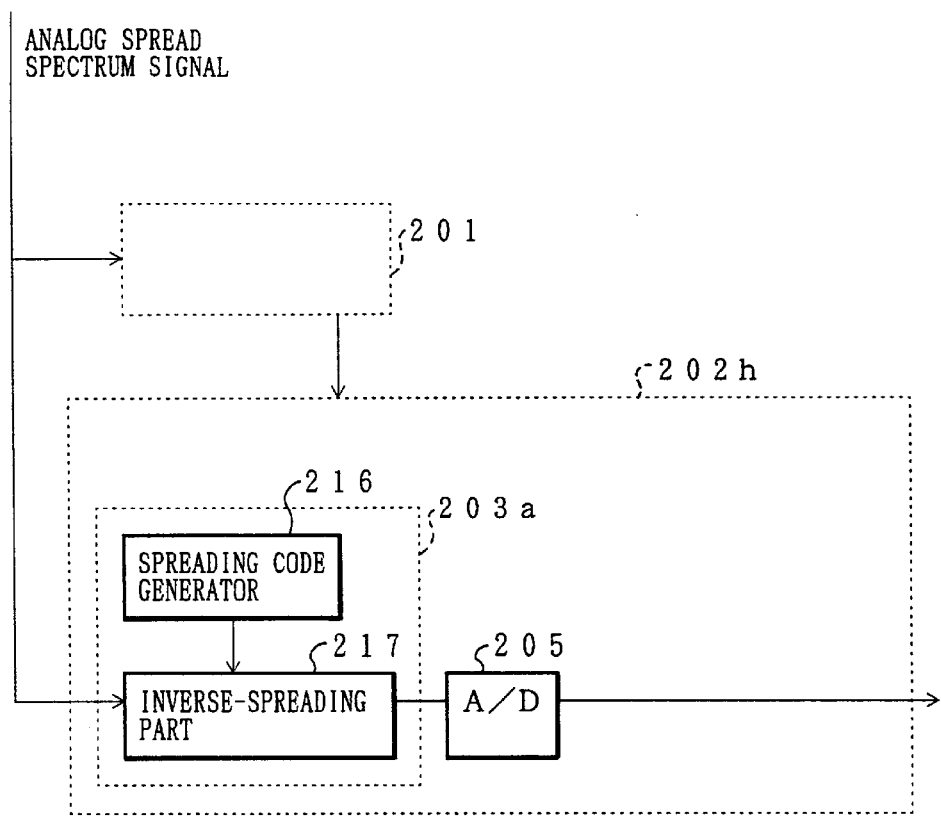
FIG. 45 is a block diagram illustrating a schematic arrangement of a data demodulating section of a base band processing unit in accordance with still another embodiment of the present invention.

As shown in FIG. 45, a base band processing unit of the spread spectrum communication device in accordance with the present embodiment has a data demodulating section 202h which results on removing the RAKE combining part 204 from the data demodulating section 202d shown in FIG. 41. More specifically, the data demodulating section 202h is arranged so that the A/D converter 205 is provided only at an output stage of the inverse-spreading part 217 of the demodulator circuit 203a. As described above, this exemplifies a case where the demodulator circuit 203a does not have a function of fine adjustment of the synchronization position found by the synchronization acquiring section 201.

In the data demodulating section 202h, an input stage of a block of the inverse-spreading part 217 of the demodulator circuit 203a is supplied with analog signals, and the block performs an analog signal processing operation. On the other hand, since the A/D converter 205 is provided at the output stage of the inverse-spreading part 217 of the demodulator circuit 203a, signals resulting on digitization of the signals inverse-spread by the inverse-spreading part 217 are outputted. In other words, regarding the data demodulating section 202h, only a signal of a path with the greatest amplitude is outputted from the data demodulating section 202h, without RAKE combination.

As to any one of the data demodulating sections 202f through 202h of the fifteenth through seventeenth embodiments, power to be consumed by the RAKE combining part 204 can be cut off, since the RAKE combining part 204 is not provided therein.

Moreover, the circuit size thereof can be reduced by the space for the RAKE combining part 204.

Figure 46:
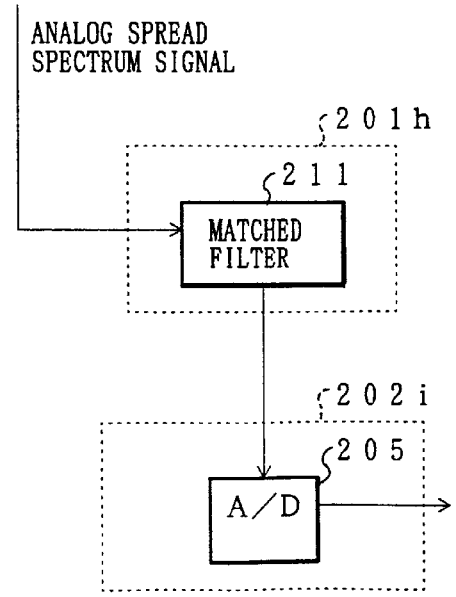
FIG. 46 is a block diagram illustrating a schematic arrangement of a base band processing unit in accordance with still another embodiment of the present invention.

Here, the following description will explain an example of the base band processing unit 200 that has the simplest arrangement, among those of the present invention, while referring to FIG. 46.

Eighteenth Embodiment

As shown in FIG. 46, a base band processing unit installed in the spread spectrum communication device in accordance with the present embodiment has (1) a synchronization acquiring section 201h which includes only the matched filter 211 and (2) a data demodulating section 202i which includes only the A/D converter 205. The A/D converter 205 is provided behind matched filter 211.

Since the base band processing unit thus arranged has only minimum and indispensable members, the circuit size can be extremely reduced, while power consumption can be drastically suppressed.

Figure 28:
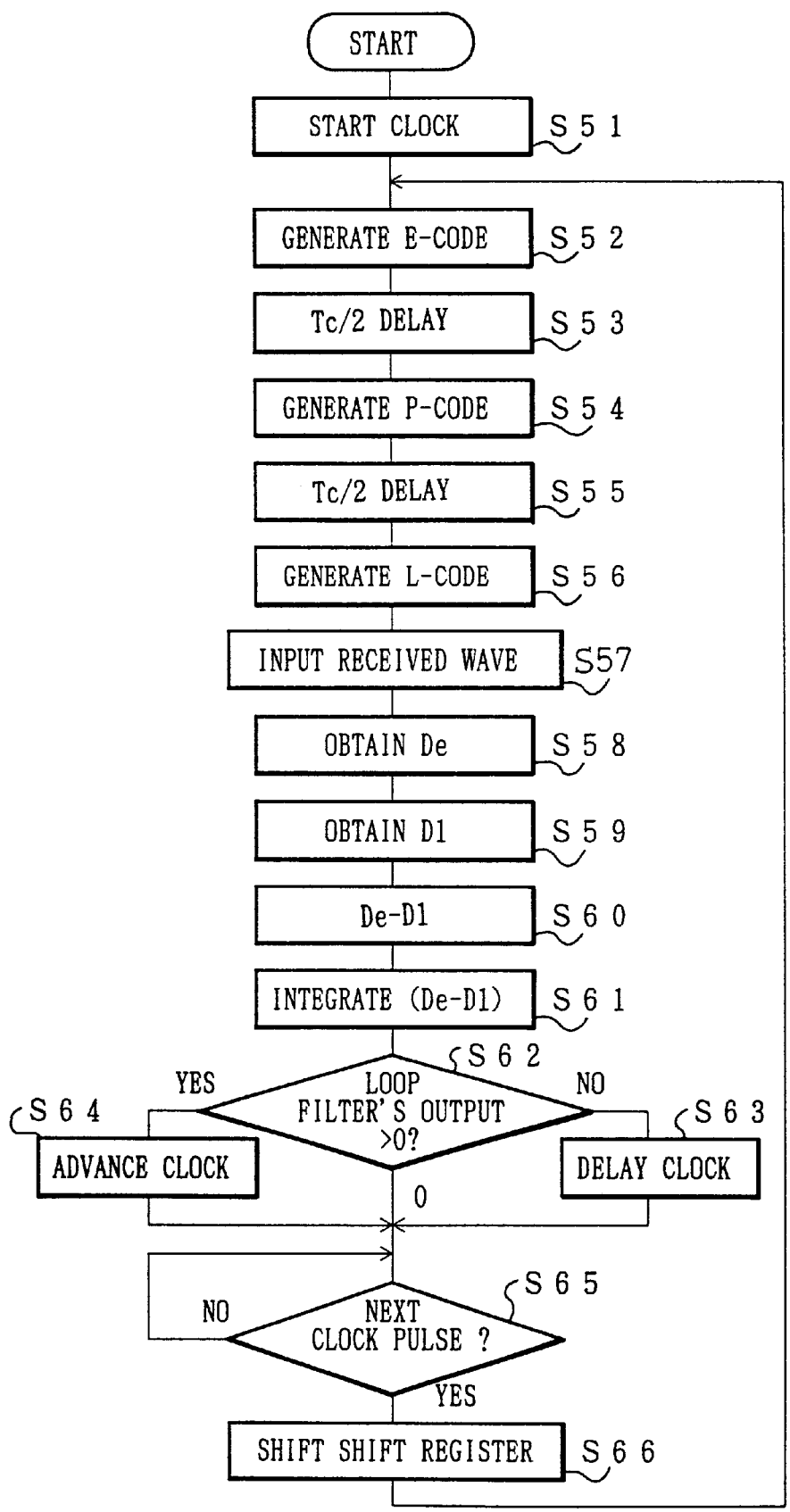
FIG. 28 is a flowchart showing a flow of a processing operation by the data demodulating section shown in FIG. 5.

As to the ninth through eighteenth embodiments regarding the data demodulating section, the flow of the signal processing in the data demodulating section is substantially identical to that shown by the flowcharts of FIGS. 28 and 29 in conjunction with the first embodiment. However, different aspects are as follows.

In the flowchart of FIG. 28, a step of the aforementioned A/D conversion at the synchronization follow-up part 215 is inserted before the step S57, and at the step S57, a received wave of digital data is inputted.

In the flowchart of FIG. 29, a step of the aforementioned A/D conversion at the synchronization follow-up part 215 is inserted behind the step S116 as well as behind the step S125. Note that in the case where the RAKE combination is not conducted, the steps S101 through S104 and S126 shown in FIG. 29 are performed.

As described above, in the spread spectrum communication device of the present invention, when the analog spread spectrum signal is supplied to the base band processing unit, at least one of the members constituting the synchronization acquiring section and the data demodulating section conducts an analog processing operation, since at least one A/D converter is provided until the output of the base band processing unit, and thereafter, the signal is digitized. Therefore, requirements of high-speed A/D converting operations for carrying out A/D conversion at a speed 2 or 3 times the chip rate of the PN code, and sample-hold operations, are relaxed.

Besides, according to the spread spectrum communication device of the present invention, power consumption is smaller as compared with the conventional case where all the signal processing operations are digital signal processing operations, thereby allowing a chargeable battery used in a potable terminal to be smaller. Furthermore, a space where the base band processing unit is formed can be decreased, thereby allowing the spread spectrum communication device to consume lower power and to become smaller in size.

Incidentally, in the descriptions of the aforementioned embodiments, the synchronization acquiring section and the data demodulating section are separately explained, but some of these embodiments may be appropriately combined. Moreover, in the above descriptions, only the receiver of the spread spectrum communication device is explained, but a spread spectrum transmitter may be provided in the same device.

Generally, in the case where the A/D converters are provided on both the synchronization acquiring section and the data demodulating section, the operational speed of the A/D converter of the data demodulating section is higher than that of the synchronization acquiring section. Therefore, in the case where the base band processing unit is designed, the operational speed of the A/D converter of the synchronization acquiring section may be adjusted to the operational speed of the A/D converter of the data demodulating section. In this case, operational speeds of all the A/D converter are highest and the power consumption is great.

However, in the case where application of the A/D converter is considered separately regarding the synchronization acquiring section and the data demodulating section, speeds of the A/D converters may be independently and differently set as low as possible. As a result, the power consumption can be suppressed to minimum.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A spread spectrum communication device having a base band processing unit for demodulating a received analog spread spectrum signal and digitizing the same, said base band processing unit including:
    a synchronization acquiring section for acquiring synchronization from the received analog spread spectrum signal; and
    a data demodulating section for demodulating the received analog spread spectrum signal based on the result of the operation of said synchronization acquiring section,
    wherein said synchronization acquiring section has at least a matched filter for detecting peak positions of the received analog spread spectrum signal, a power computing part for finding a respective power value of each of correlation values found by said matched filter, and a path identifying part for identifying paths of the received analog spread spectrum signal based on the obtained power values; and
    wherein said matched filter performs an analog processing operation.

2. A spread spectrum communication device having a base band processing unit for demodulating a received analog spread spectrum signal by digitizing the same, said base band processing unit including:
    a synchronization acquiring section for acquiring synchronization from the received analog spread spectrum signal;

a data demodulating section for demodulating the received analog spread spectrum signal based on the result of the operation of said synchronization acquiring section, wherein said synchronization acquiring section has at least a matched filter for detecting peak positions of the received analog spread spectrum signal, said synchronization acquiring section further including, on an output side of said matched filter:
- a power computing part for finding a power value of a correlation value found by said matched filter;
- an averaging part for finding, regarding each of a plurality of peaks, an averaged value of outputs of said power computing part for several successive periods;
- a path identifying part for identifying paths of the received analog spread spectrum signal based on the averaged peak value;
- an A/D converter provided immediately behind an output side of said matched filter; and wherein said matched filter performs an analog processing operation.

3. A spread spectrum communication device having a base band processing unit for demodulating a received analog spread spectrum signal by digitizing the same, said base band processing unit including:
- a synchronization acquiring section for acquiring synchronization from the received analog spread spectrum signal;
- a data demodulating section for demodulating the received analog spread spectrum signal based on the result of the operation of said synchronization acquiring section, wherein said synchronization acquiring section has at least a matched filter for detecting peak positions of the received analog spread spectrum signal, said synchronization acquiring section further including:
- a power computing part for finding a power value of a correlation value found by said matched filter;
- an averaging part for finding, regarding each of a plurality of peaks, an averaged value of outputs of said power computing part for several successive periods;
- a path identifying part for identifying paths of the received analog spread spectrum signal based on the averaged peak value;
- an A/D converter provided immediately behind an output side of said power computing part; and wherein said matched filter performs an analog processing operation.

4. A spread spectrum communication device having a base band processing unit for demodulating a received analog spread spectrum signal by digitizing the same, said base band processing unit including:
- a synchronization acquiring section for acquiring synchronization from the received analog spread spectrum signal;
- a data demodulating section for demodulating the received analog spread spectrum signal based on the result of the operation of said synchronization acquiring section, wherein said synchronization acquiring section has at least a matched filter for detecting peak positions of the received analog spread spectrum signal, said synchronization acquiring section further including:
- a power computing part for finding a power value of a correlation value found by said matched filter;
- an averaging part for finding, regarding each of a plurality of peaks, an averaged value of outputs of said power computing part for several successive periods;
- a path identifying part for identifying paths of the received analog spread spectrum signal based on the averaged peak value; and
- an A/D converter provided immediately behind an output side of said averaging part, and wherein said matched filter performs an analog processing operation.

5. A spread spectrum communication device having a base band processing unit for demodulating a received analog spread spectrum signal and digitizing the same, said base band processing unit including:
- a synchronization acquiring section for acquiring synchronization from the received analog spread spectrum signal;
- a data demodulating section for demodulating the received analog spread spectrum signal based on the result of the operation of said synchronization acquiring section; the data demodulating section further including:
  - a spreading code generator for generating spreading codes;
  - an inverse-spreading part for inverse-spreading the received analog spread spectrum signal based on the generated spreading codes; and
  - an A/D converter provided on an output side of said inverse-spreading part, wherein said synchronization acquiring section has at least a matched filter for detecting peak positions of the received analog spread spectrum signal, and wherein said matched filter performs an analog processing operation.

6. A spread spectrum communication device having a base band processing unit for demodulating a received analog spread spectrum signal and digitizing the same, said base band processing unit including:
- a synchronization acquiring section for acquiring synchronization from the received analog spread spectrum signal;
- a data demodulating section for demodulating the received analog spread spectrum signal based on the result of the operation of said synchronization acquiring section, wherein said data demodulating section further includes:
  - a spreading code generator for generating spreading codes;
  - an inverse-spreading part for inverse-spreading the received analog spread spectrum signal based on the generated spreading codes;
  - a RAKE combining part for combining a plurality of the inverse-spread signals; and
  - an A/D converter provided between said inverse-spreading part and said RAKE combining part, wherein said synchronization acquiring section has at least a matched filter for detecting peak positions of the received analog spread spectrum signal, and wherein said matched filter performs an analog processing operation.

7. A spread spectrum communication device having a base band processing unit for demodulating a received analog spread spectrum signal and digitizing the same, said base band processing unit including:
- a synchronization acquiring section for acquiring synchronization from the received analog spread spectrum signal;

a data demodulating section for demodulating the received analog spread spectrum signal based on the result of the operation of said synchronization acquiring section, said data demodulating section further including:
- a spreading code generator for generating spreading codes;
- an inverse-spreading part for inverse-spreading the received analog spread spectrum signal, based on the generated spreading codes;
- a RAKE combining part for combining a plurality of the inverse-spread signals; and
- an A/D converter provided on an output side of said RAKE combining part, wherein said synchronization acquiring section has at least a matched filter for detecting peak positions of the received analog spread spectrum signal, and wherein said matched filter performs an analog processing operation.

8. The spread spectrum communication device as set forth in claim 5, wherein said data demodulating section further includes a synchronization follow-up part for controlling said spreading code generator based on the result of the operation of said synchronization acquiring section.

9. The spread spectrum communication device as set forth in claim 6, wherein said data demodulating section further includes a synchronization follow-up part for controlling said spreading code generator based on the result of the operation of said synchronization acquiring section.

10. The spread spectrum communication device as set forth in claim 7, wherein said data demodulating section further includes a synchronization follow-up part for controlling said spreading code generator based on the result of the operation of said synchronization acquiring section.

11. The spread spectrum communication device as set forth in claim 8, wherein said synchronization follow-up part is composed of a delay lock loop.

12. The spread spectrum communication device as set forth in claim 8, wherein said synchronization follow-up part is composed of a τ dither loop.

13. The spread spectrum communication device as set forth in claim 8, wherein said synchronization follow-up part is composed of a double dither loop.

14. The spread spectrum communication device as set forth in claim 8, wherein said synchronization follow-up part is composed of a modified delay lock loop.

15. The spread spectrum communication device as set forth in claim 11, wherein another A/D converter is provided before a loop filter of said synchronization follow-up part.

16. The spread spectrum communication device as set forth in claim 12, wherein another A/D converter is provided before a loop filter of said synchronization follow-up part.

17. The spread spectrum communication device as set forth in claim 13, wherein another A/D converter is provided before a loop filter of said synchronization follow-up part.

18. The spread spectrum communication device as set forth in claim 14, wherein another A/D converter is provided before a loop filter of said synchronization follow-up part.

19. A spread spectrum communication device having a base band processing unit for demodulating a received analog spread spectrum signal and digitizing the same, said base band processing unit including:
- a synchronization acquiring section for acquiring synchronization from the received analog spread spectrum signal;
- a data demodulating section for demodulating the received analog spread spectrum signal based on the result of the operation of said synchronization acquiring section, wherein said synchronization acquiring section has at least a matched filter for detecting peak positions of the received analog spread spectrum signal and includes only said matched filter; and wherein said data demodulating section includes only an A/D converter, said A/D converter being provided immediately behind an output side of said matched filter, so that an output of said A/D converter provided immediately behind the output side of said matched filter is an output of said base band processing unit.

* * * * *